United States Patent
Nakamura

(10) Patent No.: US 7,292,274 B2
(45) Date of Patent: Nov. 6, 2007

(54) SOLID-STATE IMAGE PICKUP DEVICE DRIVING METHOD AND IMAGE CAPTURING APPARATUS FOR OUTPUTTING HIGH-RESOLUTION SIGNALS FOR STILL IMAGES AND MOVING IMAGES OF IMPROVED QUALITY AT A HIGH FRAME RATE

(75) Inventor: Hideo Nakamura, Nagano (JP)

(73) Assignee: Eastman Kodak Company, Rochester, NY (US)

( * ) Notice: Subject to any disclaimer, the term of this patent is extended or adjusted under 35 U.S.C. 154(b) by 683 days.

(21) Appl. No.: 10/083,352

(22) Filed: Feb. 27, 2002

(65) Prior Publication Data

US 2003/0086005 A1 May 8, 2003

(30) Foreign Application Priority Data

Nov. 6, 2001 (JP) ............................ 2001-341147
Dec. 13, 2001 (JP) ............................ 2001-380359

(51) Int. Cl.
*H04N 3/14* (2006.01)
(52) U.S. Cl. ..................... 348/272; 348/311; 348/320
(58) Field of Classification Search ................ 348/272, 348/321, 323, 220.1, 230.1, 311, 314, 316
See application file for complete search history.

(56) References Cited

U.S. PATENT DOCUMENTS 5,420,629 A * 5/1995 Watanabe ................ 348/230.1
5,880,781 A * 3/1999 Udagawa et al. ............ 348/279
5,995,137 A * 11/1999 Yamada et al. ................ 348/88
6,034,366 A * 3/2000 Yu ............................ 250/208.1
6,559,889 B2 * 5/2003 Tanaka et al. .............. 348/299
6,750,911 B1 * 6/2004 Kobayashi et al. ......... 348/273
6,809,763 B1 * 10/2004 Yoshida ...................... 348/248
2001/0048477 A1 * 12/2001 Misawa ...................... 348/272
2004/0227845 A1 * 11/2004 Kawai ......................... 348/360
2005/0012826 A1 * 1/2005 Hattori et al. ........... 348/220.1

* cited by examiner

*Primary Examiner*—Lin Ye
*Assistant Examiner*—Anthony Daniels
(74) *Attorney, Agent, or Firm*—Thomas J. Strouse

(57) ABSTRACT

A CPU 14 drives the CCD2 by switching its driving mode between an omission readout mode and a summation readout mode. Summing the signal charge of pixels in the summation readout mode offers an increased sensitivity. The omission readout mode reduces smear. The summation readout mode calls for reading out to the vertical transfer paths all red pixel signal charges of the two-color filters aligned along each vertical transfer path. While charge readout voltages are applied to a specific system of charge readout electrode systems, vertical transfer is performed to sum pixels of a like color on each vertical transfer path. Charges of the green pixels are read to the vertical transfer paths so as not to be mixed with the red signal charges. By combining vertical transfer with selective readout, pixels of the respective same colors are summed on the vertical transfer paths or the horizontal transfer path.

16 Claims, 47 Drawing Sheets

FIRST FIELD　　　　SECOND FIELD

SOLID-STATE IMAGE PICKUP DEVICE DRIVING METHOD AND IMAGE CAPTURING APPARATUS FOR OUTPUTTING HIGH-RESOLUTION SIGNALS FOR STILL IMAGES AND MOVING IMAGES OF IMPROVED QUALITY AT A HIGH FRAME RATE

BACKGROUND OF THE INVENTION

The present invention relates to a method of driving a solid-state image pickup device used in an image capturing apparatus, such as a digital camera or a movie camera. The invention also relates to an image capturing apparatus using such a solid-state image pickup device.

In place of a conventional image pickup device dedicated to capturing moving images, an image pickup device that is capable of both capturing moving images and capturing still images is being more commonly used in an image capturing apparatus, such as a so-called electronic still camera or a movie camera. An image pickup device which is capable of and normally used for both capturing moving images and capturing still images is a so-called multi-pixel image pickup device capable of picking up a tremendously large number of pixels compared to a conventional image pickup device dedicated to capturing moving images, because a multi-pixel image pickup device is capable of capturing still images at extremely high resolution.

Using such an multi-pixel image pickup device to capture a still image produces a picture of superb quality, which is much better than a still image captured by a conventional image pickup device dedicated to capturing moving images; for example, the image is of such quality that it can be amply be appreciated even if printed in A4 size. On the other hand, a multi-pixel image pickup device has too many pixels to be used for capturing moving images without processing; it takes a long time to read out images contained in each frame of a movie, making it difficult to obtain smooth moving images. This can be solved by increasing the speed of the image pickup device itself or the peripheral circuits of the image pickup device. Such an increase in speed, however, would result in a drastic increase in cost and is therefore impractical.

Therefore, a multi-pixel image pickup device used for this purpose normally has such a structure that calls for individually reading out all the pixel signals to shoot still images, and omitting a part of the pixel signals to shoot moving images. In cases where a so-called CCD is used as the solid-state image pickup devices, omission readout is usually performed according to a vertical method, which basically calls for omitting some of horizontal scan lines in a given proportion. The CCD mentioned above is a CCD (charge-coupled device) image sensor comprised of a multi-pixel CCD image pickup device.

Omission readout is also performed for using an image pickup device itself as a sensor to measure conditions of image capturing, in other words to control the shooting system, such as preliminary measurement of shooting conditions conducted prior to shooting still images or moving images.

A CCD is an image pickup device having an image pickup surface comprised of photodiodes, which correspond to pixels and are arranged in a two-dimensional grid. An image focused on the image pickup surface by means of an optical system is retrieved by reading out signals representing amplitudes of electric charges that have been charged on the photodiodes according to the intensity of the light of the respective pixels. Signal charges are sequentially sent one signal charge for each pixel at a time to an output circuit in the CCD. The CCD includes a charge-voltage converter. After the amount of each charge signal is converted to a signal to change voltage, the signal is output from the CCD. This operation of guiding signal charges corresponding to pixels into the output circuit is called transfer. A commonly employed method of sequentially transferring signal charges of pixels arranged in a two-dimensional rectangular grid into an output circuit calls for a combination of so-called vertical transfer and horizontal transfer. Given that an alignment from the top to the bottom or vice versa of the image capturing frame is vertical and that an alignment from the right to the left or vice versa of the image capturing frame is horizontal, vertical transfer refers to operation of transferring the signal charges corresponding to all the pixels simultaneously in the vertical direction towards the aforementioned output circuit, and horizontal transfer refers to operation of transferring, simultaneously in the horizontal direction towards the output circuit, the signal charges that have been transferred to the horizontal transfer path from the front ends of the vertical transfer paths as a result of vertical transfer by the amount of one stage, said front ends being the ends that are closest to the output circuit and collectively form a horizontal line. At that time, the furthermost signal charge that corresponds to a pixel and is located in the horizontal transfer path, i.e. closest to the output circuit, is sent into the charge-voltage converter. Horizontal transfer continues in this manner until all the signal charges in the horizontal transfer path are converted to voltages. When the horizontal transfer path becomes empty with completion of the output, the aforementioned vertical transfer is again performed. After the new signal charges on the horizontal line that form the furthermost ends of the vertical lines of signals are sent into the horizontal transfer path, the signal charges are sequentially transferred into the output circuit by horizontal transfer in the same manner as above and output from said output circuit. By thus repeating simultaneous vertical transfer of the signal charges of all the pixels and horizontal transfer of the signal charges in the horizontal transfer path alternately until the signals of all the pixels are output, output of pixel signals for one frame is completed. Thus, an electronic image can be reproduced.

When each signal charges of the pixels are transferred, vertical transfer is normally performed in the forward direction, i.e. toward the horizontal transfer path, as described above. Because of the principles of CCD, however, it is possible to perform reverse vertical transfer, in other words in the direction away from the horizontal transfer path. In response to the recent trend of reducing power consumption as well as pixel minimization resulting from increase in the number of pixels, progress is being made to reduce the transfer driving voltage of CCD. The reduction of the driving voltage is complicating efficient vertical transfer, a process which had conventionally been simple. Under such circumstances, some of the multi-pixel CCDS are designed to achieve high efficiency in vertical transfer in the forward direction. In some cases, however, this has resulted in drastic decrease in the efficiency of reverse transfer.

Among CCDs of various types, those most commonly used as the multi-pixel CCDs are what are generally called as interline-type CCDs. Depending on the scanning method, the interline-type CCDs are divided broadly into CCDs using interlace scanning methods (hereinafter called interlace CCDs) and CCDs using progressive scanning methods (hereinafter called progressive CCDs). At present, interlace CCDs are more widely used, because they achieve the most effective cost performance and have a structure suitable for multi-pixel image pickup devices. According to the structure of a typical interlace CCD, the number of horizontal lines of signal charges (otherwise referred to as pixel signal charges, charges, or pixel charges) that can be retained in the vertical transfer paths is a half of the number of the horizontal lines of photodiodes that serve as a photoelectric converting unit and correspond to the respective pixels. Therefore, in order to read out all the pixels in a frame respectively, the frame is divided into two fields, and readout is performed twice: even-numbered lines and odd-numbered lines alternately, in other words in an interlacing manner. For this purpose, two discharge readout electrode systems (otherwise referred to as signal discharge readout electrode systems or discharge read gate electrode systems) are respectively provided for the even-numbered lines and the odd-numbered lines. With interlace CCDs, selective readout may be enabled; for example, the number of the discharge readout electrode systems may be increased from two to four to permit a part of the lines to be selectively read out to the vertical transfer paths so that all the combinations of color filters in a single field are read out while the other lines remain unread. Thus, the function of line-omission is easily obtained. As a multi-pixel interlace CCD of this type normally call for 4-phase drive to perform vertical transfer, it is necessary to increase the number of electrode systems for the vertical transfer paths from the conventional 4 electrode systems to, for example, 6 electrode systems including the 4 discharge readout electrode systems.

Unlike interlace CCDs described above, progressive CCDs are capable of sequential readout of all the lines in a frame from the frontmost line, because a number of signal charges corresponding to the number of lines of photodiodes can be retained in each vertical transfer path. If omission readout is not to be performed, a single charge readout electrode system is sufficient. However, in cases where the function of omission readout is desired, another charge readout electrode system has to be added to enable the selective readout of lines. Therefore, including the total of two charge readout electrode systems, a progressive CCD requires an increase of the electrode systems for vertical transfer from the conventional 4 electrode systems to 5 electrode systems in cases of 4-phase drive, or from the conventional 3 electrode systems to 4 electrode systems in cases of 3-phase drive.

An increase in the number of charge readout electrodes complicates the wiring inside the CCD in proportion to the increase in the number of the electrode systems or increases the external CCD-drive circuits. In spite of these drawbacks, however, most multi-pixel CCDs have structures that call for a large number of electrode systems. One of the reasons is that there is no alternative method that may offer a lower cost.

There are conventionally known examples of image capturing apparatuses which are capable of switching between two modes: a full-pixel individual readout mode for reading the signal charge of each pixel and using the signal charges of all the pixels on the CCD in the manner described above, and an omission readout mode for selectively reading out the signal charges of only a part of the pixels on the CCD and abandoning the signal charges of the other pixels without using them. To be more specific, the full-pixel individual readout mode is used as a still-image mode principally intended for shooting still images, and the omission readout mode is used in cases that require driving at a high frame rate, such as shooting moving images, or for preliminary measurement, which is performed prior to a main shooting.

In addition to usual line-omission readout explained above, various methods of horizontal line-omission or line-summation readout have been offered for progressive CCDs, including one disclosed in Japanese Patent Provisional Publication No. 10-136244. These methods are broadly divided into three categories: (1) methods that call for reading out only 'n' number of lines out of 'm' number of lines (m>n, m≧3), (2) methods that call for summation of signal charges of 'n' number of lines out of 'm' number of lines to perform readout (m>n), and (3) methods that call for summation of signal charges of 'q' number of vertically extending lines. The aforementioned Japanese Patent Provisional Publication No. 10-136244 discloses a structure that is different from methods of simply omitting unwanted lines in that it is capable of improving the frame rate while it calls for summation of signal charges of a plurality of lines. Another example is disclosed in Japanese Patent Provisional Publication No. 10-210367, which relates to a structure that calls for individually reading and using the signal charges of all the pixels on the CCD to shoot a still image, and either omitting or summing up a part of the pixels on the CCD when shooting a moving image or a still image.

As described above, conventional methods that call for selectively reading out specific lines while omitting the other lines present the problem of reduced sensitivity, although they are capable of improving the frame rate. In other words, shooting a moving image in the omission readout mode in low-light conditions results in an image with a poor S/N (signal-to-noise ratio) quality due to insufficient sensitivity. When performing preliminary measurements such as photometry or focusing prior to a main shooting, too, the insufficient sensitivity causes drastic reduction in the resolution. Compensating for the insufficient sensitivity with emitting auxiliary light to perform preliminary measurements necessitates the use of a costly, bulky, very bright lamp, which requires a lot of electric power. Furthermore, when the sensitivity is not sufficiently high, it is not possible to reduce the exposure time for preliminary measurement while the measurement precision remains low. This may result in a considerably long lag in time, which is the time required from the moment the user intends to shoot to the moment exposure for the main shooting starts.

During shooting moving images, merely omitting lines may reduce the spatial frequency reproducibility and generate moiré, largely degrading the image quality. To be more specific, in the state where lines have been omitted, MTF (modulation transfer function) of the photographing lens remains unchanged, although the vertical spatial sampling frequency and the proportion of the opening have been reduced in proportion to the omitted lines. As a result, a conspicuous reflected distortion is generated, producing moiré, which is a phenomenon that may cause, for example, a subject having a pattern of closely spaced apart stripes to appear in coarse, large stripes—in other words, something quite different from the actual subject. This is an undesirable phenomenon for an image capturing apparatus.

As disclosed in Japanese Patent Provisional Publication No. 10-136244, one of the solutions to ameliorate this problem is to employ line-summation instead of merely omitting lines to improve the frame rate. Even when MTF is high in the state of the reduced spatial sampling frequency after line-omission, line-summation brings about the same effect as that of spatial filter processing by increasing the proportion of the opening and reducing high-range spatial sampling frequency components.

Line-summation can be performed most effectively by, for example, summation of five each lines of color filters of the same color to achieve a result that is equivalent to that which could be achieved by reading out all the pixels at a frame rate that is five times faster, instead of using a conventional omission readout method which calls for reading out only one-fifth of all the lines and omitting the remaining four-fifths to achieve a 5-fold increase in the frame rate. As the spatial filter is at its most effective while the signal charges of all the pixels contribute to image capturing, the proportion of the opening becomes exactly the same as that for still-image capturing.

However, Japanese Patent Provisional Publication No. 10-136244 does not provide a method of reading out the signal charges of all the pixels by reading out the signal charges of all the pixels by summation of signal charges on a plurality of lines of a like color in such a manner as described above. Although a process of full-pixel reading by summing up signal charges of lines that are adjacent to one another on either the vertical transfer paths or the horizontal transfer path is mentioned in the above patent document, such a process will cause an undesirable mixing of colors in cases of color CCDs, except for those having a vertical stripe filter arrangement. Such an undesirable mixing of colors not only greatly reduces the color reproducibility but, depending on which colors have become mixed, may also make it completely impossible to reproduce the original colors. Although there is no reference in the above mentioned Japanese Patent Provisional Publication No. 10-136244, let us suppose that the device disclosed therein is used for full-pixel readout by summation of a plurality of lines of the same color. For example, in the case of the aforementioned 5-line summation, there are two possible color combinations on each vertical column, given that the color is in the Bayer arrangement as is true in the case of said patent publication. As it is necessary to read each color pixel individually or read five pixels each of a like color, a total of 10 charge readout electrode systems are required. Therefore, a total of 12 vertical transfer electrode systems are required to perform vertical transfer driving. As explained above, a conventional 3-phase multi-pixel progressive CCD that is capable of 3-phase vertical transfer and omission readout has 4 vertical transfer electrode systems, and performing the line-summation readout necessitates addition of 8 external vertical transfer driving circuits corresponding to the 8 electrode systems, resulting in a considerable increase in the size of the entire CCD drive circuit. Furthermore, should the number of lines to be added increase in response to advances made in the number of pixels on the CCD, the number of electrodes for vertical transfer, too, increases accordingly. Such an increase in number of electrodes for vertical transfer is undesirable because of cost, the size of CCD, power consumption and other considerations.

In cases where shooting is performed in extremely bright conditions, there is the possibility of signal charges overflowing from the pixels to the vertical transfer paths, appearing in the form of streaks on the finished image. Such streaks are called smear and reduce the image quality, presenting a serious problem particularly with a line-summation readout rather than a normal omission readout mode.

Therefore, limiting the modes for capturing moving images to either omission readout or summation readout in the same manner as Japanese Patent Provisional Publication No. 10-210367 may degrade the image quality.

As described above, in cases where a multi-pixel image pickup device is used instead of an image pickup device to improve the image quality of a still image, omission of pixel signals is performed in order to increase the frame rate when shooting moving images. However, a simple procedure of selectively reading out only specific lines while omitting the other lines results in reduced image quality. On the other hand, applying a summation readout method that calls for summing up and using the signal charges of all the pixels to a conventional image pickup device complicates the structure of the image pickup device and increases its cost. Furthermore, depending on the method of summation of pixels, summation readout may produce smear, thereby degrading the image quality.

SUMMARY OF THE INVENTION

In order to solve the above problems, an object of the present invention is to provide a method of driving a solid-state image pickup device, which method calls for summation of charges of pixels of the same color and thereby enables the cost reduction with a simple structure and ensures superior image quality and high performance of the image pickup device while increasing the frame rate. Another object of the present invention is to provide an image capturing apparatus having such benefits as above.

A solid-state image pickup device driving method according to the present invention is a method of driving a solid-state image pickup device comprising a plurality of pixels that are provided with a photoelectric converting means and consist of pixels of a first color and a second color arranged in a given pattern, a plurality of first transfer paths for reading out and transferring signal charges of said pixels, and a second transfer path for reading out and transferring the pixels transferred from the first transfer paths, said method comprising a first summation process, a second summation process, and a sum output process, wherein the first summation process comprises steps of reading out to the aforementioned first transfer paths a plurality of pixels that constitutes all or a part of the pixels of the first color, and while retaining the signal charges of specific pixels of those read in the previous step described above by maintaining said specific pixels in the read-out state, transferring the other signal charges read in said previous step so as to add the transferred signal charges to the retained signal charges, thereby generating first summed charges; the second summation process comprises steps of reading out to the first transfer paths a plurality of signal charges of the pixels of the second color in the state where said first summed charges are located apart from where said plurality of signal charges of the pixels of the second color are going to be read, and summing up said signal charges of the pixels of the second color on either one of the first transfer paths or the second transfer path, or both the first transfer paths and the second transfer path, thereby generating second summed charges; and the sum output process calls for transferring and outputting said first summed charges and the second summed charges to and from the second transfer path.

According to the feature of the present invention described above, a plurality of signal charges of the pixels of the first color of a plurality of pixels arranged in a given pattern are read out to the first transfer paths, and while the signal charges of specific pixels of those read in the previous step described above are held retained by maintaining said specific pixels in the read-out state, the other signal charges read in said previous step are transferred so that the transferred signal charges are added to the retained signal charges. As a result, first summed charges are generated. Then, a plurality of signal charges of the pixels of the second color are read out to the first transfer paths and either summed up on the first transfer paths in the same manner as in the case of the pixels of the first color or read from the first transfer paths to the second transfer path and summed up thereon. The readout and summation of the signal charges of the pixels of the second color are performed by integrating transfer with selective readout so as to avoid the possibility of being added to said first summed charges. As a result of the abovementioned readout and summation, second summed charges are generated. The first and second summed charges thus generated are transferred to the second transfer path, from which they are output. As the number of pixel signal charges to be output are reduced compared with a method that calls for sequential readout and output of all the pixels, the frame rate is improved.

Furthermore, said reduction of the pixel signal charges can be performed by reading out all the pixels and summing up a plurality of charges of pixels of the respective same colors. Therefore, compared with a method that calls for merely selecting and reading out a part of the pixels, the method of the invention can easily improve the image quality.

A solid-state image pickup device driving method according to another feature of the present invention calls for performing said first and second summation processes with charges that have been read out to the first transfer paths being transferred in the forward or reverse direction.

As the first summed charges and the second summed charges can be output in a desired order, the method according to this feature expedites a process to be subsequently performed.

A solid-state image pickup device driving method according to yet another feature of the present invention calls for performing said second summation process with a plurality of charges of pixels of the second color being read out to given locations on the second transfer path.

According to the method having this feature, operation of readout and summation of signal charges of the first transfer paths can be performed in a relatively short period of time A solid-state image pickup device driving method according to yet another feature of the present invention is characterized in that a charge coupled device having charge readout electrodes respectively corresponding to the pixels is provided for the first transfer paths so that the aforementioned readout and retention are performed by applying charge readout voltages to said charge readout electrodes.

The first summation process according to the method having this feature comprises performing steps of reading out the signal charges of a plurality of pixels to the first transfer paths by applying charge readout voltages to a plurality of charge readout electrodes, and, thereafter, performing transfer along the first transfer paths while continuously applying charge readout voltages to specific charge readout electrodes.

A solid-state image pickup device driving method according to yet another feature of the present invention is characterized in that the manner of driving the solid-state image pickup device can be switched between the first driving mode and the second driving mode, said first driving mode provided to perform the aforementioned first summation process, second summation process, and sum output process, and the second driving mode provided to read out the charges of the respective pixels individually to the first transfer paths, individually transfer the read charges to the second transfer path, and output said charges from the second transfer path.

According to the method described above, the driving mode can easily be switched to the mode which enables the output of a high-resolution image by using all the individual pixels individually and the mode that is capable of high speed output by reduction of the pixel signal charges to be output.

A solid-state image pickup device driving method according to yet another feature of the present invention is characterized in that the first driving mode is the moving image mode for shooting a moving image and that the second driving mode is the still image mode for shooting a still image.

The method having this feature enables the output of high-resolution signals for a still image as well as the output of signals for a moving image of improved quality at a high frame rate.

An image capturing apparatus according to the present invention includes a solid-state image pickup device and a driving circuit for driving said solid-state image pickup device, said solid-state image pickup device including a plurality of pixels that are provided with a photoelectric converting means and consist of pixels of a first color and a second color arranged in a given pattern, and said driving circuit including a plurality of first transfer paths for reading out and transferring signal charges of said pixels, and a second transfer path for reading out and transferring the signal charges transferred from the first transfer paths, the driving circuit functions to read out onto the aforementioned first transfer paths a plurality of pixels that constitutes all or a part of the pixels of the first color, while retaining the signal charges of specific pixels of those read in the previous step described above by maintaining said specific pixels in the read-out state, transfer the other signal charges read in said previous step so as to generate first summed charges by adding the transferred signal charges to the retained signal charges, read out to the first transfer paths a plurality of signal charges of the pixels of the second color in the state where said first summed charges are located apart from where said plurality of signal charges of the pixels of the second color are going to be read, sum up said signal charges of the pixels of the second color on either one of the first transfer paths or the second transfer path, or both the first transfer paths and the second transfer path, thereby generating second summed charges, transfer said first summed charges and the second summed charges to the second transfer path, and output the first summed charges and the second summed charges from the second transfer path.

According to the feature of the present invention described above, a plurality of signal charges of the pixels of the first color of a plurality of pixels arranged in a given pattern are read out to the first transfer paths, and while the signal charges of specific pixels of those read in the previous step described above are retained by maintaining said specific pixels in the read-out state, the other signal charges read in said previous step are transferred so that the transferred signal charges are added to the retained signal charges. As a result, first summed charges are generated. Then, while avoiding the possibility of being added to said first summed charges, a plurality of signal charges of the pixels of the second color are read out to the first transfer paths and either summed up on the first transfer paths in the same manner as in the case of the pixels of the first color or read from the first transfer paths to the second transfer path and summed up thereon. As a result of these readout and summation, second summed charges are generated. The first and second summed charges thus generated are transferred to the it second transfer path, from which they are output. As a number of pixel signal charges to be output are reduced compared with a method that calls for sequential readout and output all the pixels, the frame rate is improved. Furthermore, said reduction of the pixel signal charges can be performed by reading out all the pixels and summing up a plurality of charges of pixels of the respective same colors. Therefore, compared with a method that calls for merely selecting and reading out a part of the pixels, the method of the invention can easily improve the image quality.

An image capturing apparatus according to another feature of the present invention includes a processing means that is capable of reversing the order of the first summed charges and the second summed charges output from the solid-state image pickup device.

As a result of the inclusion of a processing means for reversing the order of output signals, the first summed charges and the second summed charges, which result from summation of charges on the first transfer paths and/or the second transfer path, are not required to be output from the second transfer path in a specific order. In other words, it is sufficient to transfer signal charges in one direction, and there is no need of reverse transfer. Therefore, the structure described above is applicable to a CCD with a very low reverse transfer capability and thus has a wide range of use.

An image capturing apparatus according to yet another feature of the invention includes an image pickup device having a plurality of pixels that are provided with a photoelectric converting means and arranged in a given pattern, a control means for controlling said image pickup device, and an image processing means to which signal charges output from said image pickup device are input, wherein said control means is capable of switching in the course of shooting moving images between an omission readout mode, which calls for reading out the signal charges of a part of said image pickup device and outputting the read-out signal charges to said image processing means, and a summation readout mode, which calls for reading out the signal charges of the pixels of said image pickup device, summing up the signal charges of a plurality of pixels each, and outputting the summed-up signal charges to said image processing means.

When shooting moving images, the quality of the image can easily be improved by switching the mode between the omission readout mode and the summation readout mode in accordance with the shooting conditions or the subject of the shooting. Switching of the mode may be performed manually or automatically through control by the control means. Furthermore, as switching between the omission readout mode and the summation readout mode may be performed by means of controlling the image pickup device, the invention does not complicate the structure of the image capturing apparatus, and, therefore, enables the reduction of production costs.

An image capturing apparatus according to yet another feature of the invention is characterized in that the image pickup device is a CCD solid-state image pickup device having a plurality of pixels of a plurality of colors arranged in a given pattern and that the summation readout mode calls for summation of signal charges of a plurality of pixels of the respective same colors.

In addition to such benefits as increased image quality and processing speed, the structure described above permits use of a CCD solid-state image pickup device of an ordinary type and thereby enables the reduction of production costs.

An image capturing apparatus according to yet another feature of the invention includes an image pickup device having a plurality of pixels that are provided with a photoelectric converting means and consist of pixels of a plurality of colors arranged in a given pattern, a control means for controlling said image pickup device, and an image processing means to which signal charges output from said image pickup device are input, wherein said control means is capable of switching during preliminary measurements between an omission readout mode, which calls for reading out the signal charges of a part of said image pickup device and outputting the read-out signal charges to said image processing means, a summation readout mode, which calls for reading out the signal charges of the pixels of said image pickup device, summing up the signal charges of a plurality of pixels of the respective same colors, and outputting the summed-up signal charges to said image processing means, and a mixed-color summation readout mode, which calls for reading out the signal charges of the pixels of said image pickup device, summing up the signal charges of a plurality of pixels of different colors, and outputting the summed-up signal charges to said image processing means.

When performing preliminary measurements, effective data for the main shooting can be obtained through automatic control by the control means to switch the driving mode between the omission readout mode, the summation readout mode, and mixed-color summation readout mode in accordance with the shooting conditions or the subject of the shooting. As a result, the main shooting can provide an image with improved quality.

To drive the image pickup device, the control means of an image capturing apparatus according to yet another feature of the invention is adapted to switch the driving mode between the summation readout mode and the omission readout mode in accordance with the light level of the shooting conditions.

Therefore, by switching between the two modes in accordance with the light level of the shooting conditions, an image capturing apparatus having a feature described above is capable of high speed processing or, by switching to the summation readout mode in low-light conditions, shooting an image of higher quality than when shooting in the omission readout mode.

The control means of an image capturing apparatus according to yet another feature of the invention is adapted to detect a possibility of generation of moiré and drive the image pickup device in the summation readout mode when there is the possibility of generation of moiré, and in the omission readout mode in the other situations.

Therefore, by switching the driving mode from the omission readout mode to the summation readout mode depending on the subject of shooting, an image capturing apparatus having a feature described above is capable of preventing or limiting moiré, thereby ensuring high image quality.

The control means of an image capturing apparatus according to yet another feature of the invention is adapted to detect a possibility of generation of smear and drive the image pickup device in the omission readout mode when there is the possibility of generation of smear, and in the summation readout mode in the other situations.

Therefore, by switching the driving mode from the summation readout mode to the omission readout mode depending on the subject of shooting, an image capturing apparatus having a feature described above is capable of preventing or limiting degradation of image quality by smear, thereby ensuring high image quality.

An image capturing apparatus according to yet another feature of the invention includes a saturation preventing means adapted to be controlled by the control means to prevent saturation of signals in the image pickup device when the image pickup device is being driven in the summation readout mode.

As a result of inclusion of a saturation preventing means the structure described above is capable of preventing saturation of signals in the image pickup device in the summation readout mode, thereby offering improved image quality. Furthermore, as there is no need of a special image pickup device having a large capacity, production costs can be held down.

The control means of an image capturing apparatus according to yet another feature of the invention is adapted to switch the driving mode between an omission readout mode, which calls for reading out the signal charges of a part of said image pickup device and outputting the read-out signal charges to said image processing means, a summation readout mode, which calls for reading out the signal charges of the pixels of said image pickup device, summing up the signal charges of a plurality of pixels, and outputting the summed-up signal charges to said image processing means, and a full-pixel individual readout mode, which calls for individually reading out and using the signal charges of nearly all the pixels of said image pickup device.

An image capturing apparatus having this feature is capable of shooting still or other images by using the full-pixel individual readout mode, and performing functions that necessitate a high frame rate, such as shooting a moving image or preliminary measurements, in the omission readout mode or the summation readout mode.

DETAILED DESCRIPTION OF THE PREFERRED EMBODIMENT

Next, a method of driving a solid-state image pickup device and the example of an image capturing apparatus embodying the present invention are explained hereunder, referring to the relevant drawings.

Figure 1:
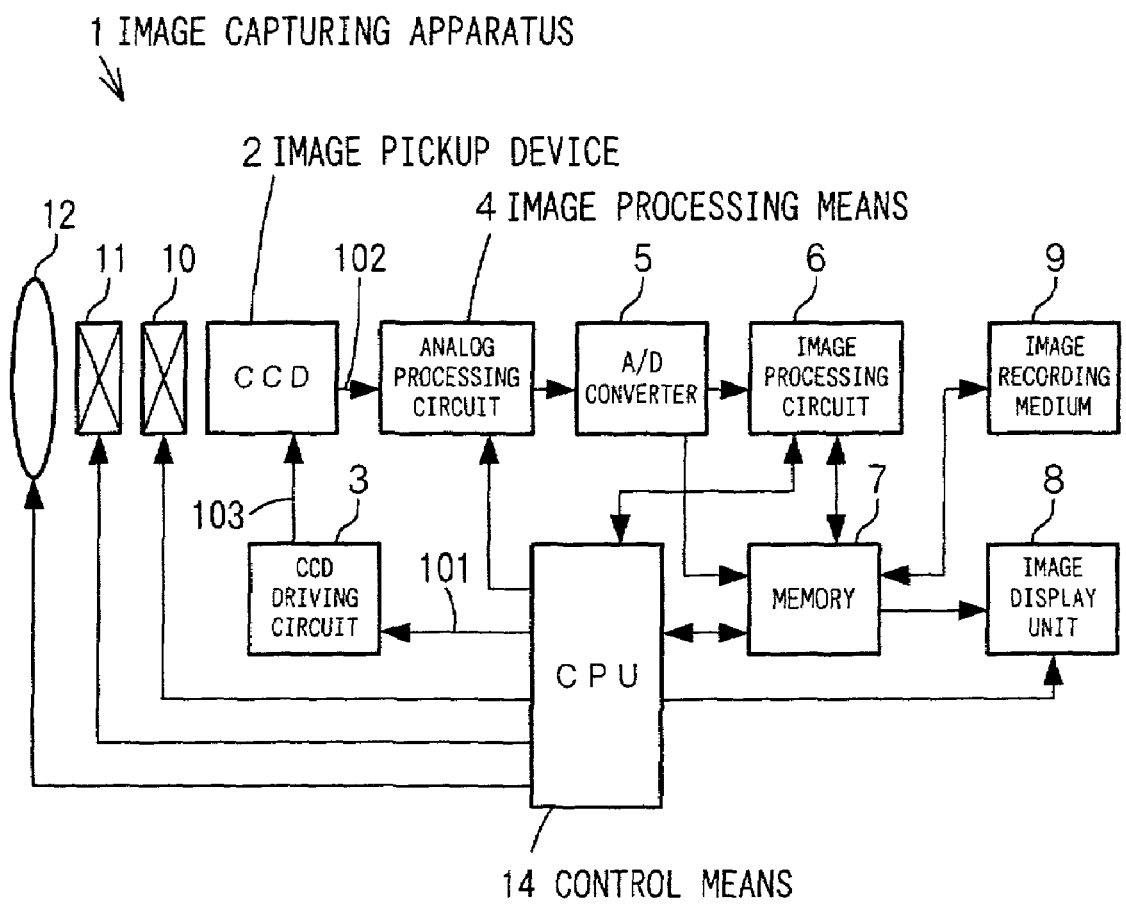
FIG. 1 is a block diagram of a first example of an image capturing apparatus embodying the present invention.

Referring to FIG. 1, numeral 1 denotes an image capturing apparatus, which may be a so-called digital camera or a movie camera. In other words, the image capturing apparatus 1 is an image capturing apparatus used for both shooting still images and shooting moving images and is capable of recording and displaying images.

The image capturing apparatus 1 is provided with a CCD 2 as an image pickup device, a CCD driving circuit 3 for driving the image pickup device CCD 2, an analog processing circuit 4, an A/D converter 5, an image processing circuit 6, a memory 7, an image display unit 8 for displaying the contents of the memory 7, an image recording medium (recording device) 9 for recording the contents of the memory 7, components that form an optical system, a CPU 14 that constitutes a control means, and other components that are not shown in the drawings, including a housing, a power supply unit, input and output terminals, and operating means such as a release button, switches, etc. The aforementioned analog processing circuit 4 forms an image processing means into which signals output from the CCD 2 shall be sequentially input. The components forming optical system comprise an aperture 10, a mechanical shutter 11, and a lens 12.

The CPU 14 is what is commonly called a microprocessor and controls the entire system. According to the present example, the CPU 14 functions to control the F-number of the aperture 10, opening/closing of the mechanical shutter 11, the focus of the lens 12, driving of the CCD 2 (this is performed through control of the CCD driving circuit 3), the analog processing circuit 4, the image processing circuit 6, and the image display unit 8, and also perform such other functions as processing data to be recorded to the memory 7, as well as recording/reading of image data to or from the image recording medium 9.

For example, when capturing a moving image, the CPU 14 releases the mechanical shutter 11 and controls the F-number of the aperture 10 to adjust the intensity of the light that strikes the CCD 2. The CPU 14 also adjusts an electronic shutter of the CCD 2 to control the amount of exposure.

The CCD 2 of the present example is an CCD image sensor using a charge-coupled device, which is typically used in an image capturing apparatus, such as a digital camera or a movie camera. As will be explained later, the CCD 2 has a pixel structure shown in FIG. 2. To be more specific, it is an interlace scanning CCD of a color, single-plate multi-pixel interline type in a normal color filter arrangement and permitting so-called Bayer arrangement omission readout. One of the particular features of this CCD 2 lies in that it is capable of both capturing still images and capturing moving images and is therefore used in a still/moving image capturing apparatus. To capture still images, the CCD 2 reads all the pixels individually by functioning in collaboration with the mechanical shutter. However, as it is designed to handle a far greater number of pixels compared with a CCD dedicated to moving image pickup, it permits omission readout that calls for selectively reading the pixels on only one-fifth of all the horizontal lines to capture moving images. Thus, in spited of the great number of pixels to be handled, a high frame rate (the number of frames per unit of time) can be maintained while shooting moving images.

The CCD 2 is adapted to be driven based on drive signals 103 from the CCD driving circuit 3 and output to the analog processing circuit 4 analog image signals 102 resulting from photo-electric conversion of the light representing an image of the subject. The analog processing circuit 4 consists of a correlated double sampling means and a gain control amplifier and functions to remove noises from or amplify analog image signals output from the CCD 2. At this stage, the CPU 14 controls the degree of amplification by the gain control amplifier of the analog processing circuit 4 or other functions of the analog processing circuit 4.

The output signals from the analog processing circuit 4 are input into the A/D converter 5, where they are converted into digital signals. The image signals thus converted into digital signals are either input into the image processing circuit 6 or directly stored in the memory 7 for the time being to be processed later. Image signals that have been input in the image processing circuit 6 undergo image processing and then output into the memory 7, and they are subsequently either displayed on the image display unit 8 or, according to operation by the user, recorded in the image recording medium 9 as a moving image or a still image.

Next, the structure of the CCD 2 and how it is driven are explained in outline hereunder.

Figure 2:
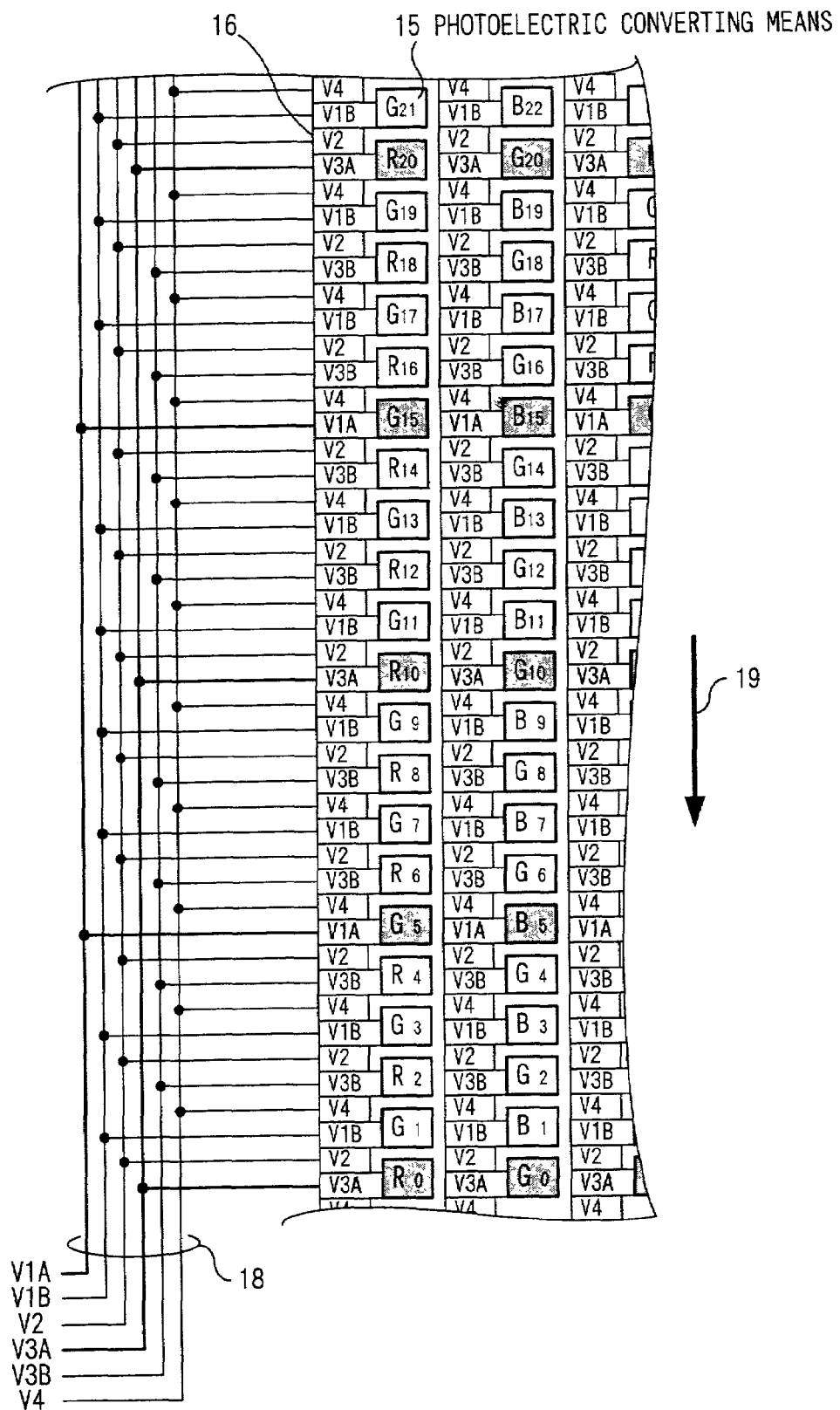
FIG. 2 is a schematic illustration showing a part of the internal structure of a CCD of said image capturing apparatus.

As shown in FIG. 2, drive signals output from the CCD driving circuit 3 to the CCD 2 include signals supplied to vertical transfer path gate electrodes V1A,V1B,V2,V3A, V3B,V4, which are adapted to receive vertical transfer path gate signals. The CCD driving circuit 3 also functions to receive driving-mode switching signals 101 from the CPU 14 and change the driving mode of the CCD2 based on the driving-mode switching signals 101 thus input into the CCD driving circuit 3. According to the present invention, the CCD 2 is switched between three driving modes: the omission readout mode (the first driving mode), the summation readout mode (the second driving mode), and the full-pixel individual readout mode (the third driving mode).

The vertical transfer path gate electrodes of the CCD are arranged so as to permit selective readout of a part of the pixels (R0, G5, R10, G15, . . . G0, B5,G10,B15 . . . , which are shown in shaded tone in FIG. 2). Therefore, although the CCD 2 is a multi-pixel CCD, a high frame rate can be obtained by omission readout of pixels (in other words lines).

Figure 14:
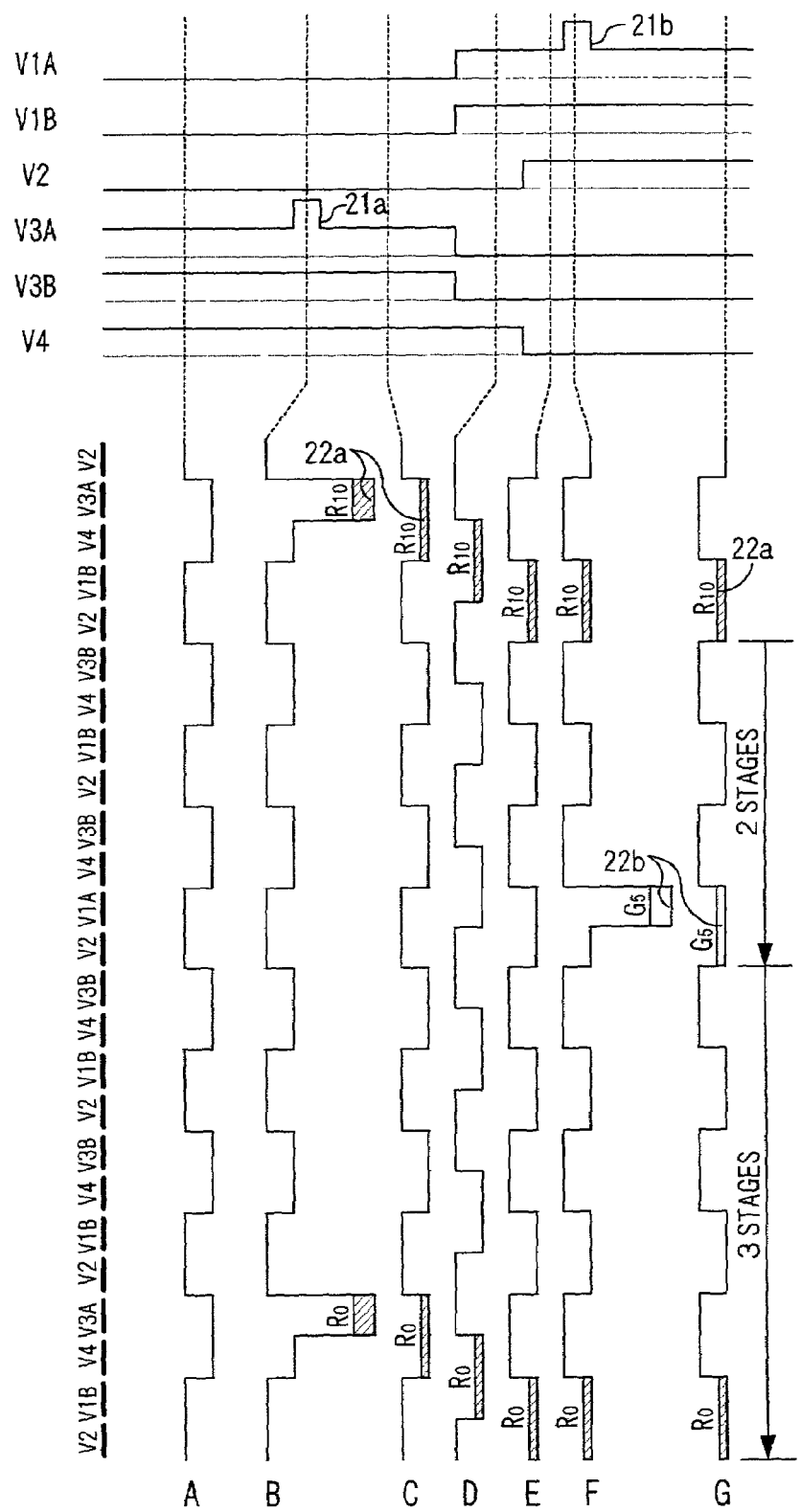
FIG. 14 is a schematic illustration to explain the omission readout mode of said CCD of the image capturing apparatus.

With the CCD 2 of the present example of the image capturing apparatus 1, omission readout is performed as shown in FIG. 14; to be more specific, voltages are applied to the vertical transfer path electrodes so that signal charges are read to the vertical transfer paths, and, thereafter, one-fifth of all the horizontal lines, in other words one-fifth of the full pixels, are selectively read out by repeating a set of transfers consisting of a 3-stage vertical transfer, a horizontal transfer, a 2-stage vertical transfer, and a horizontal transfer. The omission readout mode has a feature of a high frame rate five times faster than in the case of reading out all the pixels individually and normally used for shooting or displaying moving images. A user of the image capturing apparatus 1 may also use the omission readout mode to quickly obtain images for preliminary measurements, such as measuring the luminance of the subject or focusing, during the period from the time the user depresses the release button to the time the main shooting is done.

Figure 15:
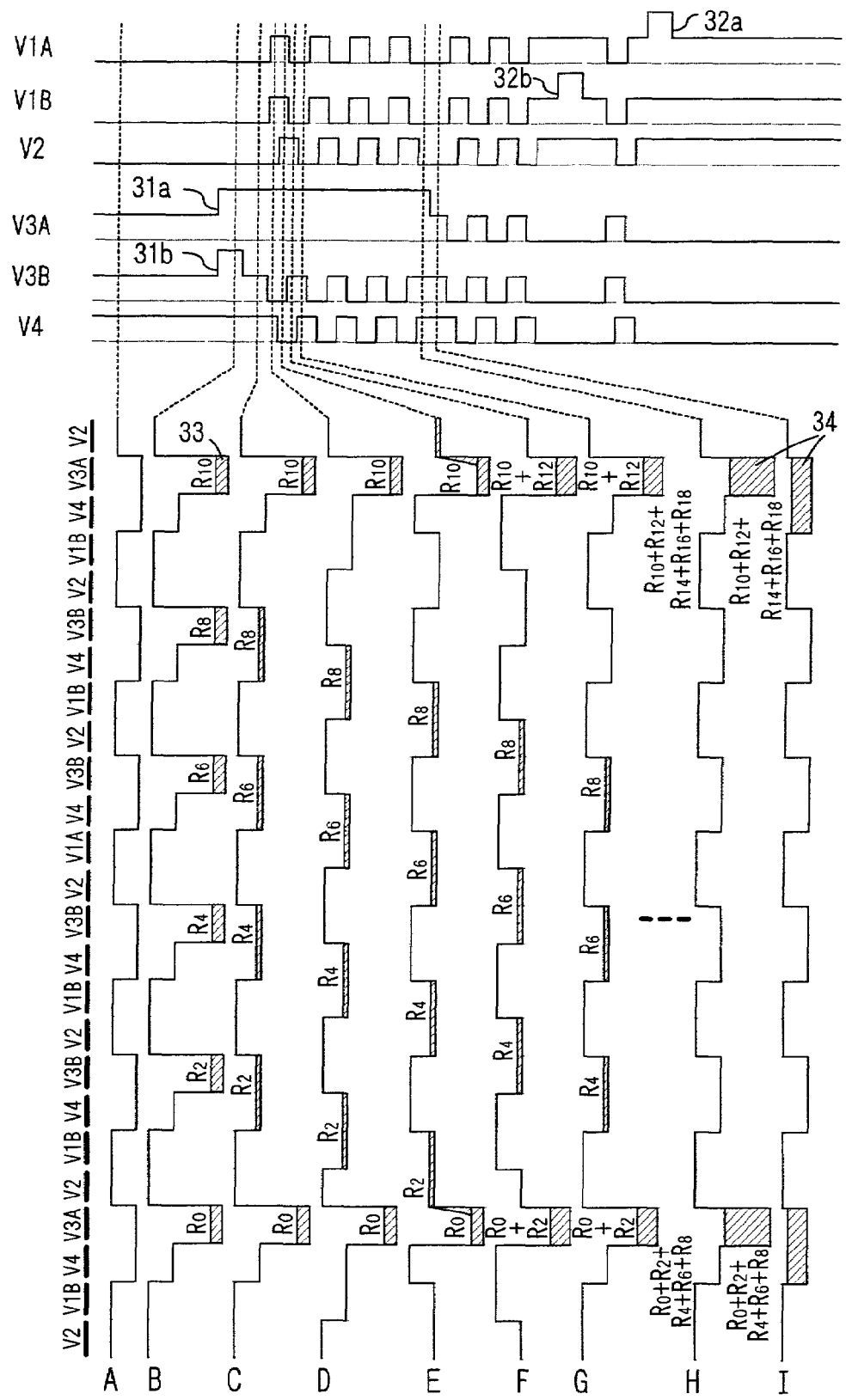
FIG. 15 is a schematic illustration to explain the summation readout mode of said CCD of the image capturing apparatus.
Figure 16:
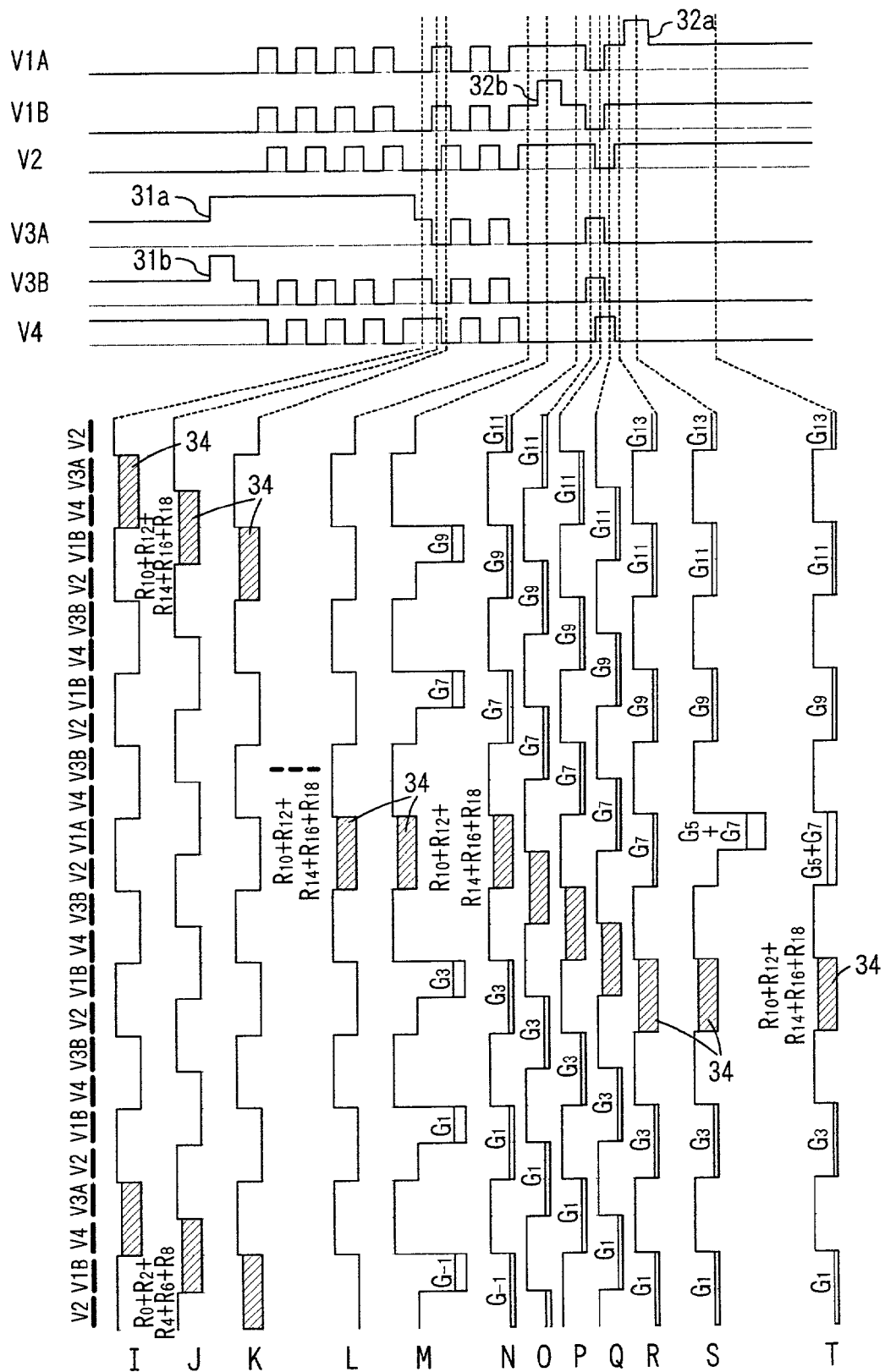
FIG. 16 is a schematic illustration to explain the summation readout mode of said CCD of the image capturing apparatus.
Figure 30:
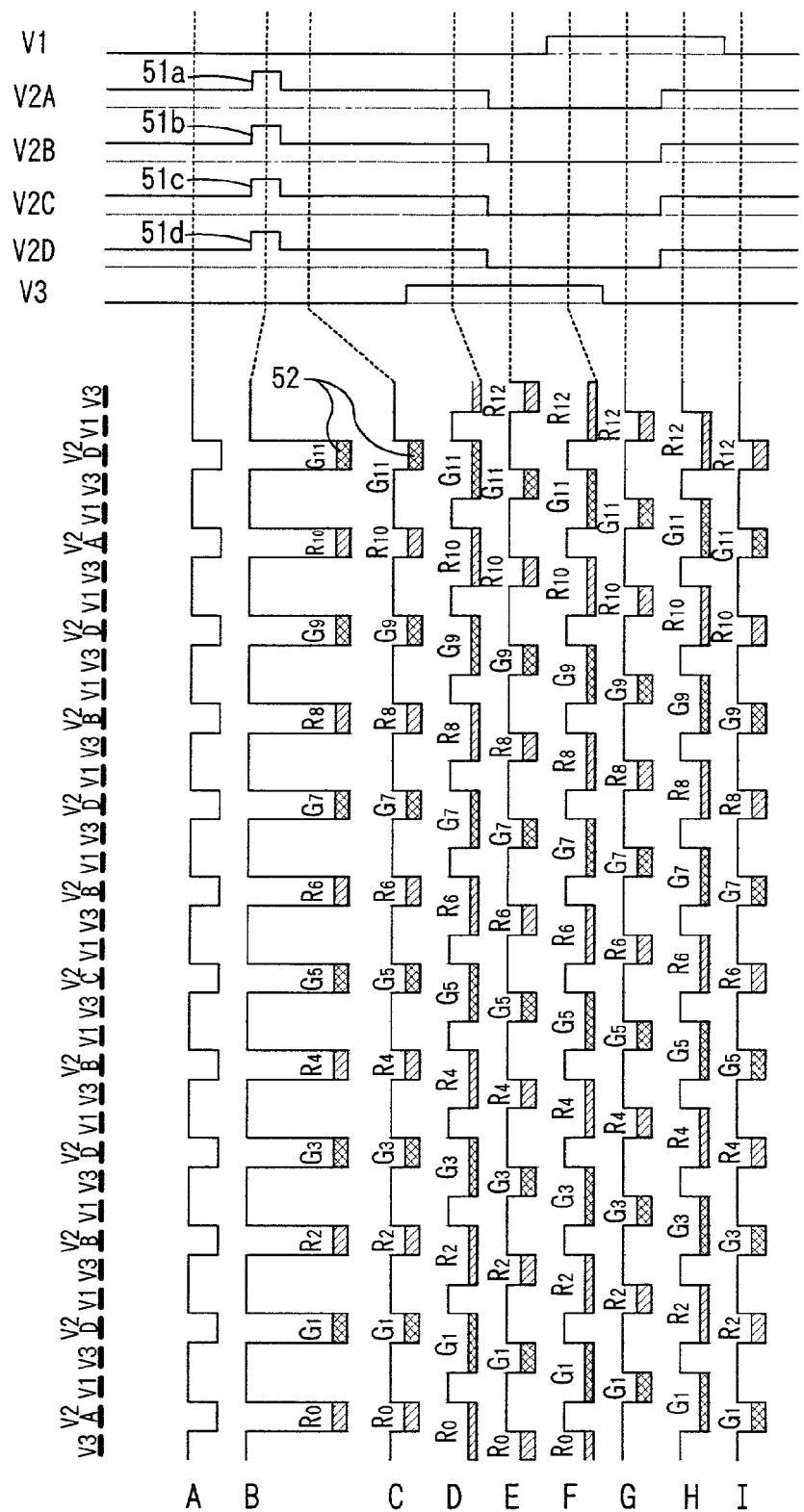
FIG. 30 is a schematic illustration to explain the full-pixel individual readout mode of said CCD.
Figure 31:
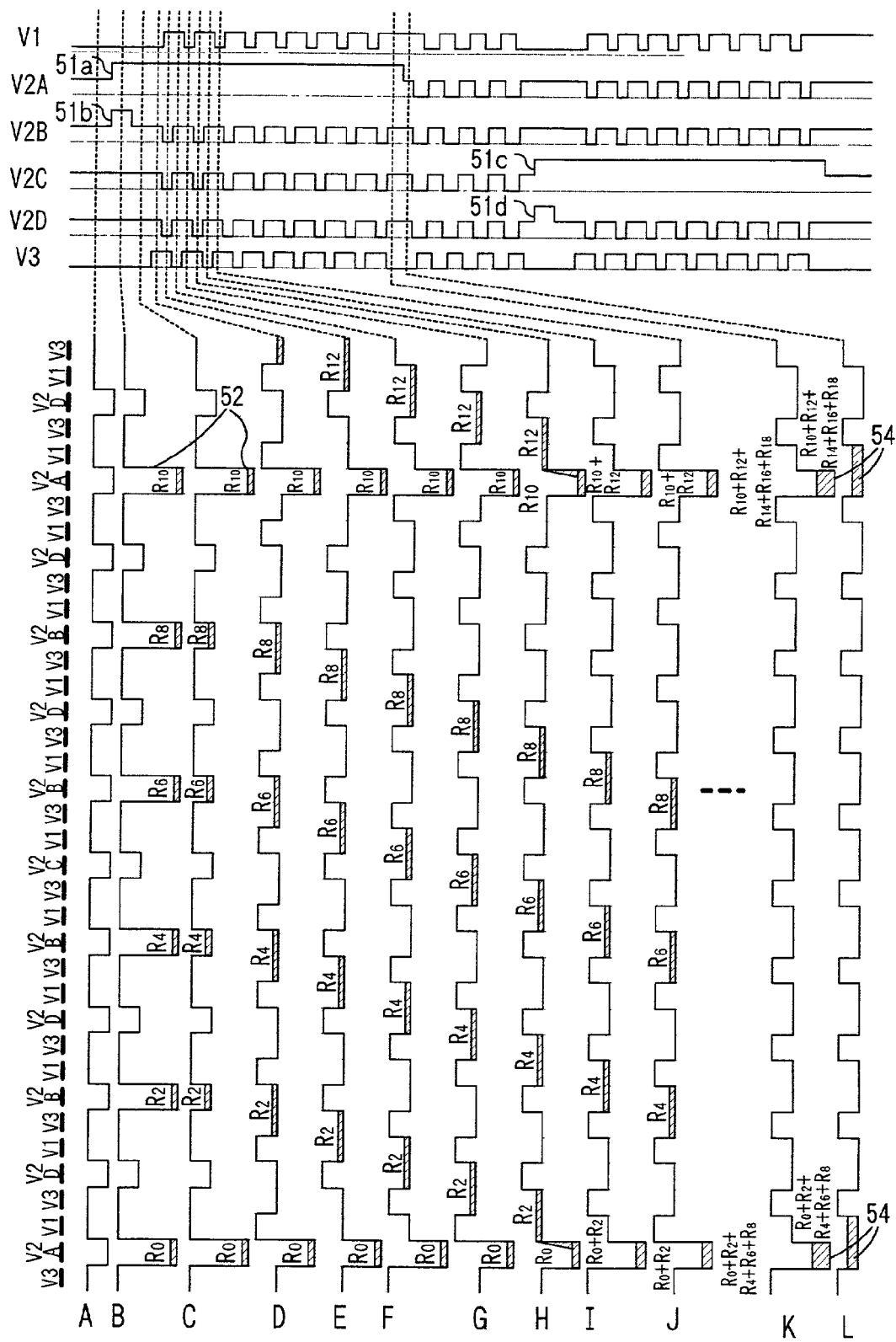
FIG. 31 is a schematic illustration to explain the summation readout mode of said CCD of the image capturing apparatus.

The summation readout mode realized by the CCD 2 may be called a like-color summation full-pixel readout mode and performed either as shown in FIGS. 15 and 16 or as shown in FIGS. 30 and 31. To be more specific, the process shown FIGS. 15 and 16 calls for applying voltages to the vertical transfer path electrodes so that signal charges are read to the vertical transfer paths, and, thereafter, repeating a set of transfers consisting of a 1-stage vertical transfer, a horizontal transfer, a 4-stage vertical transfer, and a horizontal transfer. The process shown FIGS. 30 and 31 calls for applying voltages to the vertical transfer path electrodes so that signal charges are read to the vertical transfer paths, and, thereafter, repeating a set of transfers consisting of a 4-stage vertical transfer, a horizontal transfer, a 1-stage vertical transfer, and a horizontal transfer. By repeating either process, signal charges corresponding to 5 pixels each of a like color are summed up without inadvertently being mixed with signal charges of pixels of another color. As a result, the signal charges of all the pixels can be read out at a frame rate five times faster than in the case of reading out all the pixels individually. To perform the driving process shown in FIGS. 15 and 16, it is necessary to provide a line buffer in the image processing circuit 6, located downstream from the CCD 2 or rearrange the order of input lines by using the memory 7 so that the order of the lines are rearranged in accordance with whether the line is an odd-numbered line or an even-numbered line. The process shown in FIGS. 15 and 16 and the process shown in FIGS. 30 and 31, consequently, are both capable of achieving an effect that is equivalent to a 5-fold increase in the sensitivity compared with the aforementioned omission readout mode for selecting one-fifth of the pixels, and also capable of obtaining image signals at the same frame rate in nearly the same output conditions as those for the omission readout mode for selecting one-fifth of the pixels. In the summation readout mode, the CCD 2 is driven in such a way that vertical transfer is performed while charge readout pulses (31a in FIG. 15 or 31a, 32a in FIG. 30) are being output. Thus, summation of a plurality of pixels can be done on the vertical transfer paths. Therefore, as is true with the omission readout mode, the summation readout mode, too, realizes a high frame rate and is most suitable to be used for shooting or displaying a moving image or preliminary measurement before a main shooting.

Figure 12:
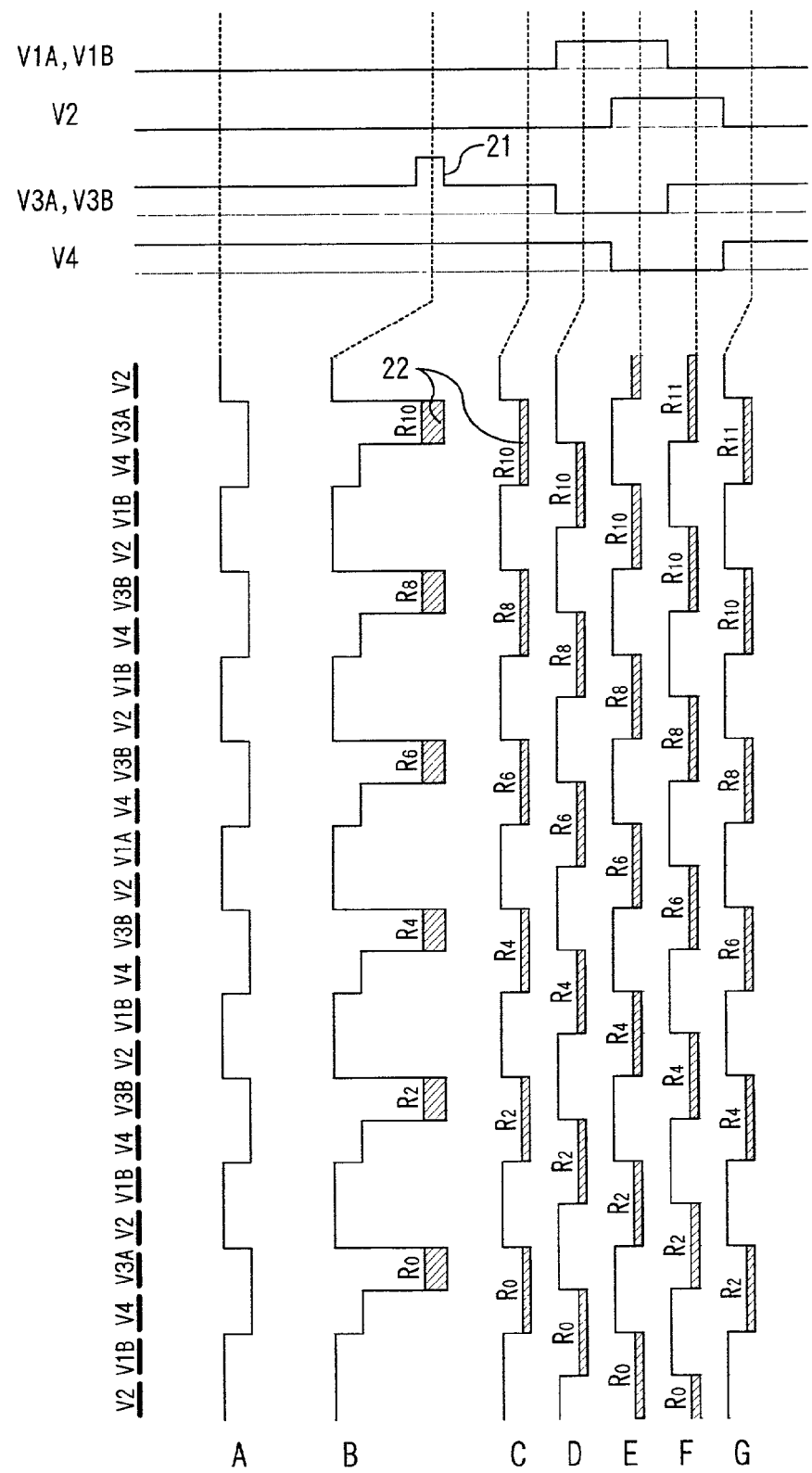
FIG. 12 is a schematic illustration to explain the full-pixel individual readout mode of a first example of a CCD of an image capturing apparatus according to the present invention.
Figure 13:
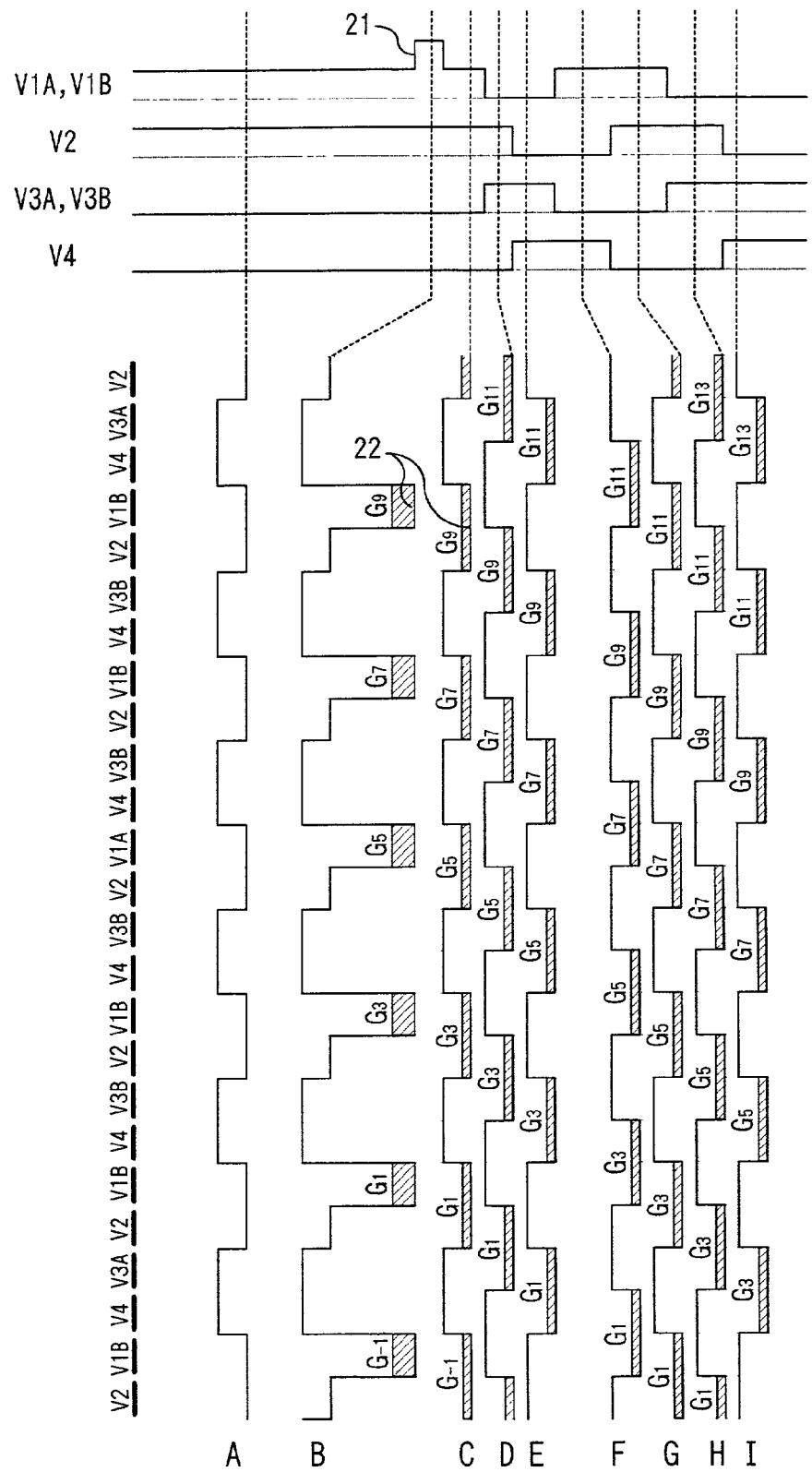
FIG. 13 is a schematic illustration to explain said full-pixel individual readout mode of said CCD of the image capturing apparatus.

As shown in FIGS. 12 and 13, the full-pixel individual readout mode with the CCD 2 calls for individually reading all the pixels on the CCD 2 by using two fields. This mode is not suitable for capturing moving images for various reasons: each frame is divided into two fields which consist of even-numbered lines and odd-numbered lines respectively; to operate in this mode, a physical light shielding means, such as a mechanical shutter 11 is necessary; and the frame rate is very slow. However, as it calls for individually reading all the pixels on a multi-pixel CCD, this mode provides an ideal still image with extremely high resolution.

Next, how switching of the readout mode is performed is explained hereunder.

An explanation is given of how the first example of the image capturing apparatus 1 described above automatically switches between the omission readout mode and the summation readout mode to capture moving images or other necessary function by using the luminance of the subject as the evaluation criteria.

First, through the CCD driving circuit 3, the CPU 14 puts the CCD 2 in the initial state by causing the CCD 2 to function in the summation readout mode (the second driving mode). As the summation readout mode has a feature of a high sensitivity compared with the omission readout mode, it is most suitable for indoor shooting or night shooting. Even in low-light conditions where shooting in the omission readout mode would require an increase of the gain of the analog processing circuit 4 and result in a reduced S/N and substantially degraded image quality, the 5-fold increase in the sensitivity realized by the summation readout mode makes it possible to maintain a high S/N while the gain remains at a low level. In this initial state, image signals output from the CCD 2 pass through the analog processing circuit 4, the A/D converter 5, the image processing circuit 6, and the memory 7, and remain displayed on the image display unit 8 in real time. When the user depresses the release button, i.e. the shutter release button, which is not shown in the drawings, or otherwise tries to shoot a moving image in this stage, moving image data for the intended period is recorded in the image recording medium 9. Furthermore, throughout the period of shooting a moving image, the subject luminance keeps changing due to various factors, such as panning of the image capturing apparatus 1, movement or action of the principal subject, or changes in the situation of other factors in the image frame of other than the principal subject. Therefore, in order to maintain an appropriate amount of exposure of the CCD 2, the present example keeps the CPU 14 controlling exposure by controlling the aperture 10 or the electronic shutter of the CCD 2, or, depending on circumstances, the gain of the analog processing circuit 4. To be more specific, the CPU 14 periodically monitors the data of images that are being successively recorded and updated to the memory 7 and constantly monitors exposure conditions of the CCD 2. When the CCD 2 judges that the amount of exposure is insufficient, in other words the image is too dark, the CPU 14 controls the aperture 10 to reduce the F-number, thereby increasing the intensity of the light that strikes the CCD 2. In contrast, when the CCD 2 judges that the amount of exposure is excessively large, in other words the image is too bright, the CPU 14 controls the aperture 10 to increase the F-number, thereby reducing the intensity of the light that strikes the CCD 2. However, there is no aperture mechanism that permits unlimited adjustments of the F-number; when the brightness exceeds a given level, it becomes impossible to control the CCD 2 within an appropriate exposure range by merely changing the F-number of the aperture 10. Should such a situation arise, the CPU 14 activates the electronic shutter of the CPU 14 through control of the CCD driving circuit 3 so as to limit the intensity of the light exposure within an appropriate range by using the degree of the electronic shuttering to eliminate the excess light that the aperture 10 has failed to shut out.

However, an interline CCD presents a problem in that exposure control by an electronic shutter aggravates the signal-to-smear ratio. To be more specific, while the time for storing image signal charges is reduced by the electronic shutter, the amount of smear produced on the vertical transfer paths remains at a constant level regardless of an action of the electronic shutter. Therefore, the more the exposure time is reduced by the electronic shutter, the worse the signal-to-smear ratio. In other words, in proportion to the increase in the electronic shutter speed, the influence of the smear that appears on the image worsens. According to the present example, vertical transfer in the normal omission readout mode is performed by repeating a set of transfers of signal charges along the vertical transfer paths on which smear has accumulated, said set consisting of a 3-stage vertical transfer and a 2-stage vertical transfer. However, as vertical transfer in the summation readout mode calls for repeating either a set of transfers consisting of a 4-stage vertical transfer and a 1-stage vertical transfer or a set of transfers consisting of a 1-stage vertical transfer and a 4-stage vertical transfer, a great difference arises between the amount of smear produced on each odd-numbered line and its adjacent even-numbered line. Depending on the method of image processing performed after the vertical transfer, there arises the possibility of the smear producing lateral stripes resulting from a difference in luminosity, and consequently reducing the image quality.

In order to prevent this problem, the CPU 14 according to the present example measures the amount of exposure of the CCD2 and, when the shutter speed of the electronic shutter of the CCD 2 which the CCD driving circuit 3 is commanded by the CPU 14 to output exceeds a given level (in other words when the number of electronic shutter pulses output from the CCD driving circuit 3 exceeds a given level), the CPU 14 commands the CCD driving circuit 3 to switch the mode of driving the CCD 2 from the summation readout mode to the omission readout mode. By thus using the omission readout mode, degradation of image quality by smear can be minimized without depending on the method of image processing.

As described above, the present example of the image capturing apparatus 1 offers high quality and high performance by providing two modes of driving a multi-pixel CCD 2 at a high frame rate and appropriately switching between the two driving modes. In other words, as a result of adoption of the summation readout mode (like-color summation full-pixel readout mode) in addition to the omission readout mode, the present example of the image capturing apparatus 1 offers performance that is improved overall by appropriately switching between the two modes so as to make use of merits of both modes and compensate for shortcomings of each mode.

To be more specific, the present example calls for switching the mode of driving the CCD 2 based on the light level of the shooting conditions during shooting of moving images in such a manner as to switch the mode to the summation readout mode in low-light conditions or back to the conventional omission readout mode in sufficiently bright conditions. By thus switching the mode, the increased sensitivity results in improved image quality in low-light conditions, and, in bright conditions, limiting the generation of smear that would otherwise degrade the image quality ensures at least the same image quality as that offered by conventional apparatuses.

The CDD 2 used in the present example of the image capturing apparatus 1 is not of a special type; a fairly common interlace CCD of a color interline type that permits omission readout and is widely used in an electronic still camera or the like for both capturing moving images and capturing still images can be used unchanged. By using such a common CCD 2 and improving the image quality by switching the mode of driving the CCD 2, production costs can be reduced.

As described above, the present example of the image capturing apparatus 1 is capable of automatically switching between the omission readout mode and the summation readout mode. However, the image capturing apparatus 1 also permits the user to switch the driving mode from the summation readout mode to the omission readout mode manually (in other words by operating a switch not shown in the drawings) in the event where the user finds an unacceptable smear on the image display unit 8 or the like.

There may arise in the course of driving the CCD 2 in the omission readout mode a situation where it becomes so dark that the gain of the analog processing circuit 4 is increased to compensate for the insufficient sensitivity. The increase in the gain of the analog processing circuit 4 results in reduced the S/N ratio. However, even if the S/N ratio is reduced so low that noises in the image displayed on the image display unit 8 or the like become unacceptable, the present example of the image capturing apparatus 1 permits the user to manually switch the driving mode from the omission readout mode to the summation readout mode.

As explained in detail later, the summation readout mode, i.e. the like-color summation full-pixel readout mode, is a mode of driving a CCD image pickup device by performing vertical transfer in the state charge readout voltages are applied to specific charge readout electrodes so that signal charges of pixels of the same color are summed up on vertical transfer paths. As signal charges of pixels that would be abandoned in the omission readout mode are thus summed up and used, consequently, all the pixels are read. According to the driving method described above, image signals can be obtained at the same frame rate in nearly the same output conditions as those in the omission readout mode, and, therefore, switching between the two modes can be done very easily.

Figure 3:
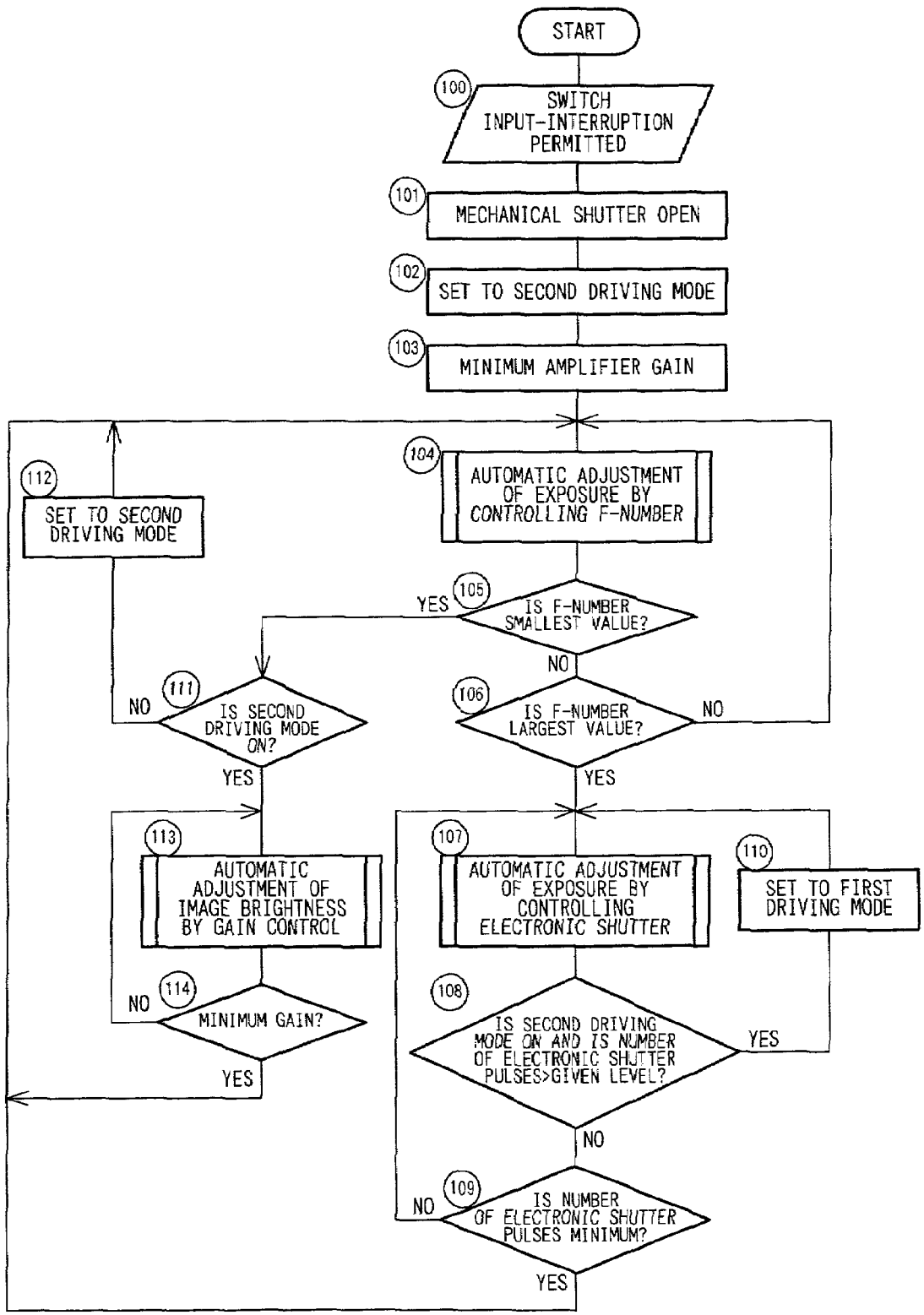
FIG. 3 is a flow chart illustrating operation of said image capturing apparatus.

Next, the function of the first example described above is explained hereunder, referring to the flow chart shown in FIG. 3. This flow chart is made based on the supposition that the image capturing apparatus 1 is either in the standby mode for shooting moving images or keeps displaying data of moving images that are being sequentially output from the CCD 2 shown in FIG. 1 on the image display unit 8 in real time to perform an electronic view-finding for shooting a till image. Furthermore, the flow chart is based on the assumption that the image capturing apparatus 1 will switch from the state described above to a moving image shooting sequence or a still image shooting sequence, or manually fixed by the user to the omission readout mode or the summation readout mode described above by operating one of the various switches (SW). Therefore, at the initial stage (Step 100), the initial state of each switch (SW) is ascertained, and various settings are executed so as to give each switch (SW) permission for later interruption. For example, should the CPU 14 detect an interruption signal indicating that the release button has been depressed, the CPU 14 immediately switches to the routine for still image capturing. When the CPU 14 detects that the switch (SW) for fixing the CCD 2 into the summation readout mode has been turned on, the CPU 14 prohibits the CCD 2 from switching to the omission readout mode thereafter.

In cases where no switch (SW) has been detected in Step 100, the mechanical shutter is released (Step 101); the CCD driving mode is set to the summation readout mode (Step 102); image pickup action by the CDD2 is initiated, and the amp-gain of the analog processing circuit 4 is set to the minimum value in the predetermined range (Step 103). Then, feedback exposure control by controlling the F-number of the aperture 10 (Step 104-106) is initiated. After the exposure control, in cases where the CPU 14 finds that the F-number is not less than a given value (Step 105) and that the F-number has reached the largest value (Step 106), the CPU 14 switches to exposure time control by the electronic shutter (Step 107-109), because merely using the F-number is insufficient to perform further control of exposure. However, in cases where the CPU 14 detects that the exposure period by the electronic shutter has become shorter than a given length (in other words the number of the electronic shutter pulses has increased to more than a predetermined value) and thereby ascertains the danger of generation of smear (Step 108), the CCD 2 driving mode is switched from the summation readout mode to the omission readout mode (Step 110) so that the electronic shutter pulses are reduced.

In the state where the CCD 2 is in the omission readout mode (the first driving mode), when the CPU 14 detects that the number of the electronic shutter pulses has been reduced to the minimum value (Step 109), exposure control to control the F-number of the aperture 10 is performed (Step 104-106). In cases where the CPU 14 ascertains that the shooting condition is darker than a given level, in other words the F-number is either at its smallest value or not more than the predetermined value (Step 105), the driving mode is again set in the summation readout mode.

Should the intensity of the light be insufficient even for the summation readout mode (Step 111), the gain of the analog processing circuit 4 is adjusted to compensate for the shortage of the intensity of the light (Step 113-114). When the set gain of the analog processing circuit 4 is ascertained to have reached the smallest value in the predetermined range (Step 114), in other words, when the presence of at least a given intensity of the light is detected, the CPU 14 returns to feedback exposure control by controlling the F-number of the aperture 10 (Step 104-106).

As described above, the mode of driving the CCD 2 may be automatically switched between the omission readout mode and the summation readout mode, or the user may select either mode by manually operating the appropriate switch (SW) whereupon the selection remains unchanged.

Although the explanation of the first example is given as above referring to a process of shooting a moving image, the above function of the present example is also applicable to shooting a still image if the resolution is low.

In short, an image capturing apparatus of the present example, which includes a color interline type CCD image pickup device that permits omission readout, is used for shooting a still image or a moving image with a low resolution, the image capturing apparatus is capable of providing an image with a high sensitivity and a high S/N, neither of which can be obtained by any conventional method. In bright conditions where smear tends to occur, it is also possible to switch the driving mode to the conventional mode, which is less prone to degraded image quality due to smear. Thus, the image capturing apparatus of the present example is capable of producing images of high quality overall under any shooting condition.

Next, the second example of the image capturing apparatus is explained.

The second example of the image capturing apparatus 1 has the same structure as that of the first example shown in FIG. 1 in that the manner of signal flow, as well as the function and the manner of operation of each component, are the same as those of the first example. In this example, however, the omission readout mode and the summation readout mode are alternately used for performing preliminary measurements (preliminary shootings) prior to the main shooting of a still image or a moving image.

In the present field of digital still cameras or the like, a CCD that is meant for main shooting is also used for focusing or measuring the intensity of the light in order to reduce the production cost of the camera. The outline of such preliminary measurements performed prior to, for example, shooting a still image is now explained, referring to the time chart shown in FIG. 4.

Figure 4:
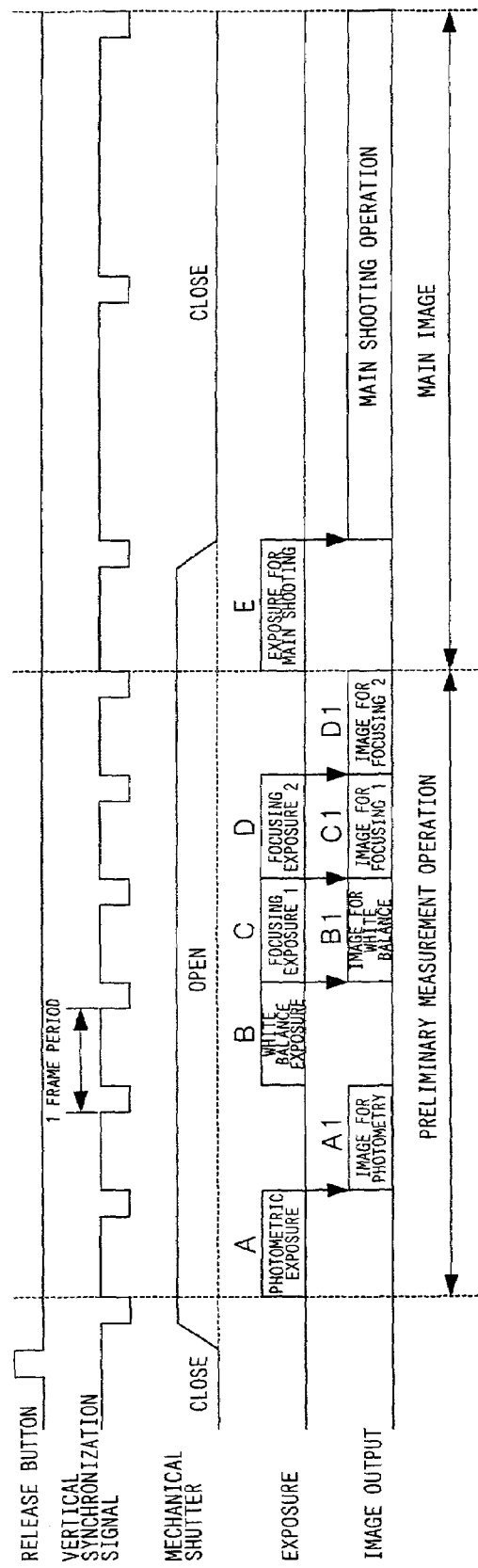
FIG. 4 is a time chart illustrating operation of a second example of an image capturing apparatus embodying the present invention.

When the user depresses the release button, the mechanical shutter is opened so that the CCD 2 is exposed to light, at which moment preliminary measurements begin. In this example, one exposure for photometry, one exposure for a white-balance measurement, and two exposures for focusing are performed. While these preliminary measurements are performed, the CCD 2 of this example is normally driven in the omission readout mode. In FIG. 4, a photometric image A1 results from exposure during A and is output from the CCD 2. In the same manner as above, an image B1 for white-balance measurement results from exposure during B, and focusing images C1,D1 result from exposures during C and D, respectively. All these images are output from the CCD 2. However, the number of exposures for each preliminary measurement is not limited to those referred to above herein.

Thereafter, the CPU 14 performs exposure for a main shooting at the moment represented by 'E' in FIG. 4 in accordance with exposure conditions resulting from these preliminary measurements, in other words by controlling the focal position of the lens 12, the F-number of the aperture 10, and the shutter speed of the mechanical shutter 11 (all of these components are shown in FIG. 1) to achieve an optimal combination of these factors.

In cases where the CCD 2 is an interlace scanning CCD as in the case of the first example, output of an image for shooting a still image is performed by outputting signals of odd-numbered lines and even-numbered lines throughout vertical synchronization signal periods for two frames, respectively.

In particularly dark shooting conditions, even if exposure is performed throughout an entire vertical synchronization signal period for each preliminary measurement, it may be impossible to obtain a sufficient intensity of the light and therefore become necessary to increase the gain of the analog processing circuit shown in FIG. 1. However, increasing the gain reduces the S/N ratio of the image signals and may impair evaluation of results of preliminary measurements. Therefore, should the CPU 14 shown in FIG. 1 judges that the shooting condition is darker than a given level based on the image A1 resulting from the photometry A, the CPU 14 switches the mode of driving the CCD 2 to the summation readout mode before conducting the white-balance measurement B and range-finding C,D thereafter. In this case, the precision of the photometry can be increased further by performing a photometry again after the switching to the summation readout mode. Thus, the summation readout practically increases the sensitivity of the CCD 2; in the case of the present example, the summation readout provides a 5-fold increase in the sensitivity, thereby enabling the precise preliminary measurements even in such dark conditions that a precise preliminary measurement is impossible with the omission readout mode.

Figure 5:
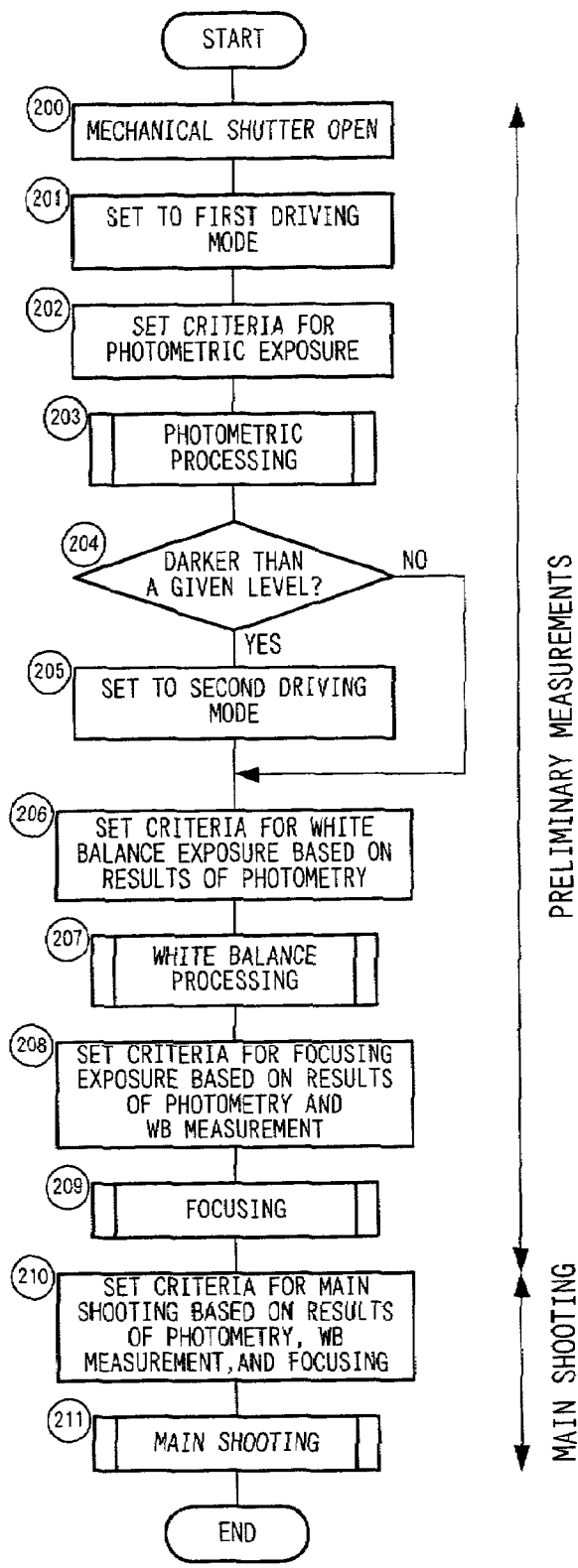
FIG. 5 is a flow chart illustrating operation of said second example of an image capturing apparatus.

Next, the function of the second example of the image capturing apparatus 1 described above is explained hereunder, referring to the flow chart shown in FIG. 5. This flow chart presents the subroutine to be followed in cases where the image capturing apparatus 1 detects the depressing of the release button as an interruption signal received when the image capturing apparatus 1 is either in the standby mode for shooting or in the same state as described in the explanation of the first example.

First, in the case where the mechanical shutter 11 is not open, the CPU 14 opens the mechanical shutter 11 (Step 200), and sets the CCD 2 in the omission readout mode (the first driving mode) (Step 201). Then, after setting criteria for photometric exposure (Step 202), the CPU 14 performs a photometry (Step 203). At that time, in cases where the shooting conditions are darker than a given level, and the CPU 14 judges that maintaining sufficient precision in preliminary measurements will be difficult (Step 204), the CPU 14 sets the driving mode for the CCD 2 to the summation readout mode (the second mode) (Step 205) and also sets criteria for exposure to measure the white balance based on results of the photometry (Step 206). In cases where the result of the photometry confirms that the shooting conditions are sufficiently bright (in other words the light level is well above the lowest limit), the CCD 2 remains in the omission readout mode (Step 204). Thereafter, auto white-balance processing (AWB) is performed (Step 207), and criteria for exposure for focusing are set based on the results of the photometry and the white-balance measurement (Step 208). In this state, focusing is performed (Step 209). Then, criteria for main shooting are set based on the results of the photometry, the white-balance measurement, and the focusing (Step 210), and a main shooting is performed (Step 211).

As described above, even when capturing an image to perform preliminary measurements prior to a main shooting of a moving image or a still image in such dark conditions that the conventional methods would not be able to prevent reduction in the measurement accuracy caused by poor image quality resulting from insufficient sensitivity, the present example of the image capturing apparatus 1 is capable of maintaining high measurement precision by switching the driving mode between the omission readout mode and the summation readout mode depending on the light level of the shooting conditions, thereby producing images having high sensitivity and high S/N ratio.

When preliminary measurements are performed in such dark conditions as described above with auxiliary light emitted to the subject from a light source, such as a lamp attached to the image capturing apparatus 1 so as to compensate for the shortage of the intensity of the light necessary to capture images for the preliminary measurements, the measurement accuracy can be increased by using the summation readout mode for preliminary measurement in the manner of the present example in combination with the lamp so as to obtain images of a higher light level. Using the summation readout mode in combination with the auxiliary light has another benefit of increasing the sensitivity; by achieving virtually the same effect as that of a normal, conventional apparatus with a smaller lamp for auxiliary light, the present example of the image capturing apparatus 1 enables the use of a smaller, less expensive lamp with a lower power consumption, thereby reducing the production cost of the apparatus.

To be more specific, in cases where the image capturing apparatus is equipped with an auxiliary light source as a means to cope with dark condition and adapted to emit light from said auxiliary light source to compensate for a shortage of the intensity of the light during a preliminary measurement, adoption of the summation readout mode substantially increases the relative sensitivity of the CCD 2 and thereby enables the use of a compact lamp of low cost and low power consumption. Thus, the invention enables the production of an image capturing apparatus that is smaller in size but has identical performance capabilities to those of a conventional apparatus at a lower production cost.

Next, the third example of the image capturing apparatus is explained.

The third example of the image capturing apparatus 1 has the same structure as that of the first example shown in FIG. 1 in that the manner of signal flow, as well as the function and the manner of operation of each component, are the same as those of the first example. In this example, however, the summation readout mode is used for performing preliminary measurements (preliminary shootings) prior to a main shooting of a still image or a moving image so as to reduce the time required for the preliminary measurements.

As shown in FIG. 4, there is a lag in time between the moment the user depresses the release button and the moment exposure for a main shooting begins, in other words, between the moment the user intends to shoot and the moment the apparatus initiates a main shooting by starting exposure. As too long a lag in time may cause the user to miss a shutter chance, the shorter the lag in time, the better. In fact, the optimal duration is zero. Although it is difficult to reduce the time required for preliminary measurements to zero with a configuration where the image pickup device also serves as a sensor for focusing and photometry, the present example of the image capturing apparatus 1 is capable of reducing the lag in time compared with the conventional apparatus, while maintaining accuracy of preliminary measurements at the same level as that of the conventional apparatus.

Figure 6:
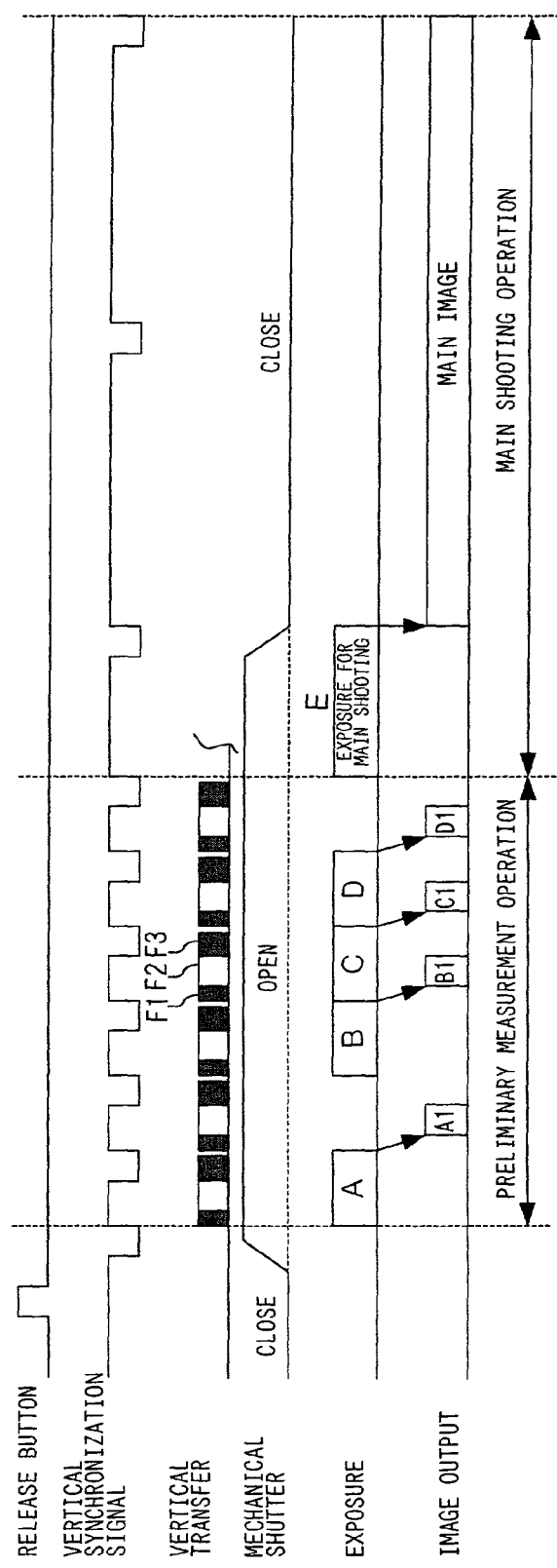
FIG. 6 is a time chart illustrating operation of a third example of an image capturing apparatus embodying the present invention.

How a still image shooting is performed in the present example is now explained, referring to the time chart shown in FIG. 6.

Throughout the process of preliminary measurements, CCD 2 operates in the summation readout mode (the second driving mode). FIG. 6 basically corresponds to FIG. 4 so that the labels A-D and A1-D1 respectively have the same meanings as those in FIG. 4. In other words, the photometric image A1 results from exposure during A; the image B1 for white-balance measurement results from exposure during B; and focusing images C1,D1 result from exposures during C and D, respectively. According to this example, however, the time required for preliminary measurements halved, because the vertical synchronization signal frequency for preliminary measurements is set to half that of the example shown in FIG. 4. An example of relatively simple methods of halving the vertical synchronization signal frequency, i.e. the frequency for each frame, is to double the speed of the basic clock of the CCD driving circuit 3 shown in FIG. 1 only during the period when preliminary measurement is performed, thereby halving the pixel rate, i.e. the time required to output image signals for each pixel from the CCD 2. Another example is described later.

FIG. 6 also shows how vertical transfer, of which a more detailed explanation will be given later, is performed. When readout to the vertical transfer paths and summation of signal charges are completed by charge readout operation in the summation readout mode (the second driving mode), high-speed vertical transfer is performed until the signal charges reach the desired positions along the vertical direction of the frame (F1 in FIG. 6). At that time signals output to the outside of the CCD 2 are treated as invalid. Next, image signal charges on a desired number of lines are read out by vertical transfer in the summation readout mode (F2 in FIG. 6). Signals read in this stage are treated as valid. When image signals corresponding to a necessary number of lines have been obtained, vertical transfer is performed again to sweep out the pixel signals that still remain in the vertical transfer paths (F3 in FIG. 6).

By following the above procedure, signals at a desired location in a frame can be read out in a desired band, i.e. a desired number of lines. Measuring the intensity of the light, the white balance, or the distance to the subject does not always require the entire frame; the center and its vicinity are sufficient. Therefore, the vertical synchronization signal frequency can easily be halved during a preliminary measurement by reading the signals of the pixels located around the center of the frame in the width of, for example, one-third of each line in the manner described above. A method (hereinafter referred to as high-speed middle portion readout) that calls for using a combination of high speed vertical transfers to selectively obtain an image on desired sections arranged adjacent to one another in a frame is already known. However, the third example described above characteristically apply high-speed middle portion readout to summation readout.

With any conventional apparatus, reducing operation time for a preliminary measurement results in an insufficient exposure period, making it impossible to obtain a sufficient amount of signals even when conditions are not so dark. However, the image capturing apparatus of the present example operates the CCD 2 in the summation readout mode. Therefore, even if the operation time for the preliminary measurements, in other words exposure period for photometry, white balance adjustment, and focusing, is halved, the 5-fold increase in the sensitivity ensures a sufficient intensity of the light; in fact a greater amount of light is provided by the present example than can be provided by the preliminary measurements performed in a conventional manner, which does not call for omission readout and therefore requires a full amount of time.

Although the third example of the image capturing apparatus 1 normally operates in the summation readout mode, it is possible to select the omission readout mode in sufficiently bright conditions. Switching to the omission readout mode may be done automatically by the CPU 14 through evaluating image data, or manually by the user. Furthermore, the method of using the summation readout mode in preliminary measurements to reduce the duration of the preliminary measurements can be applied to the second example the image capturing apparatus 1, which calls for switching between the omission readout mode and the summation readout mode depending on the light level of the shooting conditions to perform preliminary measurements. Performing high-speed middle portion readout while appropriately switching the driving mode offers even faster, more accurate preliminary measurements.

Figure 7:
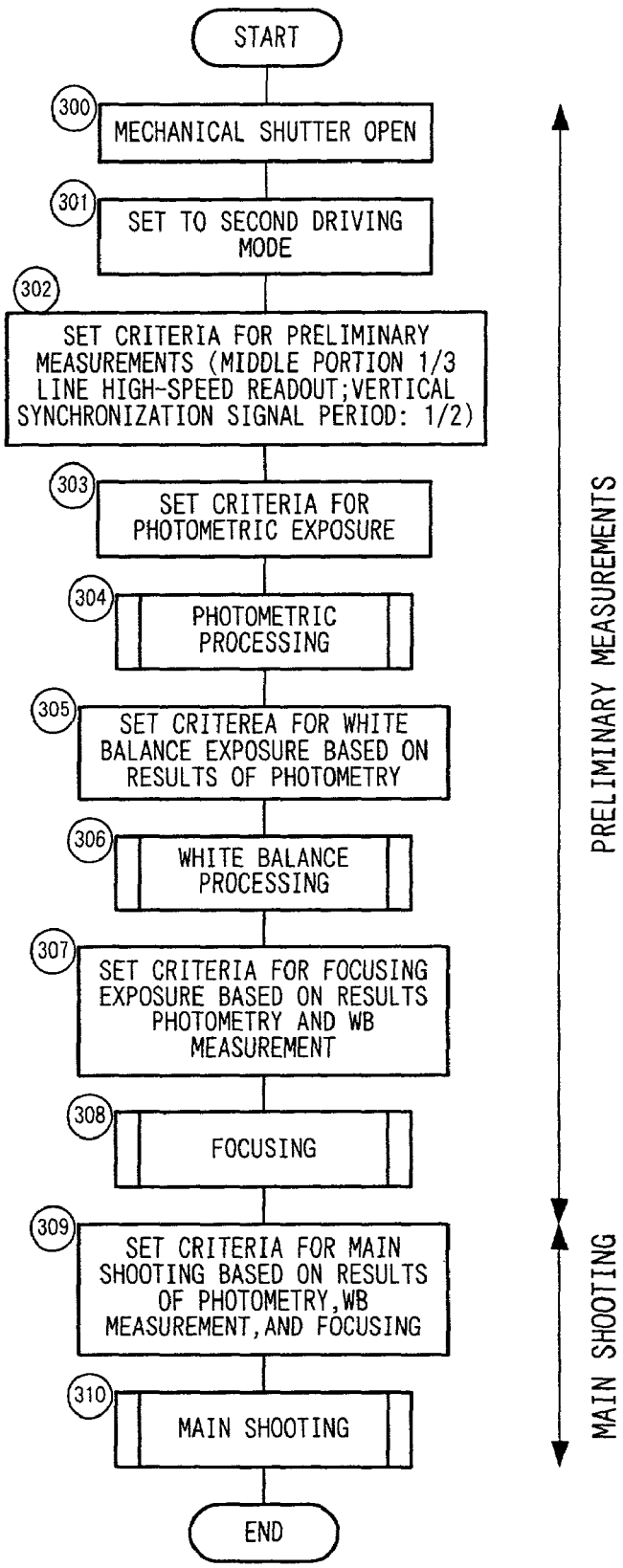
FIG. 7 is a flow chart illustrating operation of said third example of an image capturing apparatus.

Next, the function of the third example of described above is explained hereunder, referring to the flow chart shown in FIG. 7. This flow chart presents the subroutine to be followed in cases where the image capturing apparatus 1 detects the depressing of the release button as an interruption signal received when the image capturing apparatus 1 is either in the standby mode for shooting or in the same state as described in the explanation of the first example.

First, in the case where the mechanical shutter 11 is not open, the CPU 14 opens the mechanical shutter 11 (Step 300), and sets the CCD 2 to the summation readout mode (Step 301). Then, in the case of the present example, the vertical synchronization signal period is reduced to half its normal period by using high-speed middle portion readout in combination with summation readout to perform line readout of the CCD 2 so as to read, for example, one-third of each line in the image frame at a high speed (Step 302). Thereafter, in the same manner as in the second example, the CPU 14 sets criteria for photometric exposure (Step 303) and then performs photometry (Step 304). The CPU 14 then sets criteria for exposure to measure the white balance based on results of the photometry (Step 305). Thereafter, auto white-balance processing (AWB) is performed (Step 306), and criteria for exposure for focusing are set based on the results of the photometry and the white-balance measurement (Step 307). In this state, focusing is performed (Step 308). Then, criteria for main shooting are set based on the results of the photometry, the white-balance measurement, and the focusing (Step 309), and a main shooting is performed (Step 310).

As described above, when performing a preliminary measurement, the present example of the image capturing apparatus 1 is capable of substantially reducing the duration for the measurement, for example halving the exposure period for the preliminary measurement, by making use of the high sensitivity offered by the summation readout mode. Thus, the invention is capable of substantially improving the shutter response of the image capturing apparatus. With a conventional method, reading a part of the frame at a high speed or otherwise substantially reducing the preliminary exposure period to reduce the duration of the preliminary measurement presents the serious problem of insufficient sensitivity in not only particularly dark conditions but also under normal shooting conditions, such as an occasion of indoor shooting. However, by making use of a relatively increased image pickup sensitivity realized by the summation readout mode, the invention enables the substantial reduction of duration for a preliminary measurement without reducing the accuracy of the measurement.

Next, the fourth example of the image capturing apparatus is explained.

The fourth example of the image capturing apparatus 1 has the same structure as that of the first example shown in FIG. 1 in that the manner of signal flow, as well as the function and the manner of operation of each component, are the same as those of the first example. In this example, however, a method of performing a high precision preliminary measurements (preliminary shootings) prior to a main shooting of a still image or a moving image by switching between three or more readout modes is explained. In the case of the present example, three modes, i.e. an omission readout mode, a summation readout mode, and a color-mixing summation readout mode, are used.

In the case of the present example, three modes, i.e. an omission readout mode, a summation readout mode, and a color-mixing summation readout mode, are used.

The process of shooting a still image according to this example is the same as that shown in the time chart of FIG. 4.

The aforementioned color-mixing summation readout mode described above calls for summing up signal charges of different colors. Whereas the summation readout mode calls for summing up signal charges of the same colors to avoid mixing of colors, the color-mixing summation readout mode calls for mixing and reading out signal charges of pixels of different colors to output signals that are as close to luminance signals as possible, and making use of the output signals for measuring the distance to the subject, i.e. autofocusing. This mode is activated only for preliminary measurement.

Signal charges may be read out in the color-mixing summation readout mode as follows: for example, all the signal charges of the red pixels (R) on the even-numbered lines of a CCD of primary color Bayer arrangement are read out to the vertical transfer paths (the vertical resistors). After the signal charges R are vertically transferred by the amount of half a stage, the signal charges of the green pixels (G) on the odd-numbered lines are read out to the vertical transfer paths to mix the signal charges R and the signal charges G together. The signal charges are further transferred in the vertical direction so that signal charges on a desired number of lines are summed up on the horizontal transfer path (the horizontal resistor). Detailed explanation will be given later of another example of procedures of implementing the color-mixing summation readout mode, which procedure calls for performing vertical transfer while charge readout pulses are being applied. Both procedures are capable of generating signal charges of a mixture of pixels (R+G or R+B) as well as offering a high frame rate.

Figure 8:
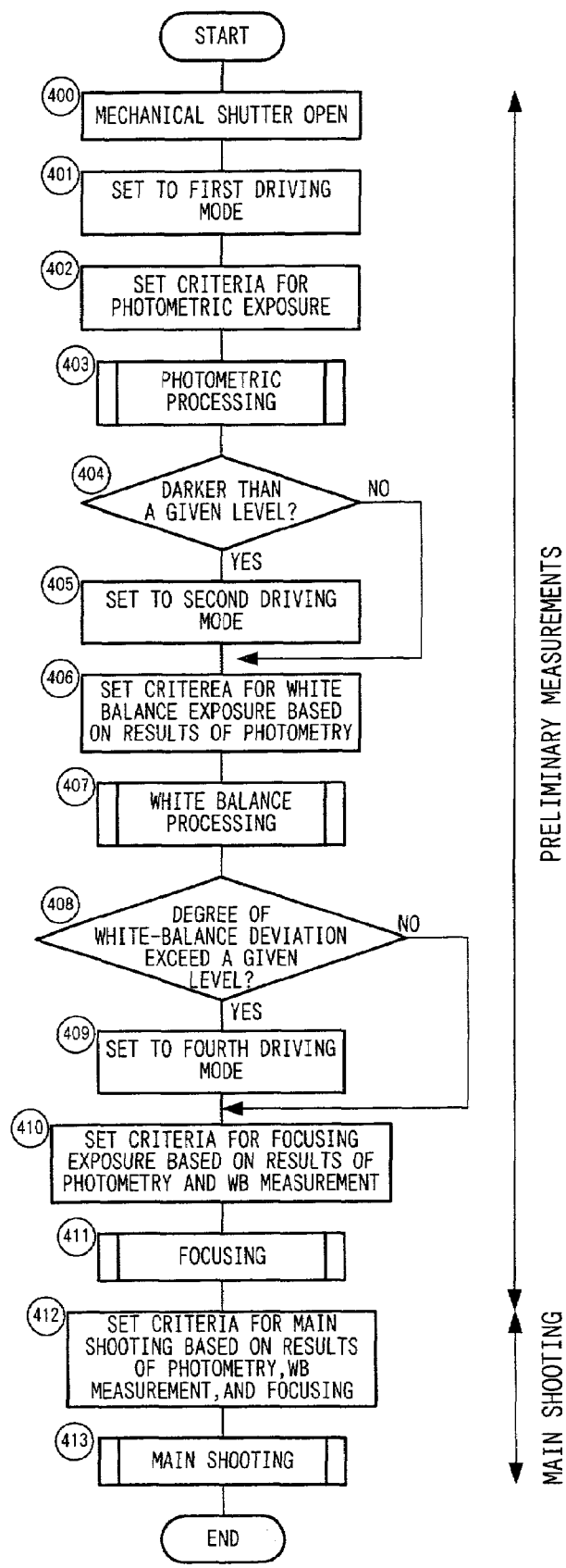
FIG. 8 is a flow chart illustrating operation of a fourth example of an image capturing apparatus embodying the present invention.

Next, the function of the fourth example described above is explained hereunder, referring to the flow chart shown in FIG. 8. This flow chart presents the subroutine to be followed in cases where the image capturing apparatus 1 detects depression of the release button as an interruption signal received when the image capturing apparatus 1 is either in the standby mode for shooting or in the same state as described in the explanation of the first example.

First, in the case where the mechanical shutter 11 is not open, the CPU 14 opens the mechanical shutter 11 (Step 400), and sets the CCD 2 in the omission readout mode (the first driving mode) (Step 401). Then, after setting criteria for photometric exposure (Step 402), the CPU 14 performs a photometry (Step 403). At that time, in cases where the CPU 14 judges that it will be difficult to maintain a sufficient precision during preliminary measurements to be performed thereafter because the shooting is done in darker conditions (in other words the luminosity of the subject is lower) than a given level (Step 404), the CPU 14 sets the driving mode for the CCD 2 to the summation readout mode (the second mode) (Step 405) and also sets criteria for exposure to measure the white balance based on results of the photometry (Step 406). In cases where the result of the photometry ascertains that the light level is well above the given level, the omission readout mode remaining active (Step 404). Thereafter, a white-balance processing (AWB) is performed (Step 407). Should a conspicuous color bias be detected in the course of the white-balance processing, in other words should the degree of white-balance deviation be ascertained to exceed a given level (Step 408), the driving mode for the CCD 2 is set to the color-mixing summation readout mode (the fourth mode) (Step 409), and criteria for exposure for focusing are set based on the results of the photometry and the white-balance measurement (Step 410). In this state, focusing is performed (Step 411). In cases where the degree of white-balance deviation is ascertained to not exceed a given level (Step 408), criteria for exposure for focusing are set with the current driving mode remaining active (Step 410). In this state, focusing is performed (Step 411). For example, in cases where the subject is in sufficiently bright conditions and where no color bias is detected, the CCD 2 is maintained in the omission readout mode from the beginning. Then, criteria for a main shooting are set based on the results of the photometry, the white-balance measurement, and the focusing (Step 412), and then a main shooting is performed (Step 413).

By using the color-mixing summation readout mode when color bias is detected in the subject, the example described above enables the easy, precise computation of the distance to the subject and consequently ensures precise focusing. To be more specific, when a picture of a subject that presents a conspicuous color bias is taken with a color CCD 2, neither the omission readout mode nor the summation readout mode without color-mixing is free from the possibility of the difference in color (pixel) levels becoming too great to perform focusing properly. Intentionaly mixing colors in the summation readout mode in such a situation reduce the difference in color levels and thereby enables the precise focusing.

Although Japanese Patent Provisional Publication No. 10-136244, too, mentions focusing by using color-mixing summation readout, the present example is different from the method provided in said patent publication in that the same CCD 2 can be used for either mode by switching the driving mode between the same-color summation readout mode and the color-mixing summation readout mode. The method provided by Although Japanese Patent Provisional Publication No. 10-136244 calls for performing preliminary measurement of white balance (AWB) during summing up of mixed colors. This presents a problem of reduced precision in setting the white balance, because mixing of colors impairs color separation and therefore prevents precise measurement of color temperatures. The present example, however, is capable of maintaining color separation, because preliminary measurement of white balance is performed in the driving mode selected between the omission readout mode and the summation readout mode, which are both free from the possibility of mixing of colors. Another benefit of the present example lies in that the summation readout mode, which is capable of increasing the sensitivity, can be used in low-light conditions. Thus, the example offers improved image quality by means of exceptionally precise setting of the white balance.

As is true in the third example, the fourth example, too, enables the speed-up of preliminary measurement by extracting a specific portion of the entire frame. In other words, using a combination of the third example and the fourth example enables the more precise, faster preliminary measurement.

As described above, by providing a method of automatically selecting a single mode or any appropriate combination of two modes or three modes from among the omission readout mode, the same-color summation readout mode and the color-mixing summation readout mode to perform preliminary measurement, the present invention ensures acquisition of effective data for the preliminary measurement. Therefore, a still image or a moving image of better quality can be obtained by main shooting.

Next, the fifth example of the image capturing apparatus is explained.

The fifth example has the same structure as that of the first example shown in FIG. 1 in that the manner of signal flow, as well as the function and the manner of operation of each component, are the same as those of the first example. In this example, however, a method of reducing moiré in a main shooting a still image or a moving image by using the summation readout mode (the second driving mode) is explained.

According to the present example, the CCD 2 is driven in the omission readout mode as the initial condition mode when shooting moving images. As this omission readout mode calls for simply omitting a part of the pixels (in other words the lines), it drastically reduces the spatial frequency reproducibility in the vertical direction of the frame. For example, if there is a subject having a pattern of fine, closely spaced apart lateral stripes, the fine stripes may appear as broad stripes, or a false color, which does not exist in the actual subject, appears on a definite border between black and white. These are called moiré: a phenomenon that greatly degrades the image quality.

The CPU 14 of the invention monitors moving images that are successively recorded and updated to the memory 7. According to the present example, the CPU 14 is also adapted to analyze the spatial frequency distribution of the color difference components in the vertical direction of the frame while performing said monitoring. Various methods including Fast Fourier Transformation (FFT), are applicable to conducting this analysis. It is not essential to perform such an analysis on the entire Hi frame; an analysis may be performed on a specific part of the frame, or on some points distributed all over the frame. Should a distribution higher than a given level be detected in relatively high frequency components among the chrominance signals, the CPU 14 recognizes the possibility of moiré and switches the driving mode of the CCD 2 from the omission readout mode to the summation readout mode. By summing up a plurality of pixels of the same color which are spaced apart from one another, the summation readout mode achieves virtually the same effect as that achieved by passing through a low pass filter, thereby reducing generation of moiré very effectively.

Should the user find an unacceptable moiré in the course of monitoring a moving image displayed on the image display unit 8 of the image capturing apparatus 1, the user may switch the driving mode manually from the omission readout mode to the summation readout mode.

Figure 9:
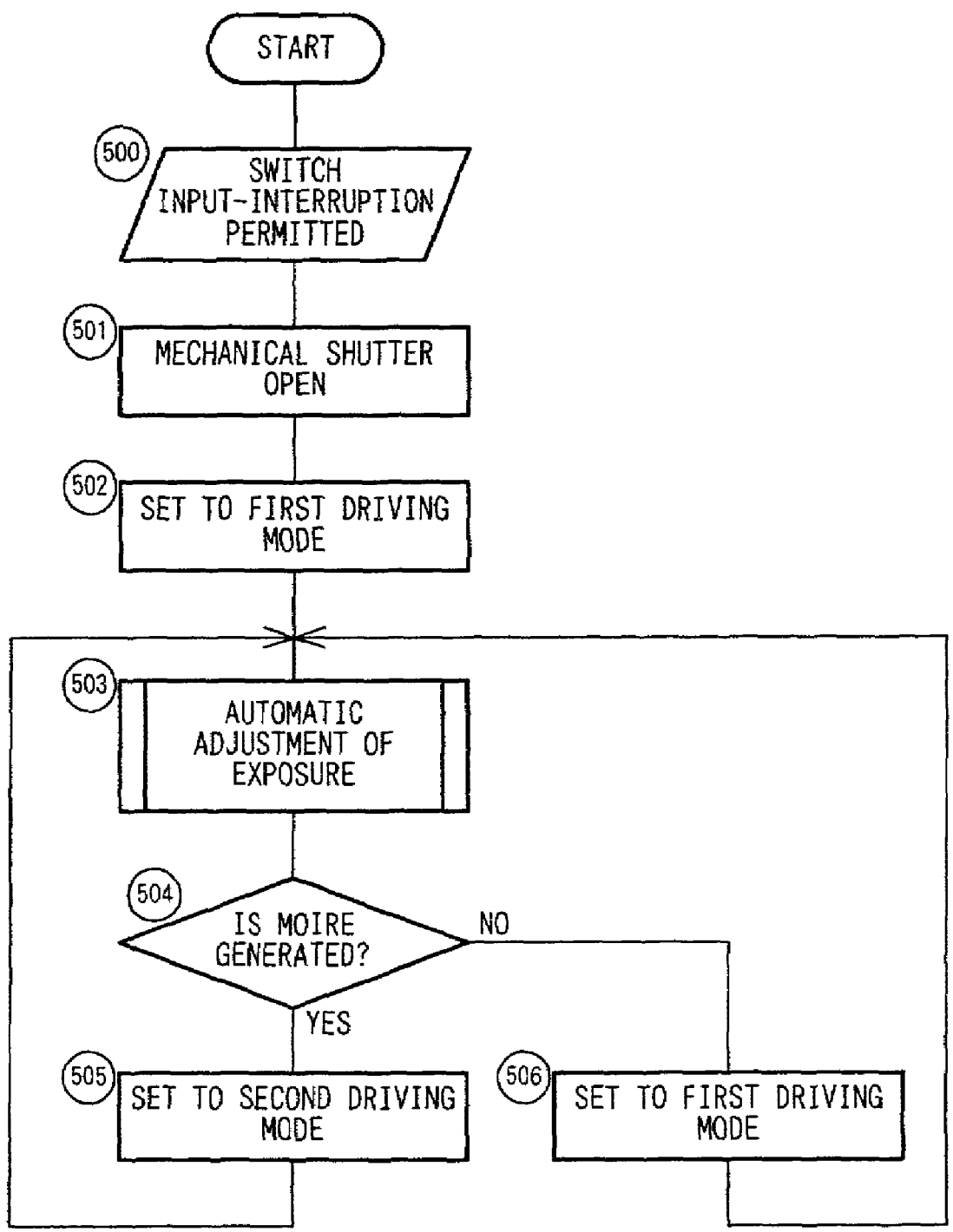
FIG. 9 is a flow chart illustrating operation of a fifth example of an image capturing apparatus embodying the present invention.

Next, the function of the fifth example described above is explained hereunder, referring to the flow chart shown in FIG. 9. This flow chart presents the state where the image capturing apparatus 1 is either in the standby mode for capturing moving images or keeps displaying data of a moving image on the image display unit 8 in real time to perform an electronic view-finding for capturing still images, said data being sequentially output from the CCD 2. Furthermore, the flow chart is also based on the assumption that the image capturing apparatus 1 will switch from the state described above to a moving image shooting sequence or a still image shooting sequence, or manually fixed by the user from the omission readout mode to the summation readout mode described above by operating one of the various switches (SW). Therefore, first of all, the initial state of each switch (SW) is ascertained, and various settings are executed so as to give each switch (SW) permission for later interruption (Step 500). For example, should the CPU 14 detect an interruption signal indicating that the release button has been depressed after Step 500, the CPU 14 immediately shifts to the routine for capturing still images. When the CPU 14 detects that the switch (SW) for fixing the driving mode of the CCD 2 to the summation readout mode has been turned on, the CPU 14 prohibits the CCD 2 from shifting to the omission readout mode thereafter. In cases where no switch (SW) has been detected in Step 500, the mechanical shutter is released (Step 501); the CCD driving mode is set to the summation readout mode (Step 502); and image pickup action by the CDD2 is initiated, with automatic exposure adjustment being initiated (Step 503). During the automatic exposure adjustment, the CPU 14 sequentially controls such elements as the F-number of the aperture 10, the electronic shutter of the CCD 2, which is controlled through the CCD driving circuit 3, and the gain of the analog processing circuit 4, by shifting itself to control one unit at each time so that the image display unit always displays images with an appropriate level of brightness. Then, the CPU 14 shifts to moiré evaluation processing once for each automatic exposure operation or each given number of automatic exposure operations. (Step 504). At each moiré evaluation processing, conditions for generation of moiré are evaluated. When there is no possibility of generation of moiré, the driving mode of the CCD 2 is set to the omission readout mode (Step 506). When the possibility of generation of moiré is detected, the driving mode of the CCD 2 is set to the summation readout mode (Step 505). Thereafter, Step 503 begins again, where automatic exposure adjustment is performed. In Step 504, the possibility of generation of moiré is evaluated in either the omission readout mode or the summation readout mode, in other words, whichever mode is currently active. If the subject is the same, the degree of moiré to be detected in a frame obtained in the summation readout mode will be lower than that obtained in the omission readout mode. Therefore, the disregard level for each mode is determined with characteristics of a frame obtained in each mode taken into consideration.

As described above, by using the summation readout mode in the situation where there is the possibility of generation of moiré and using the omission readout mode in other situations, the present example enables the effective reduction of moiré, which would otherwise be caused by conventional omission readout. Furthermore, the example described above also permits the user's intention to be reflected in operation of the apparatus by enabling the user to manually activate or deactivate said reduction of moiré.

Next, the sixth example of the image capturing apparatus 1 is explained.

When a series of images of a subject that is moving fast is shot by means of, for example, high-speed successive exposures in a conventional omission readout mode in relatively dark conditions, insufficient sensitivity sometimes prevents the user from successively releasing the shutter at a high speed, resulting in blurred images. Using the summation readout mode in such a circumstance permits the shutter to function at a high speed, ensuring clear images of the subject without blur.

Next, the seventh example of the image capturing apparatus 1 is explained.

Figure 10:
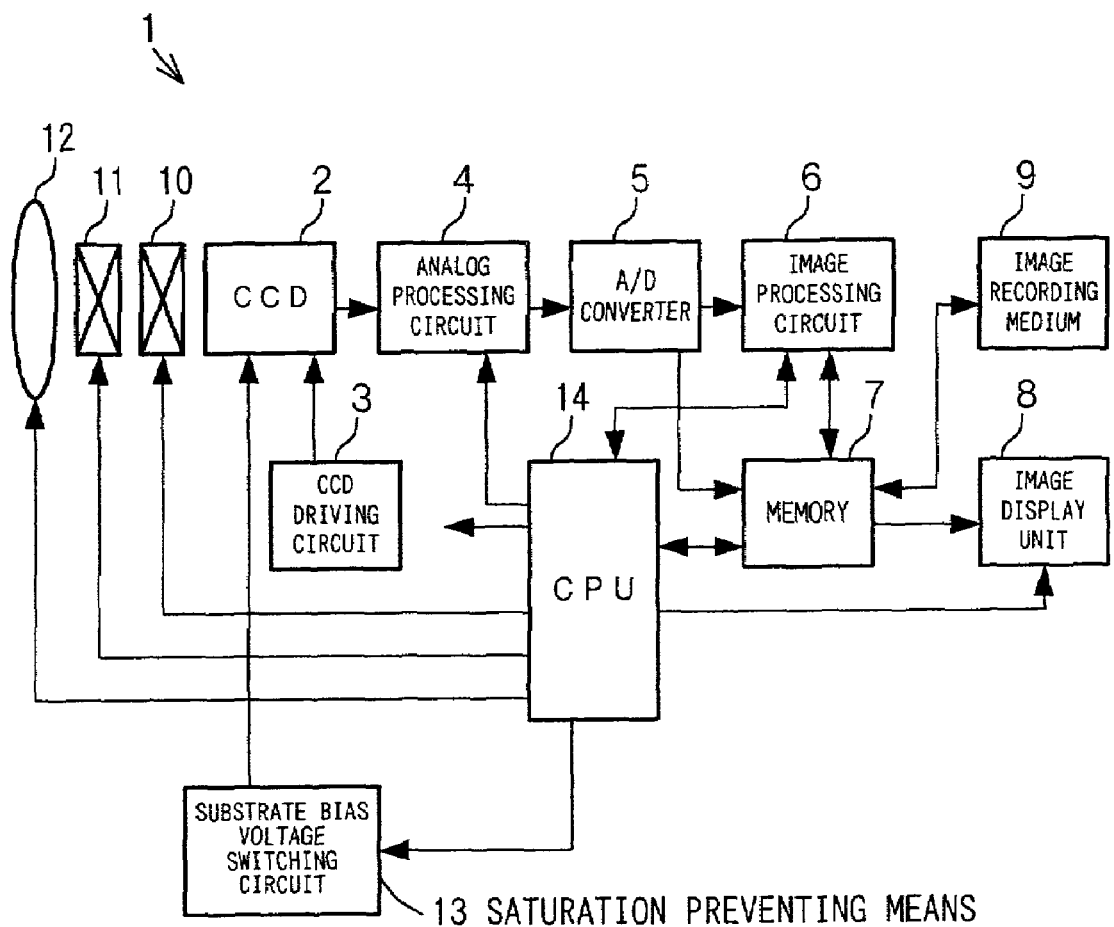
FIG. 10 is a block diagram of a seventh example of an image capturing apparatus embodying the present invention.

In addition to the same components as those of the first example shown in FIG. 1, the image capturing apparatus 1 shown in FIG. 10 includes a substrate bias voltage switching circuit 13 as a saturation preventing means which is adapted to be controlled by the CPU 14 to switch the substrate bias voltage on the CCD 2, thereby easily eliminating what is called blooming. All other components of the seventh example than the substrate bias voltage switching circuit 13 are the same as those of the first example of the image capturing apparatus 1 shown in FIG. 1. In other words, the manner of signal flow, as well as the function and the manner of operation of each component, are the same as those of the first example. When the CCD 2 is driven in the summation readout mode (in other words a plurality of signal charges, i.e. pixel charges, are mixed and read inside the CCD), the charge transfer capacity of the vertical transfer paths or the horizontal transfer path may become a problem. For example, to sum up signal charges of five pixels, each transfer path is required to have a transfer capacity 5 times that of the saturated stored base charge of its photodiodes 15 serving as the photoelectric converting means. Should signal charges overflow from the horizontal transfer path, the signal charge of each pixel on the solid-state image pickup device overflows and seeps into adjacent pixels, sometimes resulting in what is generally called blooming, the situation where a highlighted portion of the image appears to expand.

One of the solutions to this problem is the use of a CCD designed and produced such that the vertical transfer paths and the horizontal transfer path respectively have charge transfer capacities sufficient to cope with mixing of pixels. Such a solution, however, requires a CCD dedicated to this particular purpose and would result in increased costs.

According to the present example, a CCD 2 of normal design is used, and in cases where the CPU 14 ascertains that the light level of the subject is not below a given level in the situation where a pixel mixing mode, such as the same-color summation readout mode or the color-mixing summation readout mode, is currently or soon to be underway, the CPU 14 judges that there is the possibility of blooming and controls the substrate bias voltage switching circuit 13 to switch the substrate bias voltage on the CCD 2 to a voltage appropriately higher than the normal level, thereby limiting the saturated stored base charge of the photodiodes. Thus, the present example is capable of preventing blooming from being generated on the horizontal transfer path or the vertical transfer paths and thereby improving the image quality while holding down production costs.

Figure 11:
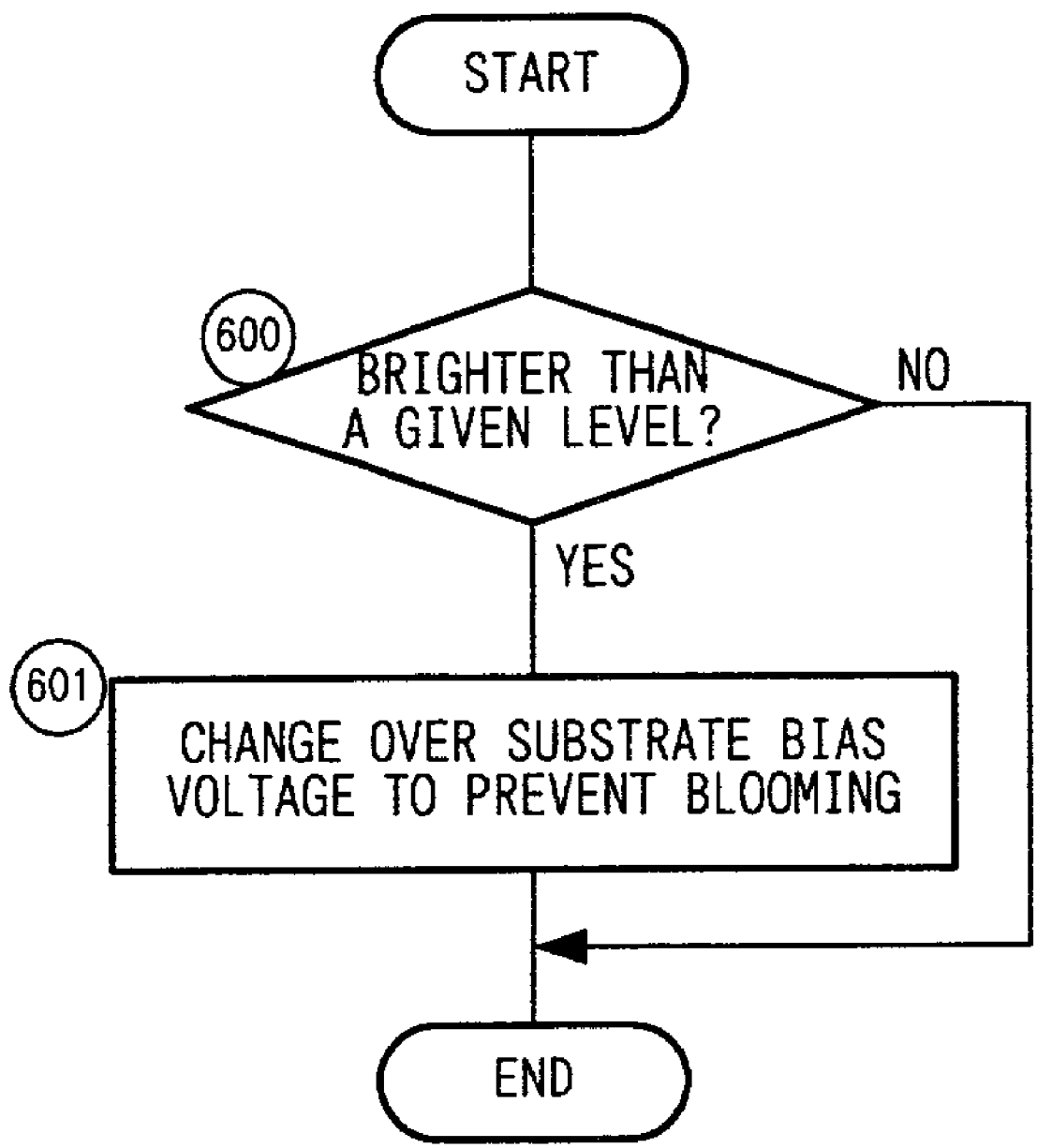
FIG. 11 is a flow chart illustrating operation of said seventh example of an image capturing apparatus.

Next, the function of the seventh example of the image capturing apparatus 1 described above is explained hereunder, referring to the flow chart shown in FIG. 11. This flow chart is a part of a flow chart that is identical to any one of the flow charts for the first to sixth examples described above, and presents the subroutine to be followed when luminance conditions of the subject is ascertained immediately before or after the step for switching to the summation readout mode or the color-mixing summation readout mode.

First, the light level of the subject is evaluated (Step 600). Should the CPU 14 recognizes the possibility of blooming by ascertaining that the subject is brighter than a given level, the CPU 14 controls the substrate bias voltage switching circuit 13 to switch the substrate bias voltage on the CCD 2 so as to prevent blooming (Step 601). On the other hand, should the CPU 14 judge that there is no possibility of blooming by ascertaining that the subject is darker than a given level as a result of evaluation of the light level of the subject (Step 600), the CPU 14 maintains the current substrate bias voltage on the CCD 2.

An image capturing apparatus 1 according to the present invention may have any one, a combination, or all of the various features of the first through sixth examples described above.

The summation readout mode enables a tremendous increase of the relative sensitivity compared with the omission readout mode, the summation readout mode. Therefore, in addition to such benefits as improved image quality in low-light conditions, higher precision in preliminary measurement in low-light conditions, and speed-up of preliminary measurement, the summation readout mode also offers the optimal image data for electronic view finding by an image capturing apparatus, particularly an electronic still camera. An electronic view finder (EVF) is a mechanism for driving a CCD normally in the moving image mode, i.e. the omission readout mode, to display a moving image on an electronic displaying device in real time. At present, virtually every electronic still camera is equipped with a liquid crystal display monitor (LCD monitor) for display and playback of recorded images. As this LCD monitor can be used for view finding, the electronic view finder is the most commonly used finder. In cases where a camera is equipped with a high-magnification zoom lens, an optical finder that does not work with the zoom cannot be used due to an excessively great parallax. This is not limited to electronic still cameras. Therefore, with the exception of single-lens reflex cameras, all the other electronic still cameras that target general consumers and are equipped with a high-magnification zoom lens adopt EVF. Included in these cameras equipped with a high-magnification zoom lens are those that do not have an optical finder and perform view finding solely with a LCD monitor, and those that have a device which is provided separately from the LCD monitor and is dedicated to view finding. Said device is an electronic view finder similar to that of a movie camera and consists of a small LCD monitor combined with an ocular optical system.

With an electronic still camera without an optical finder, view finding is performed solely by an electronic view finder. In cases where a multi-pixel CCD, which has a relatively low sensitivity, is used, it is sometimes difficult to perform view finding in low-light conditions in the moving image mode that calls for normal omission readout. Movie cameras do not present this problem, because a scene that cannot be displayed on the electronic view finder also cannot be captured in a main shooting. With an electronic still camera, however, a main shooting can be performed by using an electronic flash or other means. Therefore, the electronic view finder is required to display an image that is sufficiently clear to enable the adjustment of the view angle.

Regarding this problem, the summation readout mode is capable of increasing the sensitivity to the maximum level that can be offered by the CCD of the apparatus according to the invention, because all the pixels of the CCD contribute to image capturing. Therefore, by using an electronic view finder in combination with the CCD driven in the summation readout mode described above, the invention provides a finder system that is capable of proper display of a subject even in low-light conditions.

Next, a method of driving a solid-state image pickup device of each one of the examples of an image capturing apparatus described above in a summation readout mode and the structure of a CCD to be used for the method are explained hereunder.

Any one of the examples of the methods of driving a solid-state image pickup device (hereinafter referred to as the examples of the CCD) to be explained hereunder can be applied to the summation readout mode that is used for an image capturing apparatus of any one of the first through seventh examples of an image capturing apparatus 1 described above.

First, the structure of the CCD used in these examples is explained. The CCD includes vertical transfer paths serving as the first transfer paths, and charge readout electrodes arranged in a plurality of lines. Color filter pixels representing two colors are arranged along each vertical transfer path. Of these pixels, the signal charges of all the pixels of one of the two colors are read out to the vertical transfer paths. Thereafter, vertical transfer is performed in the state that charge readout voltage is still applied to the charge readout electrodes belonging to a specific line among the plurality of lines. Thus, line summation of the same color is performed. Such a vertical transfer may be combined with selective readout by the plurality of charge readout electrodes so that the pixels of the lines containing the other color pixels are read out to the vertical transfer paths and vertically transferred with charge readout voltage applied to the of a specific line in the same manner as above while preventing the signal charges of these pixels from being mixed with signal charges of the first mentioned pixels, which have been read out earlier and summed up on the vertical transfer paths. Or, as an alternative method, the vertical transfer may be combined with line summation on the horizontal vertical path, which serves as the second transfer path, so that line summation of signal charges of the pixels of the other color is performed. In the end, all the pixels are read out with the signal charges of the respective same colors being summed up by line summation. With feature as described above, this method is effective in increasing the frame rate while substantially increasing the image quality, such as an improved vertical spatial frequency reproducibility and an improved pixel sensitivity, applicable to various kinds of CCDs, and capable of minimizing increase of production costs by preventing the structure of the CCD from becoming complicated.

In short, the method described above offers a high-speed, high-quality moving image with a multi-pixel CCD merely through a procedure of reading out signal charges, i.e. by reading out electric charges to vertical transfer paths and, thereafter, performing vertical transfer of the electric charges while voltage is applied to specific charge readout electrodes so as to sum up charges of pixels.

Although detailed explanation will be given later, the first example of the CCD is an interlace CCD, with which vertical transfer is performed only in the forward direction, and summing up of signal charges is performed on the horizontal transfer path. The second example of the CCD is an interlace CCD, which is capable of reverse vertical transfer, as well as forward vertical transfer. The third example of the CCD is a progressive CCD, which is capable of reverse vertical transfer, as well as forward vertical transfer. The fourth example of the CCD is a progressive CCD, with which vertical transfer is performed only in the forward direction, and summing up of signal charges is performed on the horizontal transfer path. The fifth example of the CCD is an interlace complementary-color line-sequential CCD, which is capable of reverse vertical transfer, as well as forward vertical transfer. The sixth example of the CCD is an interlace complementary-color line-sequential CCD, with which vertical transfer is performed only in the forward direction, and summing up of signal charges is performed on the horizontal transfer path.

In other words, with a multi-pixel interline CCD that is a color single-plate type CCD having a color filter of any arrangement and capable of both capturing still images and capturing moving images and permits omission readout, the invention enables the high-speed full pixel readout by means of multiple line summation readout without the possibility of unintentional mixing of colors regardless of the type of color filter arrangement. Regardless of the number of lines to be read, the invention enables said line summation readout by using the same, minimum sets of vertical transfer electrodes without having to increase the number of vertical transfer electrode systems with an increase in the number of lines to be summed up.

To sum up pixels of the same color, reverse transfer on the vertical transfer paths may be performed to facilitate signal processing to be executed after the signals are output from the CCD, However, in cases where reverse transfer is not desirable because of a very low reverse transfer capability of the CCD or for any other reasons, vertical transfer may be performed only in the forward direction.

Next, examples of a CCD according to the present invention are explained hereunder, referring to the relevant drawings.

The first and second examples of as CCD, which are shown in FIGS. 1, 2, and 12 through 28, are explained in outline. Each of the two examples uses an interlace CCD (a CCD of an interlace scanning type), which permits omission readout.

The interlace CCD for either example has a total of six vertical transfer electrode systems, including four charge readout electrode systems. The total number of vertical transfer electrode systems is limited to six, regardless of the number of lines to be summed up. The four charge readout electrode systems are represented by labels V1A,V1B,V3A, V3B, and the six vertical transfer electrode systems are V1A,V1B,V2,V3A,V3B,V4. In other words, the invention can be embodied with a fairly common multi-pixel interlace CCD.

Among various multi-pixel interline CCDs of a color, single-plate type which has a color filter of a normal arrangement and is capable of both capturing still images and capturing moving images and permits omission readout, the interlace CCD has four charge readout electrode systems; V1A,V1B,V3A,V3B. Now, for the purpose of presenting an example, reference is made to a CCD of Bayer arrangement (a primary-color arrangement) using red (R), green (G), and blue (B) color filters. In this example, color filters are arranged along a given vertical column as RGRG . . . , wherein Rs are located on the even-numbered lines and Gs on the odd-numbered horizontal lines. The charge readout electrodes V1A serve as the charge readout electrodes for reading pixels G on the odd-numbered horizontal lines with their respective order being a multiple of 5; the charge readout electrodes V1B serve as the charge readout electrodes for reading pixels G on the other odd-numbered horizontal lines; the charge readout electrodes V3A serve as the charge readout electrodes for reading pixels R on the horizontal lines with their respective order being a multiple of 10; and the charge readout electrodes V3B serve as the charge readout electrodes for reading the remaining pixels R, i.e. the pixels R on the other even-numbered horizontal lines. The vertical column adjacent to the aforementioned column has a color arrangement of GBGB . . . , wherein Gs are located on the even-numbered lines and Bs on the odd-numbered horizontal lines. In other words, the charge readout electrodes V1A serve as the charge readout electrodes for reading pixels B on the multiple-of-5 odd-numbered horizontal lines, and the charge readout electrode V3A for reading pixels G on the multiple-of-10 horizontal lines. For the sake of simplicity, the same-color summation full-pixel readout is explained hereunder, referring to only the vertical column with RGRG. . . . However, it should be understood that all the pixels on a given horizontal line are simultaneously treated in the same manner, provided that different columns have different color arrangements.

First, charge readout voltage is applied to V3A and V3B so that the first color, i.e. the signal charges of the pixels R on the even-numbered lines, are read out to the vertical transfer path. Thereafter, while the voltage on V3B is brought back to the initial stage, the charge readout voltage applied to V3A is maintained. In this state, vertical transfer is performed by the amount of 4 stages. As the potential well remains deep under each electrode V3A, which is located at every 10th line, i.e. at every fifth stage, the signal charges of five pixels of the same color, i.e. R, that are immediately upstream from the electrode V3A are summed up at that point. Thus, a 5-pixel-summed charge as a first summed-charge, which is a sum of five pixels of the red color (5R), is generated. Thereafter, the 5-pixel-summed charges, i.e. the 5-pixel-summed charges from the even-numbered lines, are vertically transferred beneath the electrodes V1A to get out of the way in order to prevent unintentional mixing of colors, and, charge readout voltage is then applied only to V1B so that the pixels of the second color, i.e. G, in other words the signal charges located on the odd-numbered lines except for those that are multiples of 5 are read out to the vertical transfer paths. As a result, the signal charges of all the pixels G except for those under the electrodes V1A, where the aforementioned 5-pixel-summed charges 5R, are read out. Then, a 1-stage vertical transfer is performed to remove the 5-pixel-summed charges 5R from the electrodes V1A. Then, signal readout voltage is applied to the electrodes V1A. As a result of this voltage application, a total of signal charges of two pixels, i.e. the signal charge of G at each electrode V1A and the signal charge G that had been read beforehand and has been transferred from the location one line upper than V1A, are summed up. Then, in the same manner as described before, 3-stage vertical transfer is performed, while the charge readout voltage applied to V1A is maintained. As the potential well remains deep under each electrode V1A, which is located at every 10th line, i.e. at every fifth stage along the vertical transfer path, the signal charges of the remaining three G pixels that are closest to the upper end of the electrode V1A are added to the signal charges of the aforementioned two pixels at that point. With 5 pixels of the same color thus summed up, the second summed-signal charge, which is a sum of five pixels of the green color (5G), is generated.

As a result of the process described above, all the pixels are read out to the vertical trans path in the repeating pattern of 5G, 5R, empty, empty, empty, 5G, 5R, empty, empty, empty, . . . and on. Thereafter, with all the signals read out of the CCD by repeating a set of transfers consisting of a 1-stage vertical transfer, a horizontal transfer, a 5-stage vertical transfer, and a horizontal transfer, the same-color summation full-pixel readout is completed at a frame rate that is 5 times faster.

Next, the first example of a CCD 2 according to the invention is explained hereunder, referring to FIGS. 1, 2, and 12 through 22.

Referring to FIG. 1, the CCD 2 is an interlace scanning CCD of an interline type that permits omission readout in a multi-color Bayer arrangement and is capable of both capturing still images and capturing moving images. To capture still images, the CCD 2 reads all the pixels individually by functioning in affiliation with the mechanical shutter. As it is designed to handle a far greater number of pixels than a CCD dedicated to moving image pickup does, it permits omission readout that calls for selectively reading the pixels on only one-fifth of all the horizontal lines to capture moving images. Thus, in spite of the great number of pixels to be handled, a high frame rate (the number of frames per unit of time) can be maintained during capture of moving images.

The CCD 2 is adapted to be driven based on drive signals from the CCD driving circuit 3 so as to output image signals. As will be explained later, drive signals output from the CCD driving circuit 3 to the CCD 2 include signals supplied to vertical transfer path gate electrodes V1A,V1B,V2,V3A, V3B,V4, which are adapted to receive vertical transfer path gate signals. The CCD driving circuit 3 also functions to receive driving-mode switching signals 101 from the CPU 14, which is a control means of a digital camera, and change the driving mode of the CCD2 based on the driving-mode switching signals 101 thus input into the CCD driving circuit 3. According to the present example, the CCD 2 is adapted to be switched between three driving modes: the full-pixel individual readout mode (the still image mode), the omission readout mode (the moving image mode as well as the preliminary measurement mode), and the summation readout mode.

As can be seen in the internal structure shown in FIG. 2, the CCD 2 includes photodiodes 15 serving as the photoelectric converting means, vertical transfer paths 16 which are connected to said photodiodes 15 and serve as the first vertical transfer paths, and vertical transfer path gate signal wirings 18 are respectively connected to the vertical transfer paths 16. In FIG. 2, an arrow 19 represents the forward direction, i.e. the direction of transfer towards the horizontal transfer path, which is not shown in the drawing. In the explanation hereunder, the direction opposite to said direction towards the horizontal transfer path is referred to as the reverse direction, and transfer in the reverse direction is referred to as reverse transfer.

Each photodiode 15 forms a pixel. The photodiodes 15 are two-dimensionally arranged in a given pattern. According to the present example, they are arranged in a primary color Bayer arrangement, i.e. a Bayer arrangement consisting of the primary colors so that a given vertical column has a color filter arrangement of RGRG . . . , with Rs located on the even-numbered lines and Gs on the odd-numbered horizontal lines and that and a column adjacent to this column has a color filter arrangement of GBGB . . . , with Gs located on the even-numbered lines and Bs on the odd-number horizontal lines.

Signal charge accumulated on each photodiode 15 is read out to the adjacent vertical transfer path 16 as a result of application of a signal charge readout pulse, which is a charge readout voltage with a plus potential, to the corresponding gate electrode of the vertical transfer path 16. As shown in FIG. 2, the combination of the vertical transfer path gate electrodes that are installed in the CCD 2 to perform charge readout described above consists of four signal charge readout electrode systems V1A,V1B,V3A, V3B. With vertical transfer-dedicated gate electrodes V2,V4 added to these four signal charge readout electrode systems, there are a total of six vertical transfer path gate electrode systems, all of which are respectively connected to the vertical transfer path gate signal wirings 18. The wire arrangement that is most widely used at present in a multi-pixel CCD for both capturing still images and capturing moving images is used for the vertical transfer path gate signal wirings 18 of this example. As shown in FIG. 2, V1A is connected to every 10th pixel, i.e. to a pixel located at every 10th line, and V3A, too, is connected to every 10th pixel. To be more specific, V1A is connected to a pixel G or pixel B on an odd-numbered line of a multiple of 5, and V3A is connected to a pixel R or pixel B on an even-numbered line of a multiple of 10. Therefore, ⅕ omission readout can easily be performed by selectively reading out signal charges only from the pixels located adjacent to V1A or V3A.

The present example merely shows an example of CCDs according to the invention; there are actually various CCDs that permit omission readout at different omission rates respectively, depending on at what intervals electrodes corresponding to V1A/V3A are arranged, taking color filters into consideration. It should be understood, for example, simply increasing the number of gate electrode systems used for charge readout so as to perform highly complicated readout that could not be easily executed with the electrode arrangement explained above not only complicates the internal wiring of the CCD but also necessitates increase of external driving circuits by the number of the vertical transfer path gate wirings that were increased, resulting in various problems, such as an increase in cost, size and power consumption of the apparatus.

Now, how signal readout is actually performed is explained, starting with the full-pixel individual readout mode.

As a result of an action of the electronic shutter, unneeded signal charges are abandoned from the photodiodes 15 to the substrate section of the CCD, and all the photodiodes 15 simultaneously begin to accumulate signal charges in response to exposure through the optical system (not shown). When the exposure is completed with the elapse of a given time period, the optical paths to the photodiodes 15 are blocked by a light shielding means, such as a mechanical shutter (not shown). From then on, the photodiodes 15 remain in darkness until all the signal charges are completely read out.

Next, how charge readout and vertical transfer are performed is explained hereunder, referring to FIGS. 12 and 13. FIGS. 12 and 13 show the manner of charge readout and vertical transfer, i.e. vertical transfer waveforms and potentials, on the column at the left end as viewed in FIG. 2. In the explanation hereunder, however, it should be understood that the same operation is also performed on all the other columns, including the one adjacent to said left-end column. In other words, charge readout and vertical transfer are performed by horizontal lines. In FIGS. 12 and 13, the waveforms identified with labels V1A-V4 represent voltages waveforms of vertical transfer path gate signals, and the waveforms that extend perpendicular to the waveforms V1A-4 and are identified with labels A-G represent potentials of the vertical transfer paths. In the drawings, numerals 21 and 22 respectively denote charge readout pulses and signal charges that have been read out. In the initial stage, the gate signals and the potentials of the vertical transfer path are in the state represented by 'A' in FIG. 12. When charge readout pulses 21 are applied to V3A,V3B as shown by 'B' in FIG. 12, all the signal charges on the even-numbered lines are read out to the vertical transfer path as shown in FIG. 12C. Thereafter, as shown in FIGS. 12D-G, a given voltage is applied to V1A-V4 to perform 1-stage vertical transfer of the signal charges 22 that have been read out so that the signal charge 22 on the bottommost line is transferred to the horizontal transfer path (not shown in the drawing). All the signal charges (pixel charges) thus transferred to the horizontal transfer path are read by horizontal transfer. Then, by repeating this set of a 1-stage vertical transfer and a horizontal transfer, the signal charges on all the even-numbered lines are individually read and output from the CCD 2. Thus, readout of the first field is completed.

Next, When the gate signals and the potentials of the vertical transfer path are in the state represented by 'A' in FIG. 13, charge readout pulses 21 are applied to V1A,V1B as shown by 'B' in FIG. 13 so that all the signal charges on the odd-numbered lines are read out to the vertical transfer path as shown in FIG. 13C. Thereafter, a given voltage is applied to V1A-V4 to vertically transfer the signal charges 22 thus read out by the amount of half stage as shown in FIGS. 13D-E, and subsequently by the amount of a single stage as shown in FIG. 13F-I so that the signal charge 22 on the bottommost line is transferred to the horizontal transfer path (not shown in the drawing). All the signal charges (pixel charges) thus transferred to the horizontal transfer path are read by horizontal transfer. Then, by repeating this set of a 1-stage vertical transfer and a horizontal transfer, the signal charges on all the even-numbered lines are individually read and output from the CCD 2. Thus, readout of the second field is completed.

Figure 20:
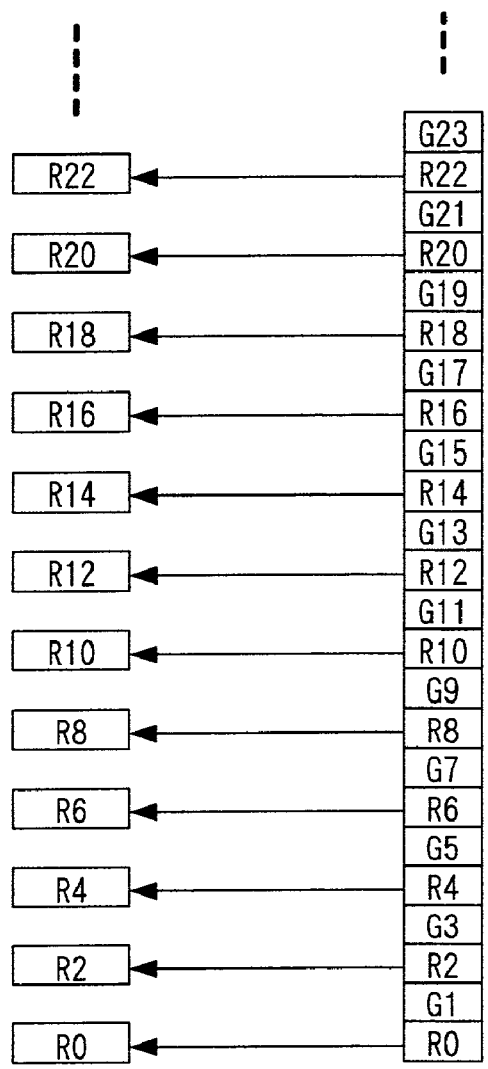
FIG. 20 is a schematic illustration to explain the outline of the full-pixel individual readout mode of said CCD of the image capturing apparatus.
Figure 20:
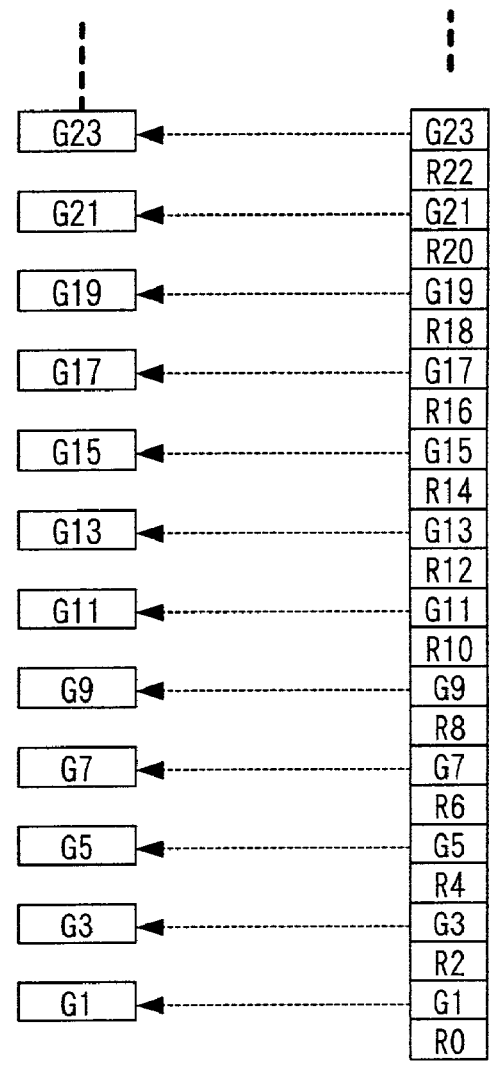

With the signal charges on the CCD 2 read out with two fields, operation in the full-pixel individual readout mode is completed. As schematically shown in FIG. 20, the full-pixel individual readout mode calls for individually reading all the pixels by using two fields conjointly with an external light-shielding means. This mode is not suitable for capturing moving images for various reasons: each frame is divided into two fields which respectively consist of even-numbered lines and odd-numbered lines; it requires an application of a physical light shielding means, such as a mechanical shutter; and the frame rate is very slow. However, as it calls for individually reading all the pixels on a multi-pixel CCD, this mode realizes an ideal still image with extremely high resolution.

Next, explanation is given of how the CCD 2 according to the present example operates in the one-fifth omission readout mode, which is the normal mode of operation and calls for reading signal charge on one-fifth of all the horizontal columns and omitting those on the remaining four parts. The one-fifth omission readout mode is principally used for capturing moving images. Selected color filters are carefully combined so that each field contains color filter signals of all the colors (R, G and B). As R, G and B are read out onto a field with a single operation of exposure and readout, readout of signal charges does not require shielding from light with a mechanical shutter or by other light shielding means. As charge readout pulses are applied only to the electrodes V1A,V3A in this mode, readout is not performed on the other pixels, in other words on the photodiodes 15 that are not connected to these electrodes V1A,V3A. For example, referring to FIG. 2, the photodiodes 15, i.e. pixels, that are located on the horizontal lines shown in shaded tone (R0,G0,G5,B5,R10,G10 . . . ) alone are selectively read out.

Next, how readout is performed is explained hereunder, referring to FIG. 14. FIG. 14 shows the manner of charge readout and vertical transfer on the column at the left end as viewed in FIG. 2. In the explanation hereunder, however, it should be understood that the same operation is also performed on all the other columns, including the one adjacent to said left-end column. In other words, charge readout and vertical transfer are performed by horizontal lines. In FIG. 14, numerals 21a and 21b denote charge readout pulses applied to V3A and V1A, respectively. Numeral 22a denotes signal charges that have been selectively read out from lines RG, while numeral 22b denotes signal charges that have been selectively read out from lines GB.

In the initial stage, the gate signal and the potential of the vertical transfer path are in the state represented by 'A' in FIG. 14. When charge readout pulses 21a are applied to V3A as shown by 'B' in FIG. 14, the signal charge 22a on a line containing a pixel R is read to the vertical transfer path at 10-line intervals, i.e. R0,R10,R20 . . . as shown in FIG. 14C. Thereafter, as shown in FIGS. 14D-E, a given voltage is applied to V1A-V4 to perform a ½-stage vertical transfer of the signal charges 22a that have been read out. As shown in FIGS. 14F, charge readout pulses are then applied to V1A so that the signal charge 22b on a line containing a pixel G is read to the vertical transfer path at 10-line intervals in the same manner as above, i.e. G5,G15 . . . as shown in FIG. 14G. In this state, only two stages of every five stages of the charge retaining section of the vertical transfer path hold signal charges 22a,22b, while the remaining three stages are empty. Therefore, 3-stage vertical transfer is performed thereafter, followed by horizontal transfer. When the horizontal transfer is completed, 2 stage vertical transfer is performed thereafter, followed by horizontal transfer, and so forth. By repeating transfers in this manner, the signal charges are sequentially transferred along the vertical transfer path.

Figure 21:
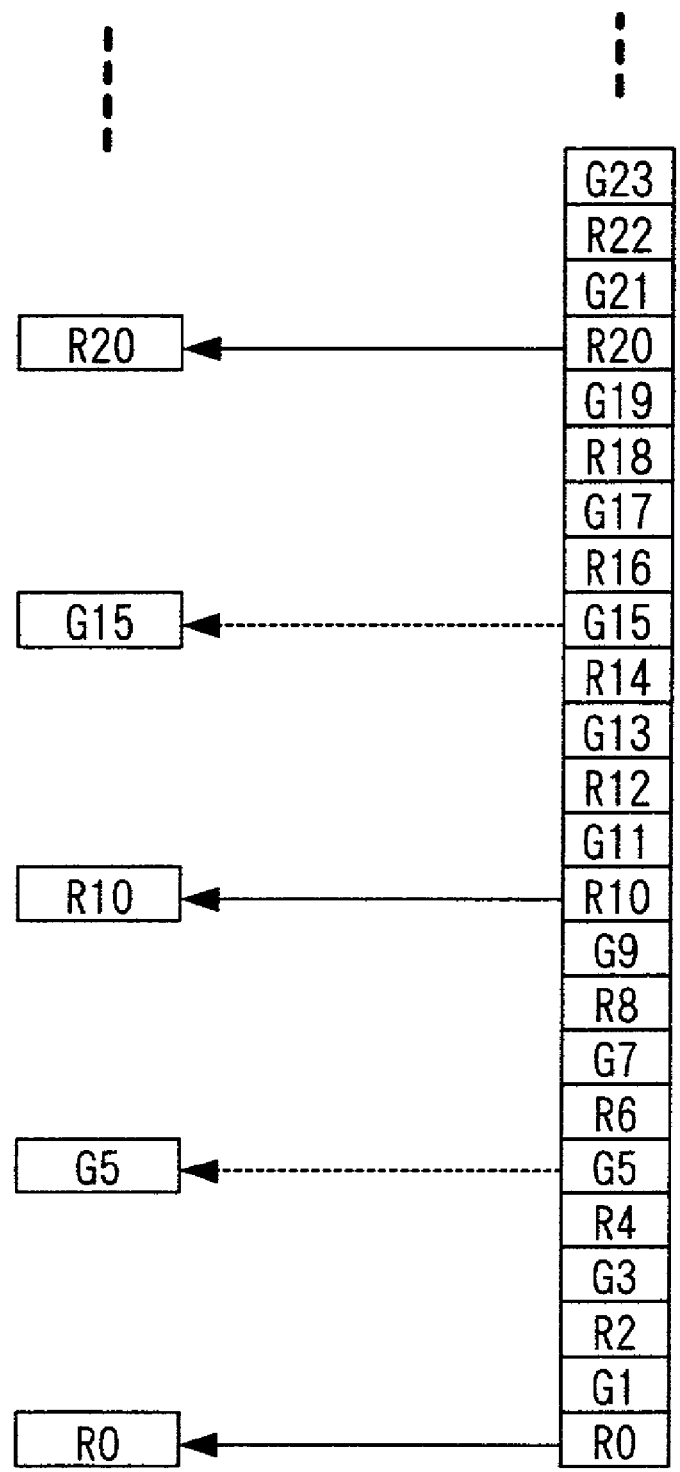
FIG. 21 is a schematic illustration to explain the outline of the omission readout mode of said CCD of the image capturing apparatus.

As schematically shown in FIG. 21, the image capturing apparatus operates in this moving image mode at a frame rate five times faster than that in the full-pixel individual readout mode. Because of substantial omission of lines, however, images obtained by this moving image mode inevitably present a greatly reduced spatial frequency reproducibility with respect to the vertical direction of the images.

Next, the same-color-5-line summation full-pixel readout mode, which is a summation readout mode used for capturing moving images, according to the present example is explained hereunder, referring to FIGS. 15 and 16.

FIGS. 15 and 16 show the manner of charge readout and vertical transfer, i.e. vertical transfer waveforms and potentials, on the column at the left end as viewed in FIG. 2. In the explanation hereunder, however, it should be understood that the same operation is also performed on all the other columns, including the one adjacent to said left-end column. In other words, summation, charge readout, and vertical transfer are performed by horizontal lines. The voltages waveforms of vertical transfer path gate signals identified with labels V1A-V4 in FIG. 15 are the same as the voltages waveforms of vertical transfer path gate signals identified with labels V1A-V4 in FIG. 16. Regarding the waveforms that extend perpendicular to the waveforms V1A-V4 and are identified with labels A-T, those shown in FIG. 15 represent potentials of the vertical transfer paths in the first half of the process, and those shown in FIG. 16 represent potentials of the vertical transfer paths in the second half of the process.

In the initial stage, the gate signals and the potentials of the vertical transfer path are in the state represented by 'A' in FIG. 15. When the electrodes V3A,V3B receive charge readout pulses 31*a*,31*b*, which function as charge readout voltages for the respective electrodes V3A,V3B, as shown by 'B' in FIG. 15, only the signal charges 33 on all the even-numbered lines are read out to the vertical transfer path. Thereafter, as shown in FIGS. 15C-H, while the charge readout pulse 31*a* applied to V3A is maintained, application of the charge readout pulse 31*b* to V3B is stopped. In this state, vertical transfer is performed in the forward direction by the amount of 4 stages. Even after the vertical transfer, the potential well remains deep at each electrode V3A, which is located at every 10th line, i.e. at every fifth stage. Therefore, in the charge retaining section under each V3A, the signal charges equivalent to five pixels of the same color, i.e. R, are mixed together, in other words summed up. With application of the charge readout pulse 31*a* to V3A stopped, the 5-pixel-summed charges 34 (the first summed-charges), each of which results from summation of signal charges of five pixels, are retained as shown in FIG. 15I and FIG. 16I, with one stage containing one 5-pixel-summed charge 34.

By applying a given voltage to the electrodes V1A-V4 in the state shown in FIG. 15I and FIG. 16I, the 5-pixel-summed charges are vertically transferred towards the horizontal transfer path by the amount of 2.5 stages as shown in FIG. 16J-L so that the 5-pixel-summed charges from the even-numbered lines are temporarily sheltered under the respective electrodes V1A. In this state, charge readout pulses 32*b* are applied to V1B as shown in FIG. 16M to read out the signal charges on four-fifth of the odd-numbered lines. Then, as shown in FIG. 16N, after application of the charge readout pulse 32*b* to V1B is stopped, given voltages are applied to the electrodes V1A-V4 so that the 5-pixel-summed charges 34 of the even-numbered lines and the signal charges of said four-fifth of the odd-numbered lines are vertically transferred towards the horizontal transfer path by the amount of one stage as shown in FIG. 16O-R.

Next, as shown in FIG. 16S, charge readout pulses 32*a* are applied to V1A to read out to the vertical transfer path the signal charges on the remaining one-fifth of the odd-numbered lines. Thereafter, when application of the charge readout pulse 32*a* to V1A has been stopped as shown in FIG. 16T, the signal charges are in such a state that two odd-numbered pixels adjacent to each other are mixed under each electrode V1A shown in FIG. 16T and that a signal charge for one pixel is read into the charge retaining section of each one of the other odd-numbered lines. In this state, the signal charges of all the pixels are read out to the vertical transfer path, with signal charges added to some of the signal charges, in a repeated pattern of 5R,2G,G,G,G, 5R,2G,G,G,G, . . . .

Figure 17:
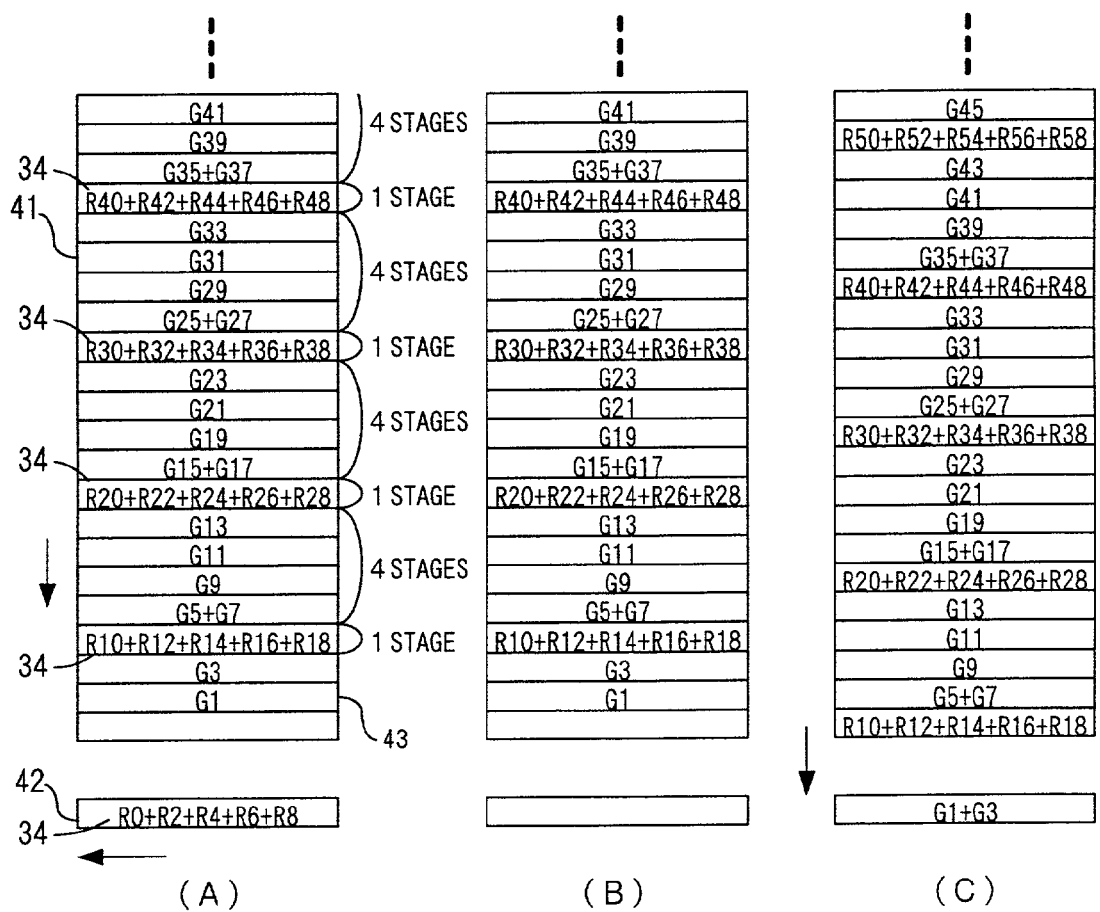
FIG. 17 is a schematic illustration to explain the summation readout mode of said CCD of the image capturing apparatus.
Figure 18:
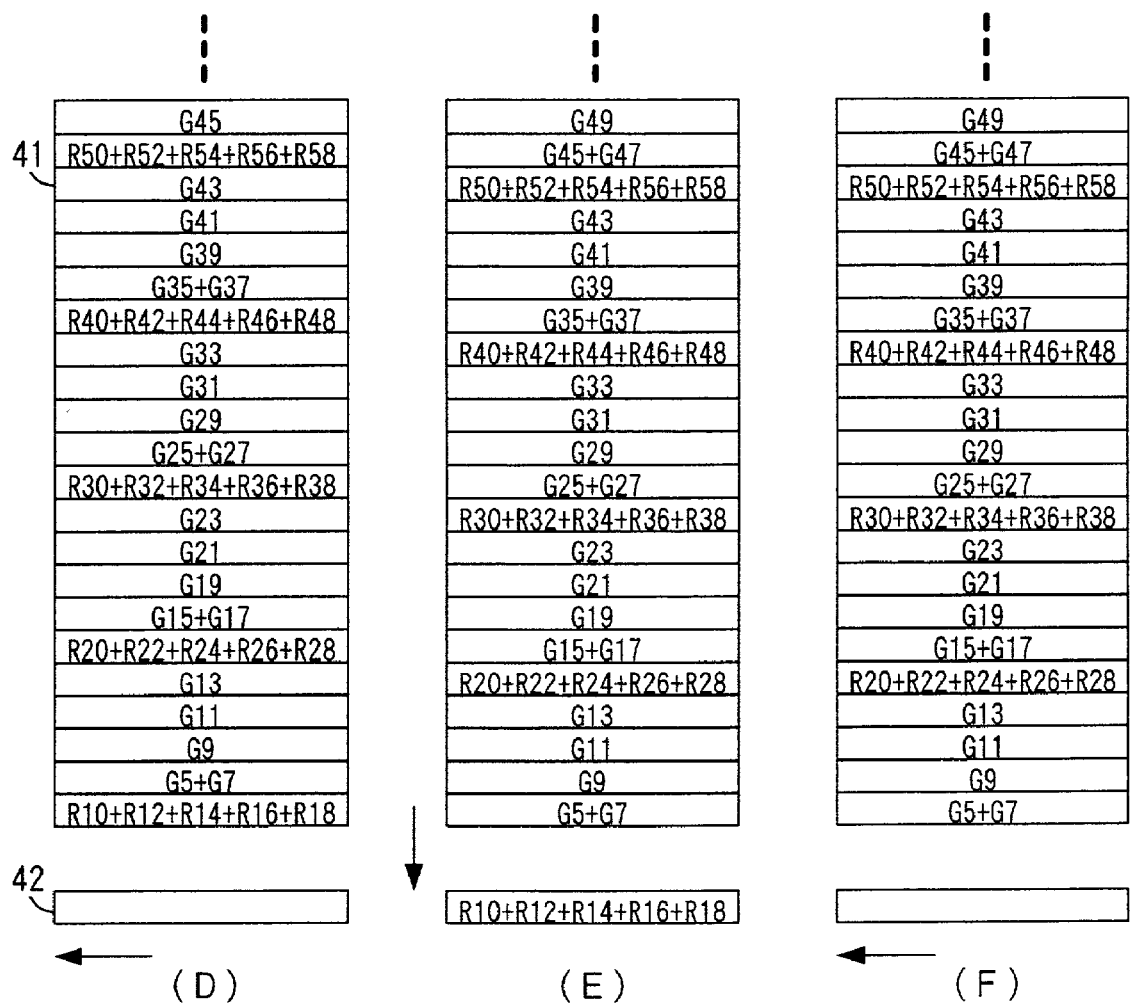
FIG. 18 is a schematic illustration to follow said FIG. 17.
Figure 19:
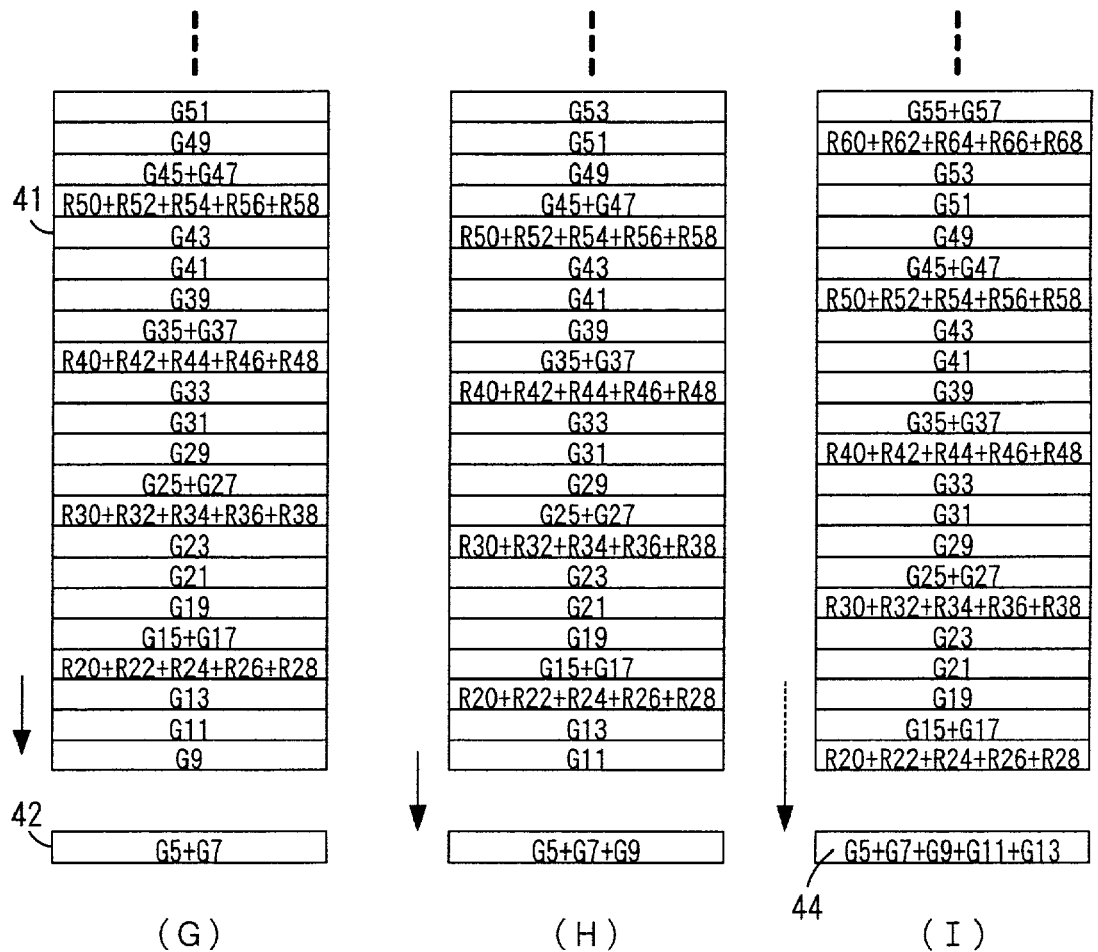
FIG. 19 is a schematic illustration to follow said FIG. 18.

Vertical transfer and horizontal transfer that follow the above are performed as shown in FIGS. 17 to 19. FIG. 17(A) shows the state of the vertical transfer path shown in FIG. 16T. Numerals 41 and 42 in FIGS. 17 to 19 respectively denote a vertical transfer path and a horizontal transfer path. In the step shown in FIG. 17(A), the aforementioned 5-pixel-summed charge (R0+R2+R4+R6+R8) 34 from even-numbered line is already in the horizontal transfer path 42. Therefore, after the 5-pixel-summed charge (R0+R2+R4+R6+R8) 34 is read out by horizontal transfer as shown in FIG. 17(B), vertical transfer is performed while the horizontal transfer is at a standstill as shown in FIG. 17(*c*) to perform odd-numbered-line summation, i.e. mixing of pixels from odd-numbered lines, in the horizontal transfer path. In state shown in FIG. 17(*c*), however, summation of pixels is insufficient, because there are only signal charges (G1+G3) on the horizontal transfer path. This is because G1 and G2 represent pixels located at an edge of a frame. Therefore, after the signal charges (G1+G3) are output by horizontal transfer as shown in FIG. 18(D), another 5-pixel-summed charge (R10+R12+R14+R16+R18) 34 resulting from summation of five pixels on even-numbered lines is transferred to the horizontal transfer path by a 1-stage vertical transfer as shown in FIG. 18(D).

Thereafter, as shown in FIG. 18(D), the 5-pixel-summed charge (R10+R12+R14+R16+R18) 34 is output by horizontal transfer. Then, as shown in FIG. 19(G), another combination of signal charges (G5+G7) resulting from summation of two pixels on odd-numbered lines is transferred to the horizontal transfer path by a 1-stage vertical transfer. Before another horizontal transfer is performed, a 3-stage vertical transfer is performed so that signal charges from odd-numbered lines are summed up in the horizontal transfer path as shown in FIG. 19(H-I) to generate another 5-pixel-summed charge (G5+G7+G9+G11+G13) 44, which results from summation of signal charges of five pixels and serves as a second summed-charge.

After this signal charge is output by horizontal transfer, a set of transfers consisting of a 1-stage vertical transfer, a horizontal transfer, a 4-stage vertical transfer, and a horizontal transfer is repeated in the same manner as above to read out the remaining signals to the outside of the CCD. By thus reading out all the pixels to the vertical transfer paths 41 with signal charges added to a part of the pixels and, thereafter, transferring them along the vertical transfer paths 41 by repeating a transfer set consisting of a 1-stage transfer and a 4-stage transfer, the signals of all the pixels can be read out at a frame rate five times faster than that in the still image mode.

Figure 22:
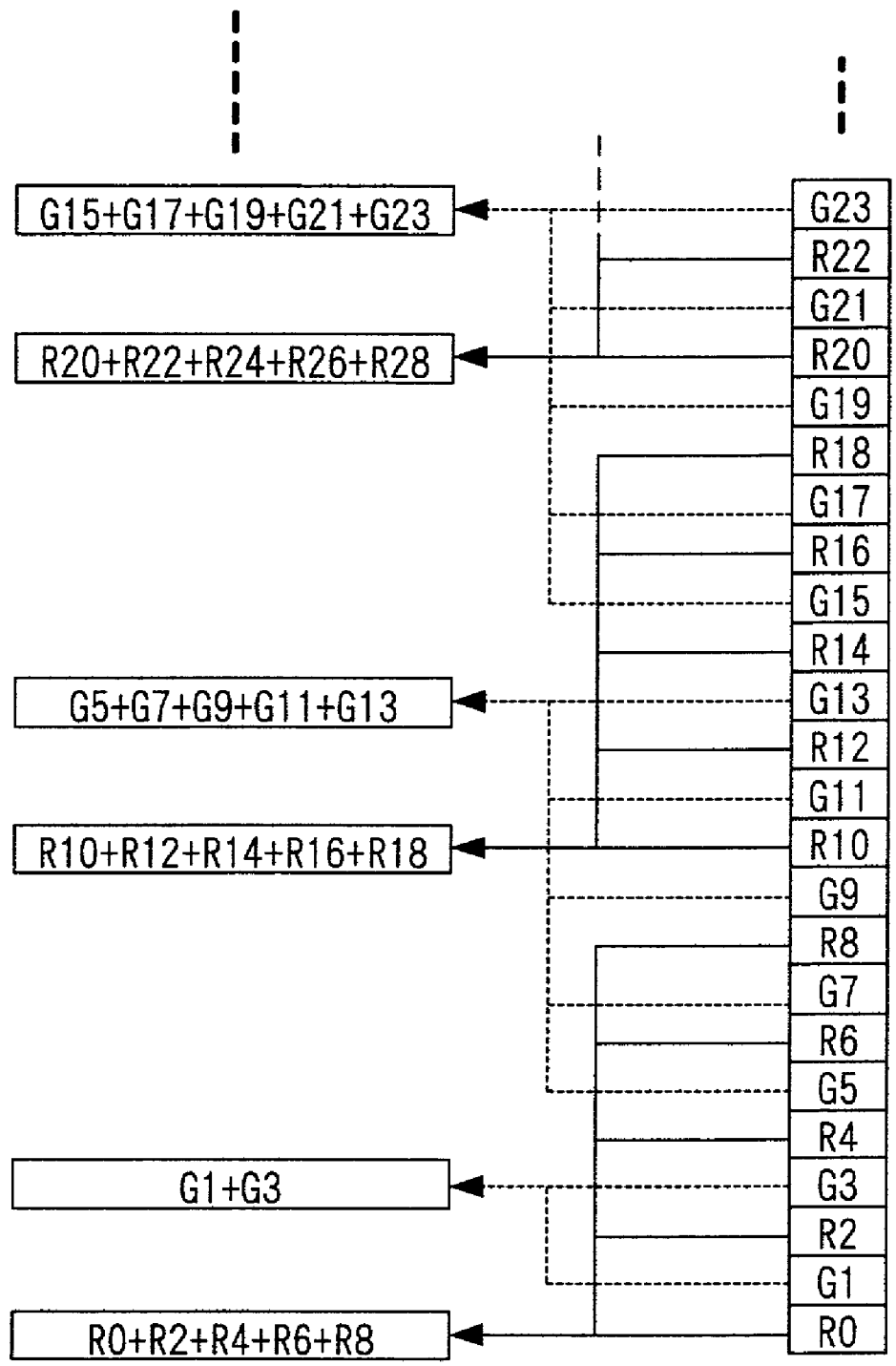
FIG. 22 is a schematic illustration to explain the outline of the summation readout mode of said CCD of the image capturing apparatus.

FIG. 22 schematically illustrates the final manifestation of combinations of pixels summed up and read out by the summation readout mode described above. Normally, the signal charges should be arranged in such a pattern as G1-3 R0-8 G5-13 R10-18 G15-23 R20-28. . . . According to the present example, however, summation signals, i.e. 5-pixel-summed charges, are read out in the order of R0-8 G1-3 R10-18 G5-13 R20-28 G15-23 . . . as shown in FIG. 22. In other words, the positional relationship between the even-numbered lines and the odd-numbered lines is reversed. Such a reversal can be cancelled out by using an external component which is provided externally of the CCD 2, i.e.

downstream from the CCD 2 of the present example, for image processing or other similar functions. For example, a line buffer having the function of a processing unit which is capable of recording image data for one line may be included in the image capturing apparatus and function in such a manner as to temporarily retain line signals output earlier and permit the subsequent line signals to pass first before the former or first mentioned line signals thereby rearranging the order of the even-numbered line signals and odd-numbered line signals.

Although the present example of the CCD 2 as explained above refers to an example case that uses a primary color Bayer arrangement, method presented in this example is not limited to such an arrangement and applicable to any filter arrangement, provided that the number of colors of the color filters allocated for each column does not exceed two. In other words, the principles of the present example are applicable to almost any one of the filter arrangements available at present, including that used in the fourth example of the CCD 2 explained later.

As described above, with an interlace CCD of virtually any color filter arrangement, the present example enables what can be called high frame rate same-color summation full-pixel readout by merely changing the mode of signal charge readout without having to modify the existing structure. Therefore, the example offers moving images of substantially improved image quality while holding down costs and, as a result of the increase in sensitivity realized by the summation readout mode, the range of shooting conditions for moving images can be widened, particularly when shooting scenes in the dark. Furthermore, even if the number of lines to be summed up is increased in response to advances made in the number of pixels in a CCD, the example described above permits the number of vertical transfer electrodes to remain unchanged, thereby holding down costs.

According to the present example, it is sufficient to transfer signal charges in the forward direction, i.e. towards the horizontal transfer path. As there is no need of reverse transfer, the example is applicable to a CCD with a very low reverse transfer capability and thus has a wide range of use.

Next, the second example of an CCD 2 is explained hereunder, referring to FIGS. 23 to 34. The internal structure and the basic functions including the mechanism of driving the CCD 2 according to the second example are exactly the same as those of the first example shown in FIG. 1, FIG. 2, and other relevant drawings. A feature of the second example lies in an inventive method of driving the CCD 2; by using this method in the 5-line same-color summation readout mode, the example eliminates the necessity of a component provided externally of the CCD 2 to rearrange the order of lines. Such a rearrangement by an external component is necessary with the CCD 2 according to the first example.

Figure 24:
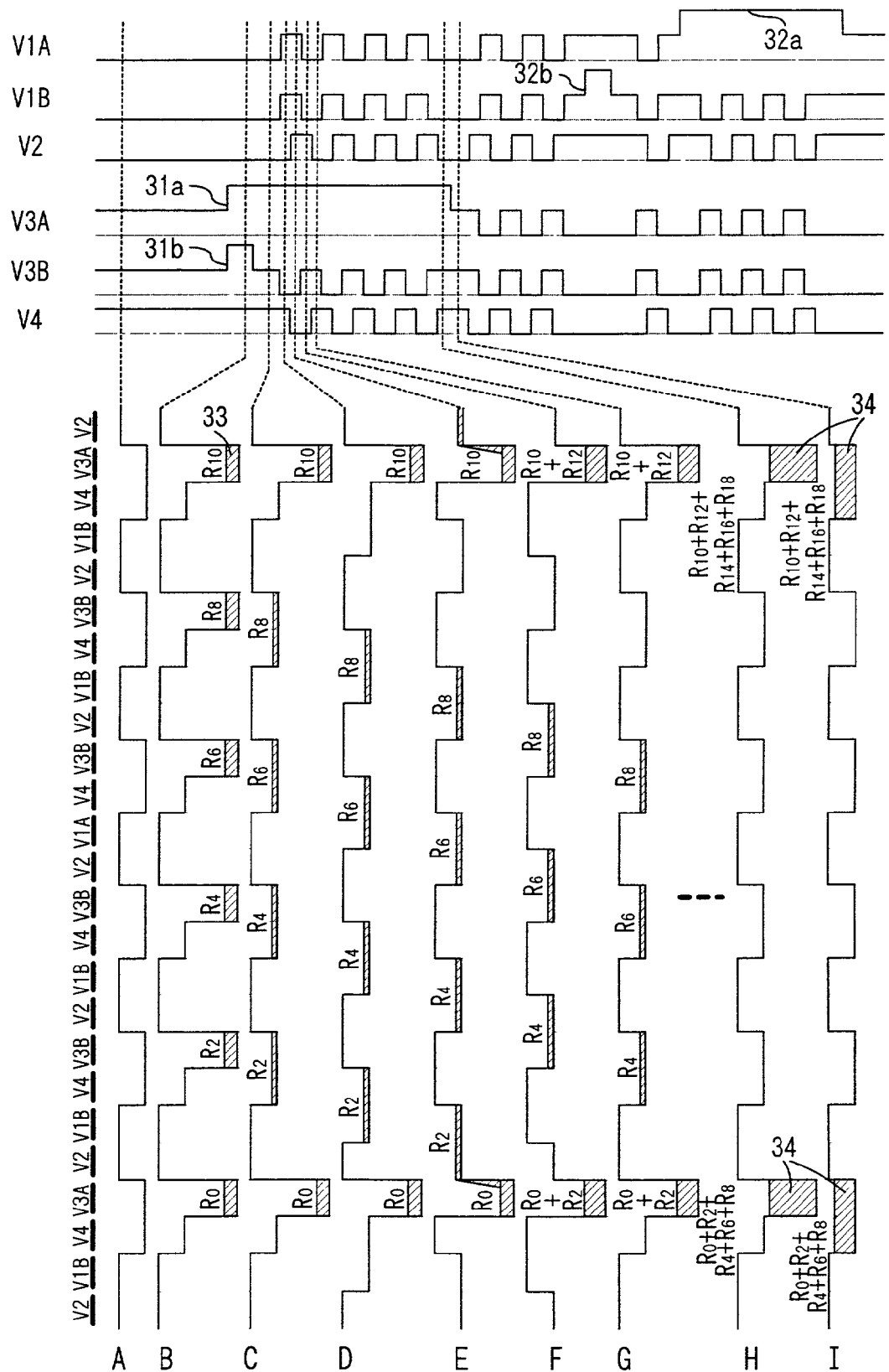
FIG. 24 is a schematic illustration to explain the summation readout mode of a second example of a CCD of an image capturing apparatus according to the present invention.
Figure 25:
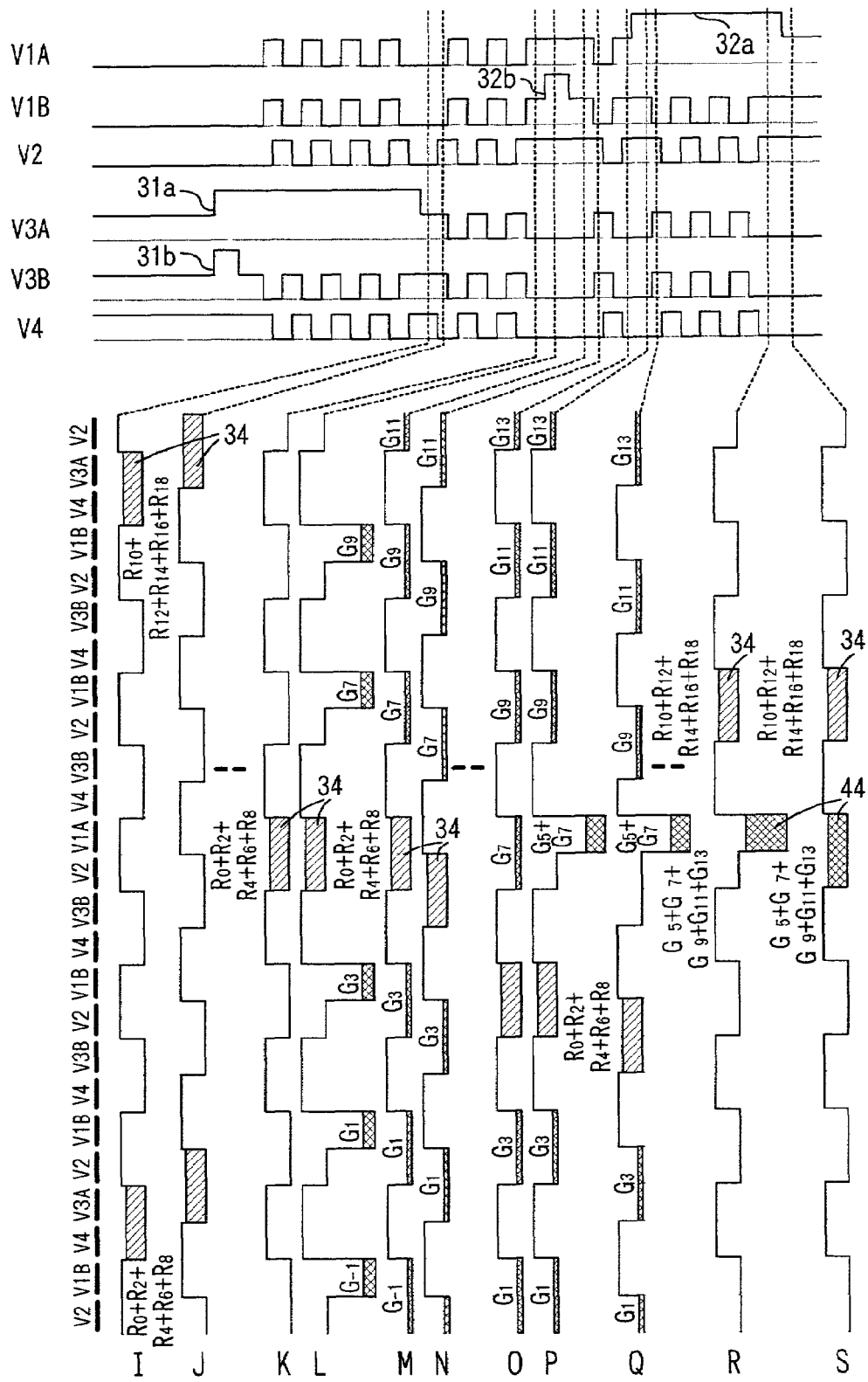
FIG. 25 is a schematic illustration to follow said FIG. 24.

The summation readout mode according to the present example (the same-color-5-line summation full-pixel readout mode) is explained hereunder, referring to FIGS. 24 and 25. FIGS. 24 and 25 show the manner of charge readout and vertical transfer, i.e. vertical transfer waveforms and potentials, on the column at the left end as viewed in FIG. 2. In the explanation hereunder, however, it should be understood that the same operation is also performed on all the other columns, including the one adjacent to said left-end column. In other words, summation, charge readout, and vertical transfer are performed by horizontal lines. The voltages waveforms of vertical transfer path gate signals identified with labels V1A-V4 in FIG. 24 are the same as the voltages waveforms of vertical transfer path gate signals identified with labels V1A-V4 in FIG. 25. Regarding the waveforms that extend perpendicular to the waveforms V1A-V4 and are identified with labels A-S, those shown in FIG. 24 represent potentials of the vertical transfer paths in the first half of the process, and those shown in FIG. 25 represent potentials of the vertical transfer paths in the second half of the process.

In the initial stage, the gate signals and the potentials of the vertical transfer path are in the state represented by 'A' in FIG. 24. When the electrodes V3A,V3B receive charge readout pulses 31a,31b, as shown by 'B' in FIG. 24, only the signal charges on all the even-numbered lines are read out to the vertical transfer path. Thereafter, as shown in FIG. 24C-H, while the charge readout pulse 31a applied to V3A is maintained, application of the charge readout pulse 31b to V3B is stopped. In this state, vertical transfer is performed in the forward direction by the amount of 4 stages. Even after the vertical transfer, the potential well remains deep at each electrode V3A, which is located at every 10th line, i.e. at every fifth stage. Therefore, in the charge retaining section under each V3A, the signal charges equivalent to five pixels of the same color, i.e. R, are mixed together, in other words summed up. With application of the charge readout pulse 31a to V3A stopped, the 5-pixel-summed charges 34, each of which results from summation of signal charges of five pixels, are retained as shown in FIG. 24I and FIG. 25I, with one stage containing one 5-pixel-summed charge 34.

By applying a given voltage to the electrodes V1A-V4 in the state shown in FIG. 24I and FIG. 25I, the 5-pixel-summed charges are vertically transferred away from the horizontal transfer path (in other words reverse transfer is performed) by the amount of 2.5 stages as shown in FIG. 25J-K so that the 5-pixel-summed charges 34 on the even-numbered lines are temporarily sheltered under the respective electrodes V1A. In this state, charge readout pulses 32b are applied to V1B as shown in FIG. 25L to read out the signal charges on four-fifth of the odd-numbered lines. Then, as shown in FIG. 25M, after application of the charge readout pulse 32b to V1B is stopped, given voltages are applied to the electrodes V1A-V4 so that the 5-pixel-summed charges 34 of the even-numbered lines and the signal charges of said four-fifths of the odd-numbered lines are vertically transferred in the forward direction, i.e. towards the horizontal transfer path, by the amount of one stage as shown in FIG. 25N-O.

Next, as shown in FIG. 25P, charge readout pulses 32a are applied to V1A to read out to the vertical transfer path the signal charges on the remaining one-fifth of the odd-numbered lines. As a result, the signal charges are in such a state that two odd-numbered pixels adjacent to each other are mixed under each electrode V1A shown in FIG. 25P and that a signal charge for one pixel is read into the charge retaining section of each one of the other odd-numbered lines. In this state, vertical transfer is performed in the forward direction by the amount of 3 stages as shown in FIG. 25Q-R, while application of the charge readout pulses 32a to V3A is maintained. As a result, the signal charges equivalent to five pixels of the same color, i.e. G, are summed up in the charge retaining section under each V1A as shown in FIG. 25R. Thus, 5-pixel-summed charges are generated. Thereafter, with the application of the charge readout pulse 32a to V1A stopped, the 5-pixel-summed charges 34, each of which results from summation of signal charges of five pixels from even-numbered lines having the same color, and the 5-pixel-summed charges 44, each of which results from summation of signal charges of five pixels from odd-numbered lines and having the same color which is, however, different from the color of the 5-pixel-summed charges 34, are retained as shown in FIG. 25S, with one stage containing one 5-pixel-summed charge 34 or 44.

Figure 26:
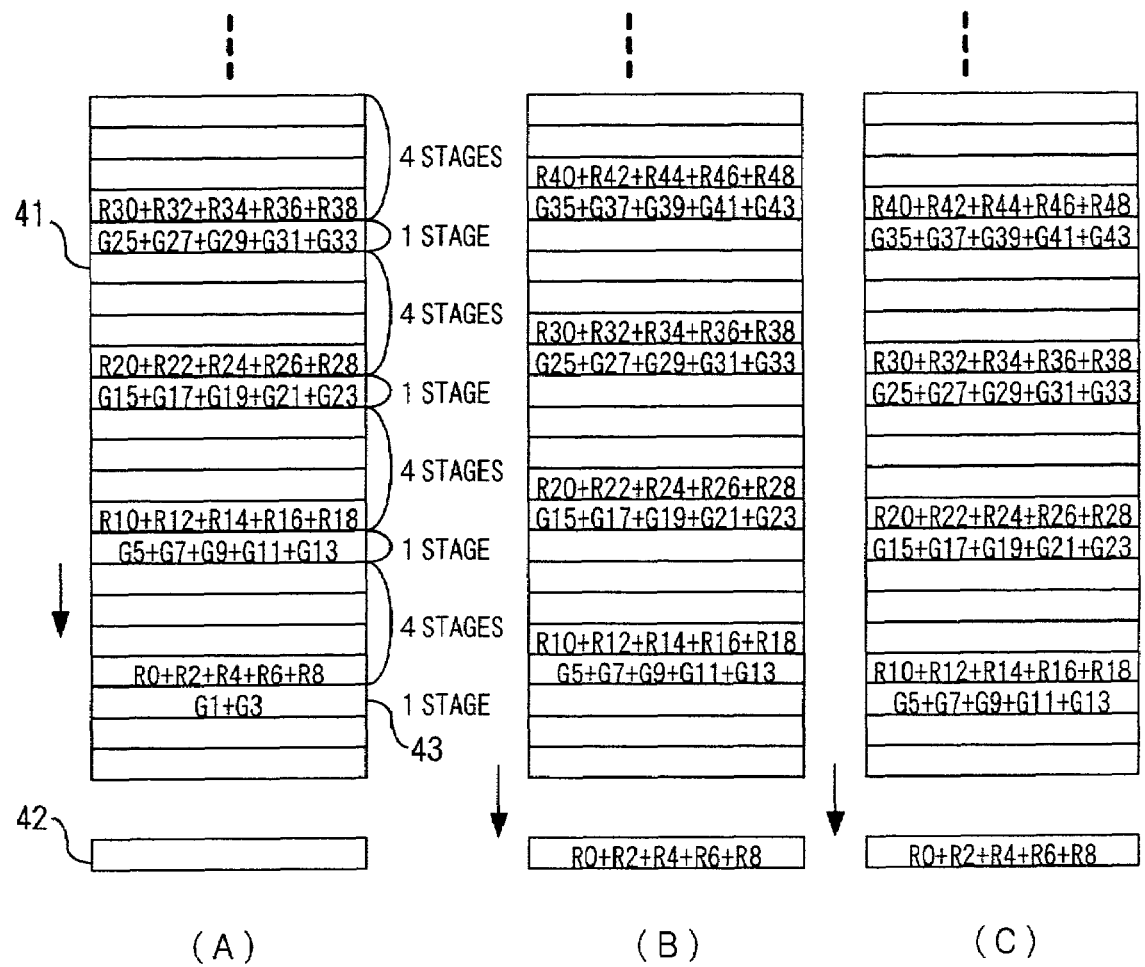
FIG. 26 is a schematic illustration to explain the summation readout mode of said CCD of the image capturing apparatus.
Figure 27:
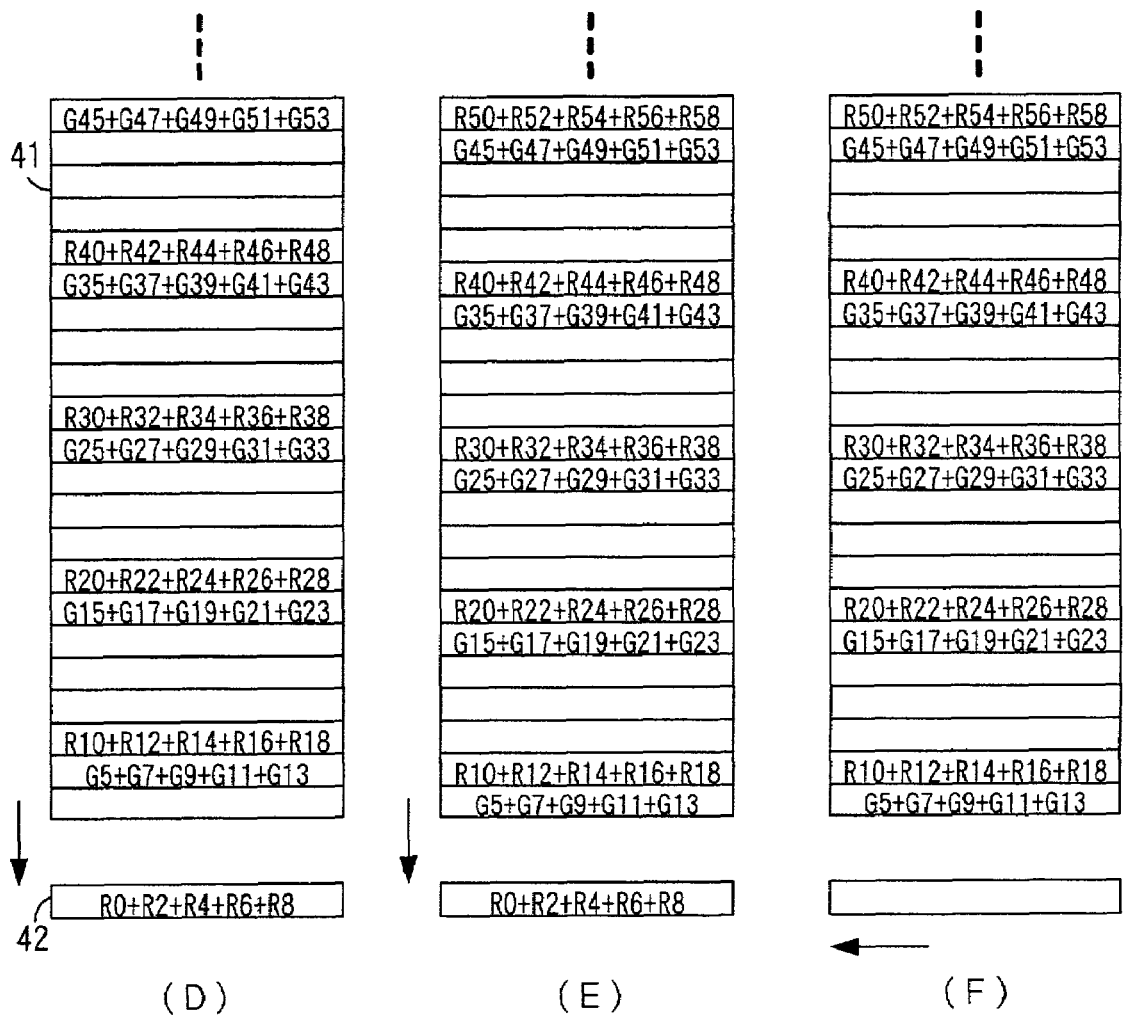
FIG. 27 is a schematic illustration to follow said FIG. 26.
Figure 28:
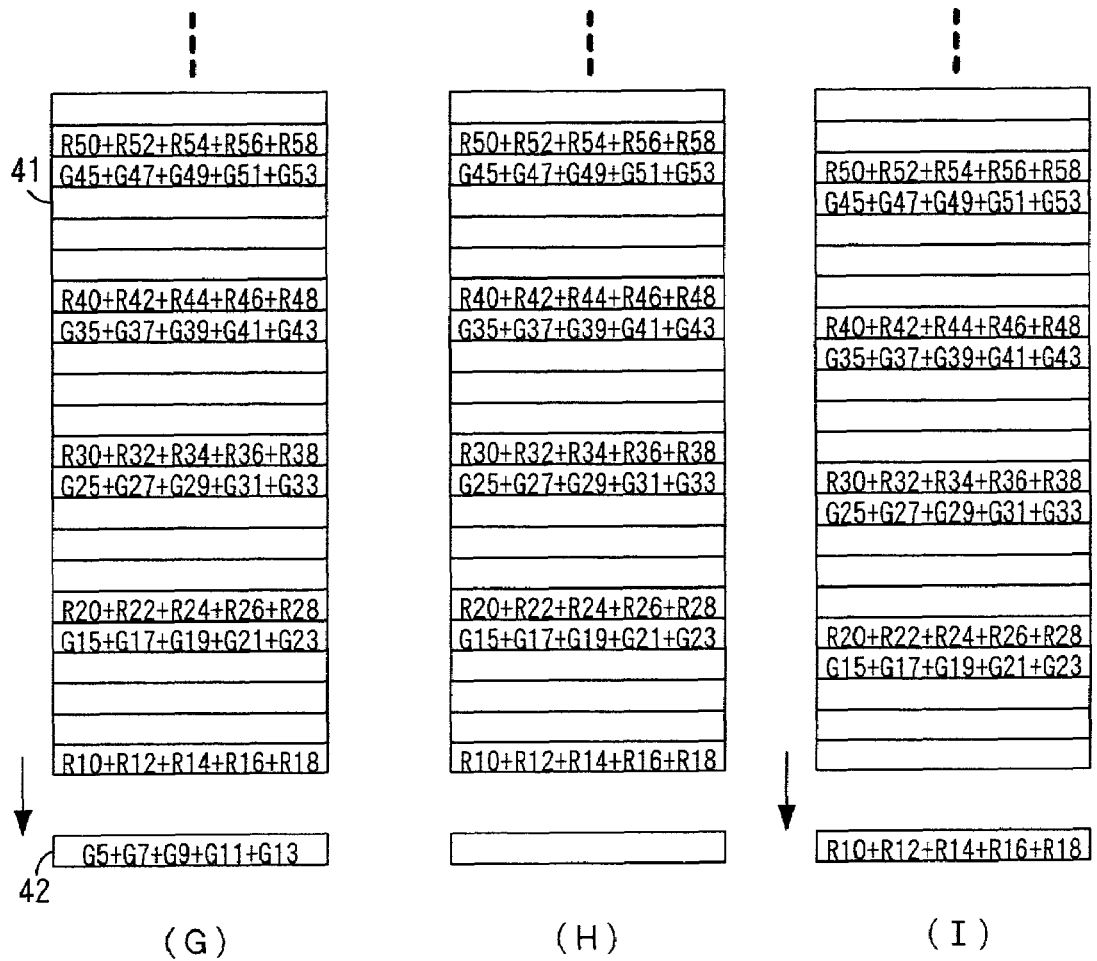
FIG. 28 is a schematic illustration to follow said FIG. 27.

Vertical transfer and horizontal transfer to follow the above are performed as shown in FIGS. 26 to 28. FIG. 26(A) shows the state of the vertical transfer path shown in FIG. 25S. Numerals 41 and 42 in FIGS. 26 to 28 respectively denote a vertical transfer path and a horizontal transfer path. In the process shown in FIGS. 24 and 25, signal charges on a plurality of line are summed up on the vertical transfer path 41. However, at an end of the vertical transfer path (for example the bottommost line 43 located closest to the horizontal transfer path 42), it is not possible to sum up all the effective pixels, resulting in insufficient pixel summation. Therefore, first of all, this insufficient combination of pixels on the line 43 are read out of the CCD by vertical transfer and horizontal transfer. Thereafter, as shown in FIG. 26(B), the first effective 5-pixel-summed charge is transferred to the horizontal transfer path. As there are three stages of empty charge retaining sections above the line that had said 5-pixel-summed charge, 3-stage vertical transfer is performed as shown in FIG. 26(C), FIG. 27(D), and FIG. 27(E) instead of performing horizontal transfer immediately. In other words, including the aforementioned transfer of the first effective 5-pixel-summed charge is transferred to the horizontal transfer path, 4-stage vertical transfer is performed before another horizontal transfer. Thereafter, horizontal transfer is performed as shown in FIG. 27(F) to read out the first effective 5-pixel-summed charge, and the second effective 5-pixel-summed charge is then transferred to the horizontal transfer path by 1-stage vertical transfer as shown in FIG. 28(G). As shown in FIG. 28(H), there is an effective line directly upstream, horizontal transfer is immediately performed this time, followed by a-stage vertical transfer as shown in FIG. 28(I).

Thereafter, a transfer set consisting of a 4-stage vertical transfer, a horizontal transfer, a 1-stage vertical transfer, and a horizontal transfer is repeated in the same manner as above to read out the remaining signals to the outside of the CCD. By thus reading out all the pixels to the vertical transfer paths and summing up signal charges of the same color thereon and, thereafter, transferring them in the forward direction along the vertical transfer paths by repeating a transfer set consisting of a 4-stage transfer and a 1-stage transfer, the signals of all the pixels can be read out at a frame rate five times faster than that in the still image mode.

Figure 23:
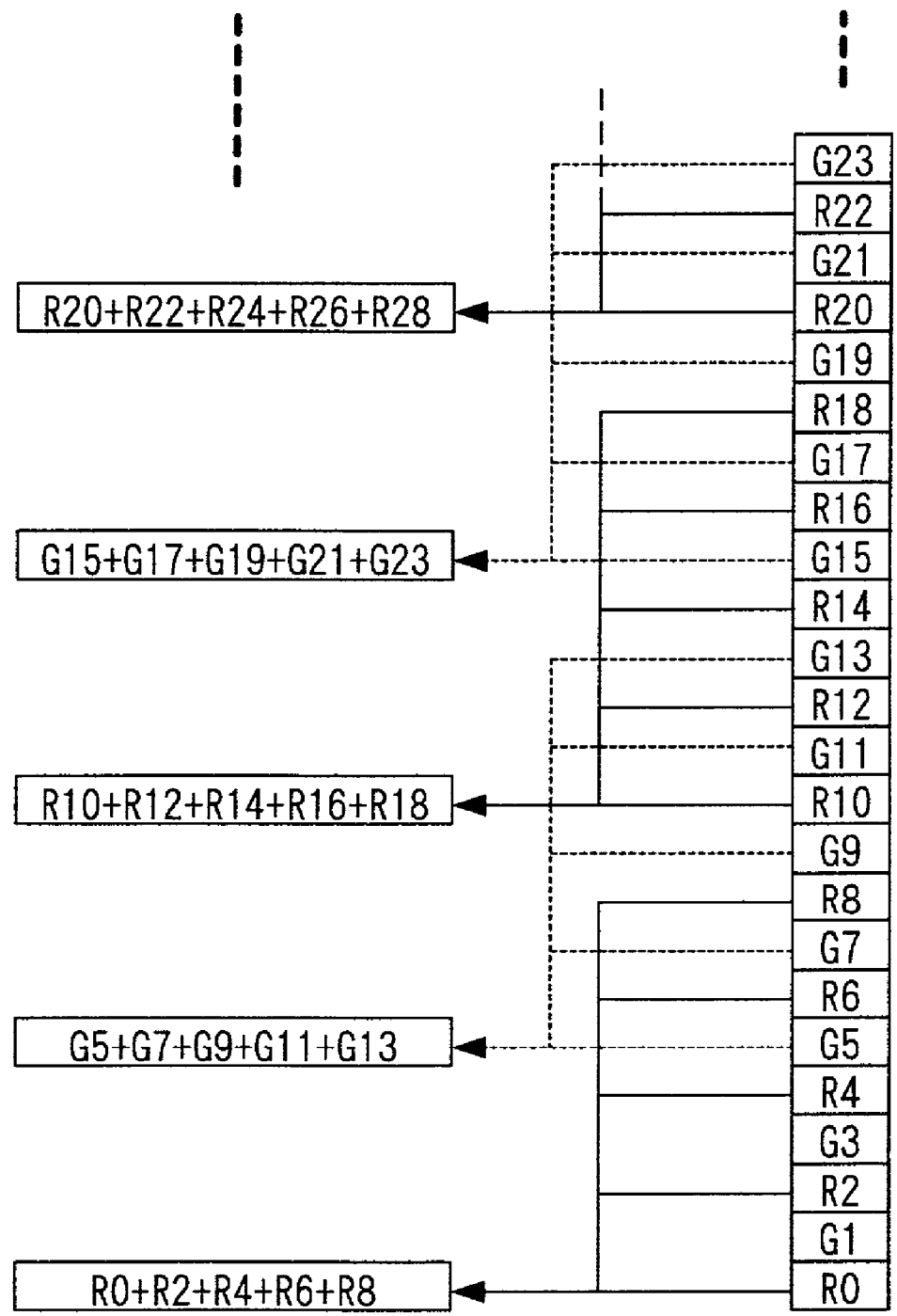
FIG. 23 is a schematic illustration to explain the outline of line readout in the summation readout mode of a second example of a CCD of an image capturing apparatus according to the present invention.

FIG. 23 schematically illustrates the final manifestation of the combinations of pixels summed up and read out by the summation readout mode described above. By performing reverse transfer, i.e. vertical transfer in the reversed direction, in the course of charge readout in the manner described above, the present example enables the rearrangement of the line-by-line order of readout signal charges, thereby eliminating the necessity of making such a rearrangement of the order of lines by means of an external component, and consequently contributing to a reduction in costs.

With the second example of the CCD 2, line summation for the odd-numbered lines as well as the even-numbered lines is completed on the vertical transfer paths. In the same manner as the first example, however, line summation for the odd-numbered lines may be executed in combination with summation on the vertical transfer paths and summation on the horizontal transfer path.

It is also possible with the first example to complete line summation for the odd-numbered lines on the vertical transfer paths in the same manner as the second example.

In other words, with any one of the examples explained in this specification, line summation for the signal charges on the odd-numbered lines may be completed solely on the vertical transfer paths or in combination with summation on the vertical transfer paths and summation on the horizontal transfer path.

Next, the third and fourth examples of an CCD 2 according to the invention, which are shown in FIGS. 29 through 40, are explained in outline. Each of the two examples uses a progressive CCD (a CCD of a progressive scanning type) which permits omission readout.

A normal, omission readout-capable progressive CCD of a 3-phase vertical transfer type has a total of four vertical transfer electrode systems V1,V2A,V2B,V3, including two charge readout electrode systems V2A,V2B. For the purpose of actual application of the invention, it is necessary to increase the charge readout electrodes to a total of four electrode systems, i.e. V2A,V2B,V2C,V2D, and the vertical transfer electrodes to a total of six systems with addition of V1,V3 to said four electrode systems. However, the respective numbers of electrode systems are limited to these numbers, regardless of the number of lines to be summed up.

In cases where the CCD is of a normal, 4-phase vertical transfer type that permits omission readout, a total of five vertical transfer electrode systems V1,V2A,V2B,V3,V4 are provided, including two charge readout electrode systems V2A,V2B. For the purpose of actual application of the invention, it is necessary to increase the charge readout electrodes to a total of four electrode systems, i.e. V1,V2A, V2B,V3, and the vertical transfer electrodes to a total of seven systems with addition of V1,V3,V4 to said four electrode systems. However, the respective numbers of electrode systems are limited to these numbers, regardless of the number of lines to be summed up.

In the case of a progressive CCD, four charge readout electrode systems V2A,V2B,V2C,V2D are provided. Now, for the purpose of presenting an example, reference is made to a CCD having color filters arranged along a given vertical column as RGRG . . . , wherein Rs are located on the even-numbered lines and Gs on the odd-number horizontal lines. The charge readout electrodes V2A serve as the charge readout electrodes for reading pixels R on the lines with their each respective order being a multiple of 10; the charge readout electrodes V2B serve as the charge readout electrodes for reading the remaining pixels R, i.e. the pixels R on the other even-numbered horizontal lines; the charge readout electrodes V2C serve as the charge readout electrodes for reading pixels G on the odd-numbered lines with their each respective order being a multiple of 5; and the charge readout electrode V2D serve as the charge readout electrodes for reading pixels G on the other odd-number horizontal lines.

First, charge readout voltage is applied to V2A and V2B so that all the pixels R, i.e. the signal charges on all the even-numbered lines, are read out to the vertical transfer path. Thereafter, while the voltage on V2B is brought back to the initial stage, the charge readout voltage applied to V2A is maintained. In this state, vertical transfer is performed by the amount of 8 stages. As the potential well remains deep under each electrode V2A, which is located at every 10th line, the signal charges of five pixels of the same color, i.e. R, that are immediately upstream from the electrode V3A are summed up at that point. Thus, a 5-pixel-summed charge as a first summed-charge, which is a sum of five pixels of the red color (5R), is generated.

Then, the 5-pixel-summed charges (R), i.e. the 5-pixel-summed charges from the even-numbered lines, are vertically transferred in the direction away from the horizontal transfer path by the amount of four stages so that the 5-pixel-summed charges (R) get out of the way. Thereafter, charge readout voltages are applied to V2C and V2D so that all the pixels G, i.e. the signal charges on all the odd-numbered lines, are read out to the vertical transfer path. Thereafter, in the same manner as that for the even-numbered lines described above, vertical transfer is performed by the amount of 8 stages with the voltage on V2D brought back to the initial stage and the charge readout voltage applied to each V2C maintained. As a result, the signal charges of five pixels of the same color, i.e. G, that are immediately upstream from each electrode V2C are summed up under said electrode V2C. Thus, 5-pixel-summed charge as the second summed-charges, each of which is a sum of five pixels of the green color (5G), are generated.

As a result of the process described above, all the pixels are read out to the vertical transfer path from the bottom up in the order of 5G, 5R, empty, empty, empty, empty, empty, empty, empty, empty, 5G, 5R, empty, empty, . . . and so on from the bottom up. Thereafter, with all the signals read out of the CCD by repeating a set of transfers consisting of a 1-stage vertical transfer, a horizontal transfer, a 9-stage vertical transfer, and a horizontal transfer, the same-color summation full-pixel readout is completed at a frame rate that is 5 times faster.

Next, the third example of a CCD 2 according to the invention is explained hereunder, referring to FIGS. 29 through 35.

The third example has a structure similar to that of the first example, with its block diagram being the same as FIG. 1. As is evident from its internal structure shown in FIG. 29, the third example is applied to a progressive scanning CCD of an interline type that permits omission readout of a so-called color Bayer arrangement. This progressive scanning CCD is referred to as the CCD 2 in the explanation hereunder.

According to the third example, the CCD 2 is a progressive scanning CCD of a color Bayer arrangement interline type. To capture still images, the CCD 2 reads all the pixels individually in sequence. As the CCD 2 is designed to handle a far greater number of pixels than a CCD dedicated to moving image pickup does, it performs shooting moving images by summing up five pixels each of the same color located on odd-numbered horizontal lines. Thus, in spite of the great number of pixels to be handled, a high frame rate can be maintained during capturing of moving images.

The CCD 2 is adapted to be driven based on drive signals from the CCD driving circuit 3 so as to output image signals. As will be explained later, drive signals output from the CCD driving circuit 3 to the CCD 2 include signals supplied to vertical transfer path gate electrodes V1,V2A,V2B,V2C, V2D,V3, which are adapted to receive vertical transfer path gate signals. The CCD driving circuit 3 also functions to receive driving-mode switching signals and change the driving mode of the CCD2 based on the driving-mode switching signals received.

Figure 29:
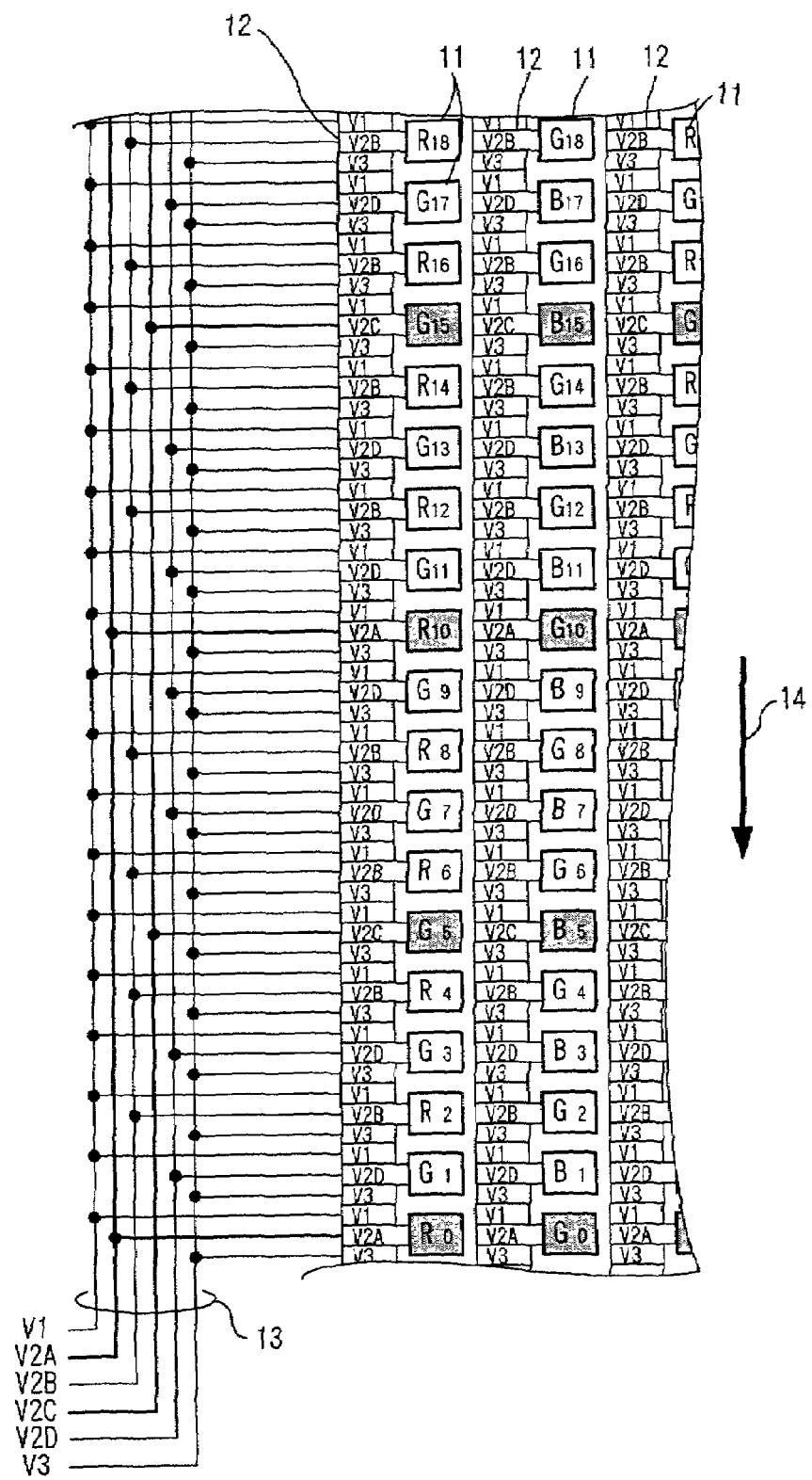
FIG. 29 is a schematic illustration showing a part of the internal structure of a third example of a CCD of an image capturing apparatus according to the present invention.

As can be seen in the internal structure shown in FIG. 29, the CCD 2 includes photodiodes 15 serving as the photoelectric converting means, vertical transfer paths 16 which are connected to said photodiodes 15 and collectively serve as the first CCD, and vertical transfer path gate signal wirings 18 respectively connected to the vertical transfer paths 16. In FIG. 29, an arrow 14 represents the forward direction, i.e. the direction of vertical transfer towards the horizontal transfer path, which serves as a second CCD and is not shown in the drawing.

Each photodiode 15 forms a pixel. The photodiodes 15 are two-dimensionally arranged in a given pattern. According to the present example, they are arranged in the primary color Bayer arrangement, i.e. a Bayer arrangement consisting of the primary colors, so that a given vertical column has a color filter arrangement of RGRG . . . , with Rs located on the even-numbered lines and Gs on the odd-numbered horizontal lines and a column adjacent to this column has a color filter arrangement of GBGB . . . , with Gs located on the even-numbered lines and Bs on the odd-number horizontal lines.

Signal charge accumulated on each photodiode 15 is read out to the adjacent vertical transfer path 16 as a result of application of a charge readout pulse, which is a charge readout voltage with a plus potential, to the corresponding gate electrode of the vertical transfer path 16. As shown in FIG. 29, the combination of the vertical transfer path gate electrodes that are installed in the CCD 2 to perform charge readout described above consists of four electrode systems, i.e. V2A,V2B,V2C,V2D. With vertical transfer-dedicated gate electrodes V1,V3 added to these four signal charge readout electrode systems, there are a total of six vertical transfer path gate electrode systems, all of which are respectively connected to the vertical transfer path gate signal wirings 18.

The CCD 2 of the present example presents a mode of 5-line summation merely as an example; in an actual application there may be various CCDs adapted to permit summation readout with any number of lines, depending on at what intervals electrodes corresponding to V2A/V2C are arranged, taking color filters into consideration. Regardless of an increase in the number of lines to be handled for each summation, the present example does not necessitate increase of the number of vertical transfer path gate electrode systems and, for this reason, the example is effective in holding down costs.

Now, how signal readout is actually performed is explained, starting with the full-pixel individual readout mode.

As a result of an action of the electronic shutter, unneeded signal charges are abandoned from the photodiodes 15 to the substrate section of the CCD, and all the photodiodes 15 simultaneously begin to accumulate signal charges in response to exposure through the optical system. When the exposure is completed with the elapse of a given time period, signal charges on all the photodiodes 15 are read out to the vertical transfer paths 16.

Next, how charge readout and vertical transfer are performed is explained hereunder, referring to FIG. 30. FIG. 30 shows the manner of charge readout and vertical transfer on the column at the left end as viewed in FIG. 29. In the explanation hereunder, however, it should be understood that the same operation is also performed on all the other columns, including the one adjacent to said left-end column. In other words, charge readout and vertical transfer are performed by horizontal lines. In FIG. 30, the waveforms identified with labels V1A-V3 represent voltages waveforms of vertical transfer path gate signals, and the waveforms that extend perpendicular to the waveforms V1A-V3 and are identified with labels A-I represent potentials of the vertical transfer paths. In the drawings, numerals 51$a$, 51$b$, 51$c$, and 51$d$ denote a charge readout pulse, and numeral 52 represents a signal charge that has been read out In the initial stage, the gate signals and the potentials of the vertical transfer path are in the state represented by 'A' in FIG. 30. When charge readout pulses 51$a$,51$b$,51$c$,51$d$ are applied to V2A,V2B,V2C,V2D as shown by 'B' in FIG. 30, all the signal charges 52 are read out to the vertical transfer path as shown in FIG. 30C. Thereafter, as shown in FIGS. 30D-I, a given voltage is applied to V1A-V4 to perform 1-stage vertical transfer of the signal charges 52 that have been read out so that the signal charge 52 on the bottommost line is transferred to the horizontal transfer path (not shown in the drawing). All the signal charges thus transferred to the horizontal transfer path are read by horizontal transfer. Then, by repeating this set of a 1-stage vertical transfer and a horizontal transfer, all the signal charges are individually read sequentially, line by line from the first line in the forward direction and then output from the CCD 2. Thus, readout operation in the full-pixel individual readout mode is completed. In short, the full-pixel individual readout mode calls for individually reading all the pixels in each frame in a sequence, pixel by pixel from the first pixel in the forward direction. As the frame rate is very slow due to a tremendous number of pixels to be handled in each frame, this mode is not suitable for shooting moving images. However, as it calls for individually reading all the pixels on a multi-pixel CCD, this mode is ideal for capturing still images with extremely high resolution.

Figure 32:
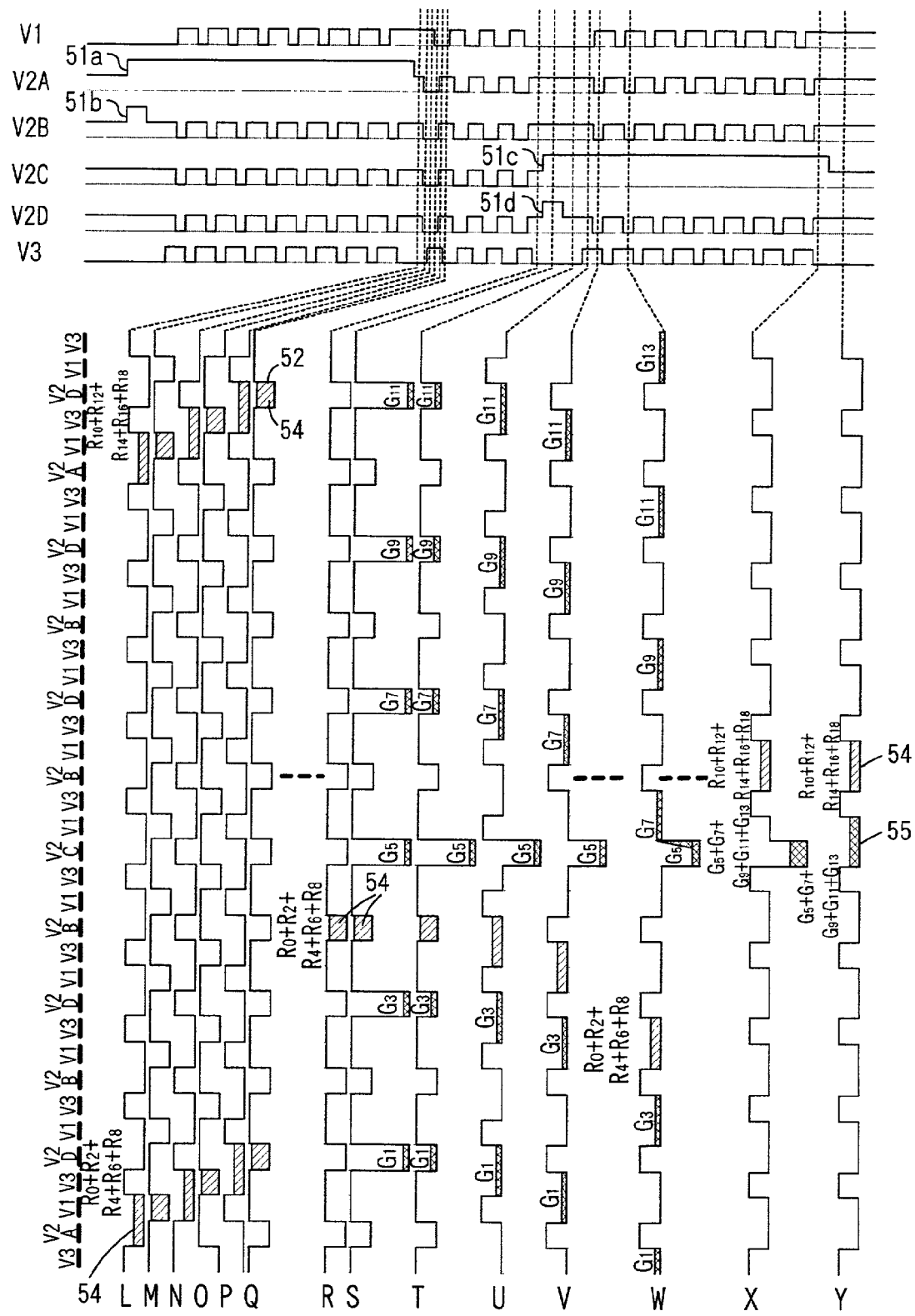
FIG. 32 is a schematic illustration to follow said FIG. 31.
Figure 33:
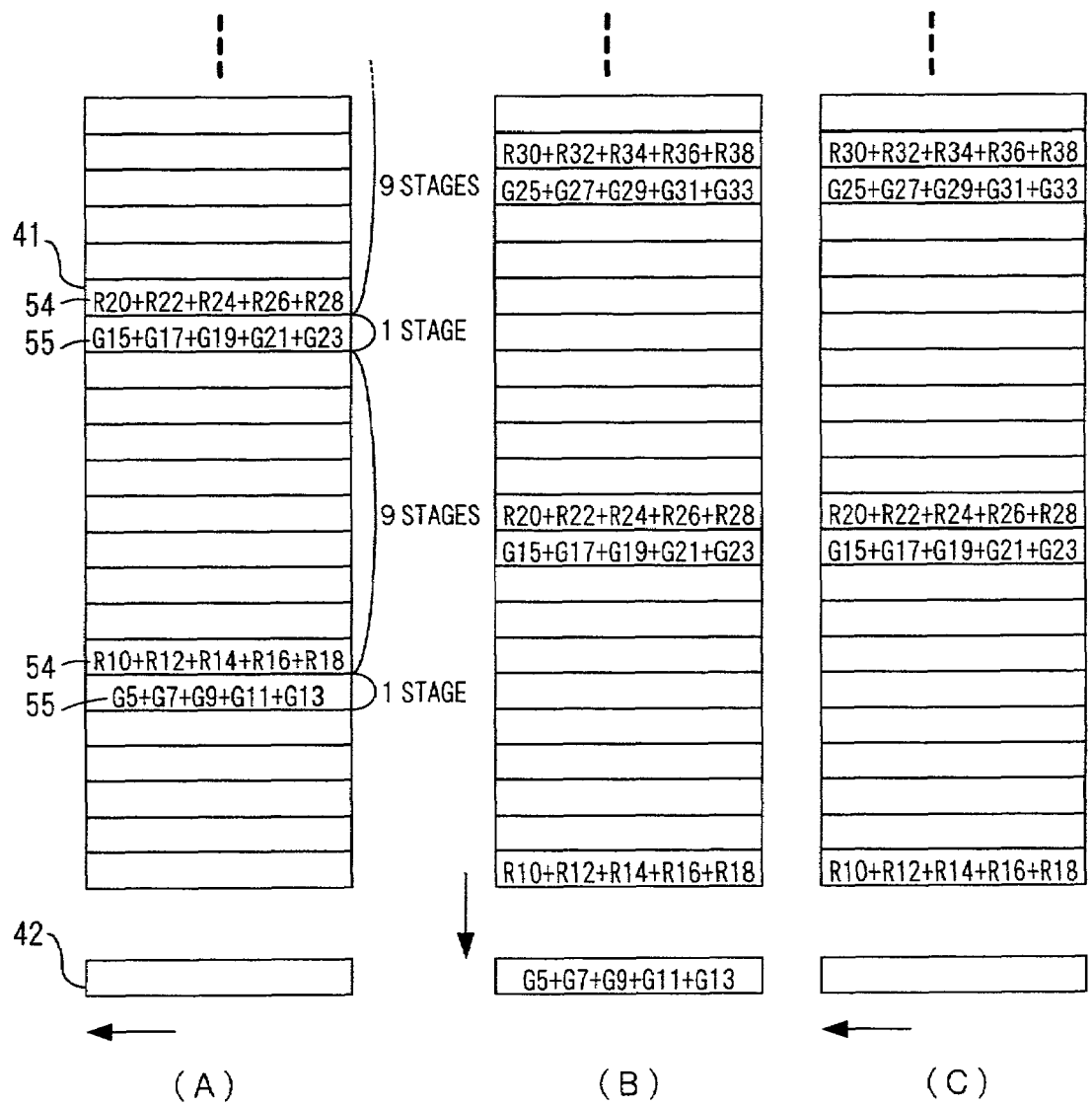
FIG. 33 is a schematic illustration to explain the summation readout mode of said CCD of the image capturing apparatus.
Figure 34:
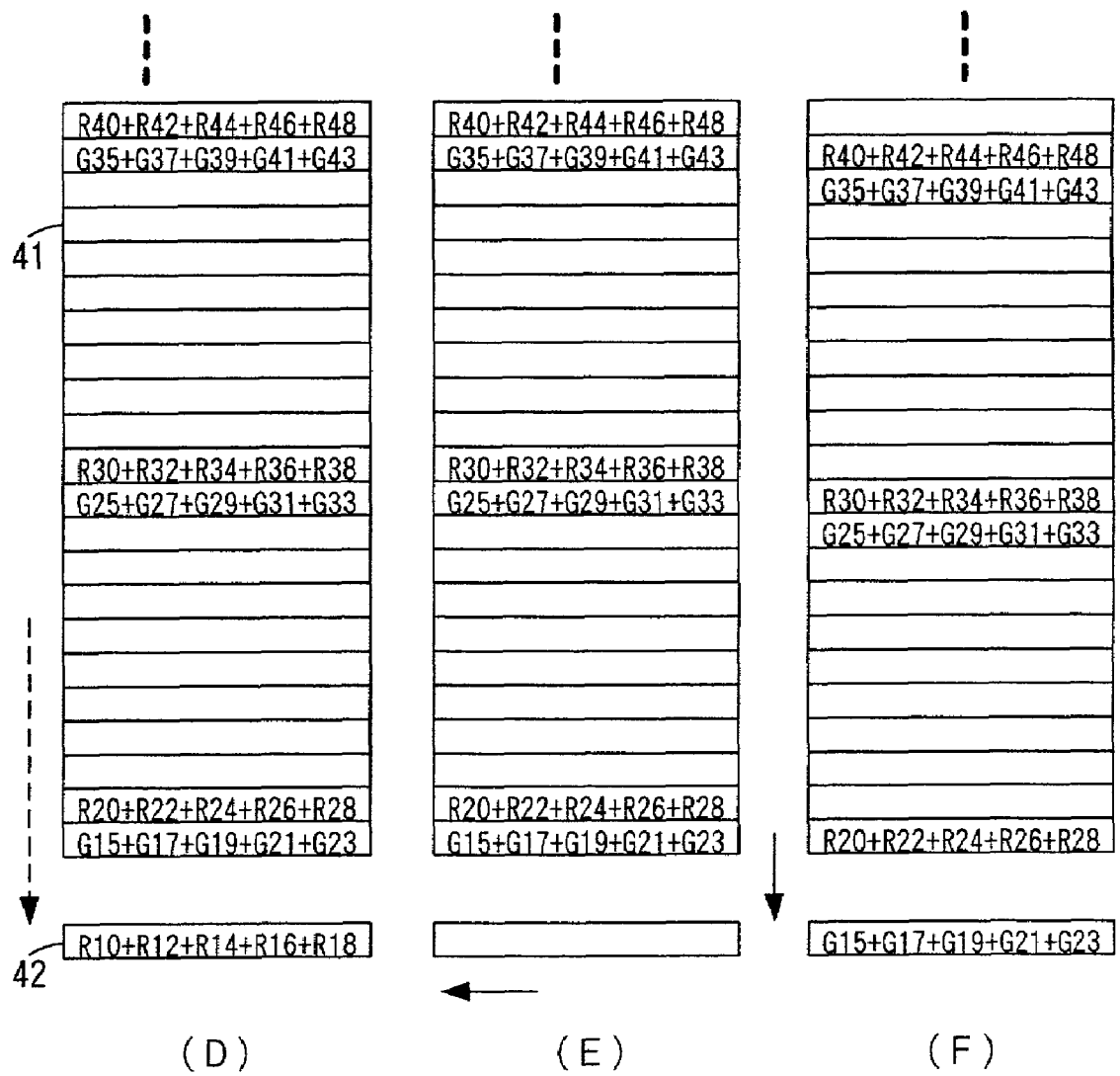
FIG. 34 is a schematic illustration to follow said FIG. 33.
Figure 35:
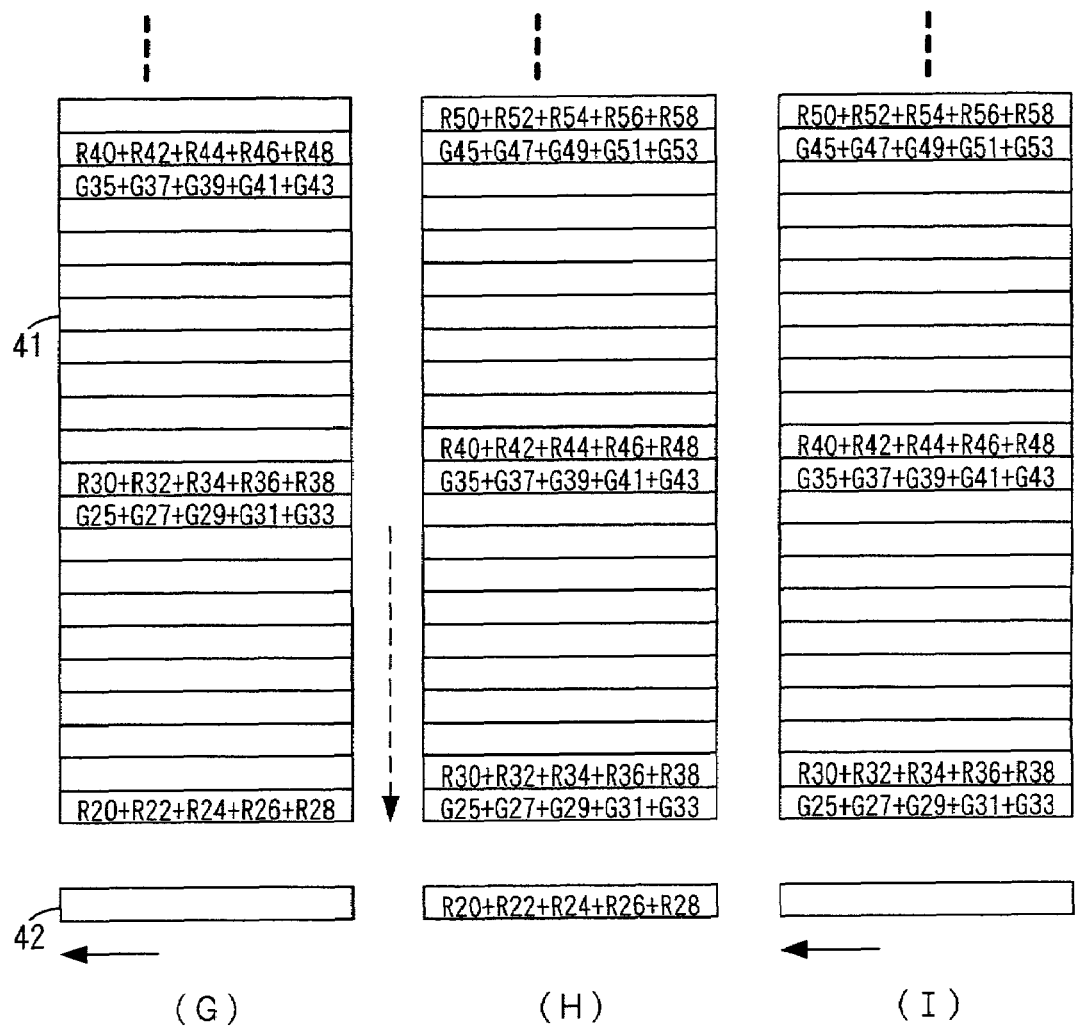
FIG. 35 is a schematic illustration to follow said FIG. 34.

Next, the summation readout mode according to the present example is explained hereunder, referring to FIGS. 31 and 32. FIGS. 31 and 32 show the manner of charge readout and vertical transfer, i.e. vertical transfer waveforms and potentials, on the column at the left end as viewed in FIG. 29. In the explanation hereunder, however, it should be understood that the same operation is also performed on all the other columns, including the one adjacent to said left-end column. In other words, summation, charge readout, and vertical transfer are performed by horizontal lines. The voltages waveforms of vertical transfer path gate signals identified with labels V1A-V3 in FIG. 31 are the same as the voltages waveforms of vertical transfer path gate signals identified with labels V1A V3 in FIG. 32. Regarding the waveforms that extend perpendicular to the waveforms V1A-V3 and are identified with labels A-Y, those shown in FIG. 31 represent potentials of the vertical transfer paths in the first half of the process, and those shown in FIG. 32 represent potentials of the vertical transfer paths in the second half of the process.

In the initial stage, the gate signals and the potentials of the vertical transfer path are in the state represented by 'A' in FIG. 31. When the electrodes V2A,V2B receive charge readout pulses 51a,51b, as shown by 'B' in FIG. 31, only the signal charges on all the even-numbered lines are read out to the vertical transfer path. Thereafter, as shown in FIG. 31C-K, while the charge readout pulse 51a applied to V2A is maintained, application of the charge readout pulse 51b to V2B is stopped. In this state, vertical transfer is performed in the forward direction by the amount of 8 stages. Even after the vertical transfer, the potential well remains deep at each electrode V2A, which is located at every 10th stage. Therefore, in the charge retaining section under each V2A, summation of signal charges (pixel charges) read out from the even-numbered lines is performed so that every five pixels of the same color, i.e. R, are mixed together, in other words summed up. With application of the charge readout pulse 51a to V2A stopped, the 5-pixel-summed charges 54, each of which results from summation of signal charges of five pixels, are retained as shown in FIG. 31L and FIG. 32L, with one stage containing one 5-pixel-summed charge 54.

By applying a given voltage to the electrodes V1A-V3 in the state shown in FIG. 31L and FIG. 32L, the 5-pixel-summed charges are vertically transferred away from the horizontal transfer path (in other words reverse transfer is performed) by the amount of 4 stages as shown in FIG. 32M-R so that the 5-pixel-summed charges 54 are temporarily sheltered under the respective electrodes V2B. In this state, charge readout pulses 51c,51d are applied to V2C, V2D as shown in FIG. 32S to read out the signal charges on the odd-numbered lines to the vertical transfer path. Thereafter, as shown in FIG. 32T-X, while the charge readout pulse 51c applied to V2C is maintained, application of the charge readout pulse 51d to V2D is stopped. In this state, a given voltage is applied to V1-V3 to transfer the charge signals 52 to the vertical transfer path in the forward direction by the amount of 8 stages towards the horizontal transfer path. Even after the vertical transfer, the potential well remains deep at each electrode V2C, which is located at every 10th stage. Therefore, in the charge retaining section under each V2C, summation of signal charges read out from the odd-numbered lines is performed so that every five pixels of the same color, i.e. G, are mixed together, in other words summed up. With application of the charge readout pulse 51c to V2C stopped, the 5-pixel-summed charges 55, each of which results from summation of signal charges of five pixels, are retained as shown in FIG. 32Y, with one stage containing one 5-pixel-summed charge 55. In the above state shown in FIG. 32Y, a 5-pixel-summed charge 54 consisting of five pixels that had previously been read out from even-numbered lines and summed up is present immediately above each 5-pixel-summed charges 55 from odd-numbered lines. This situation is also shown in FIG. 33(A). Therefore, after the 5-pixel-summed charge 55 at the leading end is read out to the horizontal transfer path and output therefrom as shown in FIG. 33(B) and (C), the 5-pixel-summed charges 54 and the 5-pixel-summed charges 55 of the respective same colors can be read out by repeating a transfer set consisting of a 1-stage vertical transfer, a horizontal transfer, a 9-stage vertical transfer, and a horizontal transfer as shown in FIG. 34(D) through FIG. 35(I).

Although the present example of the CCD 2 explained as above is of a primary color Bayer arrangement, the method described in the example is not limited to such an arrangement and applicable to any filter arrangement, provided that the number of colors of the color filters allocated for each column does not exceed two. In other words, the principles of the present example are applicable to almost any one of the filter arrangements available at present, including that used in the fourth example explained later.

As described above, by using a total of four readout electrode systems, the present example offers virtually the same effect as described above with a progressive CCD of any color filter arrangement. Furthermore, the example requires two more vertical transfer electrode systems than a normal, conventional configuration. However, even if the number of lines to be summed up is increased in response to advances made in the number of pixels in a CCD, the present example permits the number of vertical transfer electrode systems to remain unchanged, thereby holding down costs.

According to the present example, the order of the even-numbered lines and the odd-numbered lines which is reversed is rectified inside the CCD 2 by the same procedure as that of the second example, in other words by performing reverse transfer on the vertical transfer path after generating a 5-pixel-summed charge of even-numbered lines on the vertical transfer path. However, as is true in the fourth example explained later, the procedure of the first example is also applicable to this case; summation of pixels may be executed solely by forward vertical transfer so that the order of the lines may be rectified by an external component which is provided externally of the CCD 2 to perform image processing or other similar functions. According to the present example, too, summation of the pixels on the odd-numbered lines may be performed on the horizontal transfer path in the same manner as the second example.

Next, the fourth example of an CCD 2 is explained hereunder, referring to FIGS. 36 to 40. As the internal structure and the basic functions including the mechanism of driving the CCD 2 of the fourth example are exactly the same as those of the third example shown in FIG. 29, explanation of the full-pixel individual readout mode is omitted. According to the present example, it is sufficient to transfer signal charges in the forward direction, i.e. towards the horizontal transfer path. As there is no need of reverse transfer, the example is applicable to a CCD with a very low reverse transfer capability and thus has a wide range of use. Another benefit of this example lies in inclusion of summation on the horizontal transfer path, thereby realizing some reduction in the time required for readout of signals compared with the third example.

Figure 36:
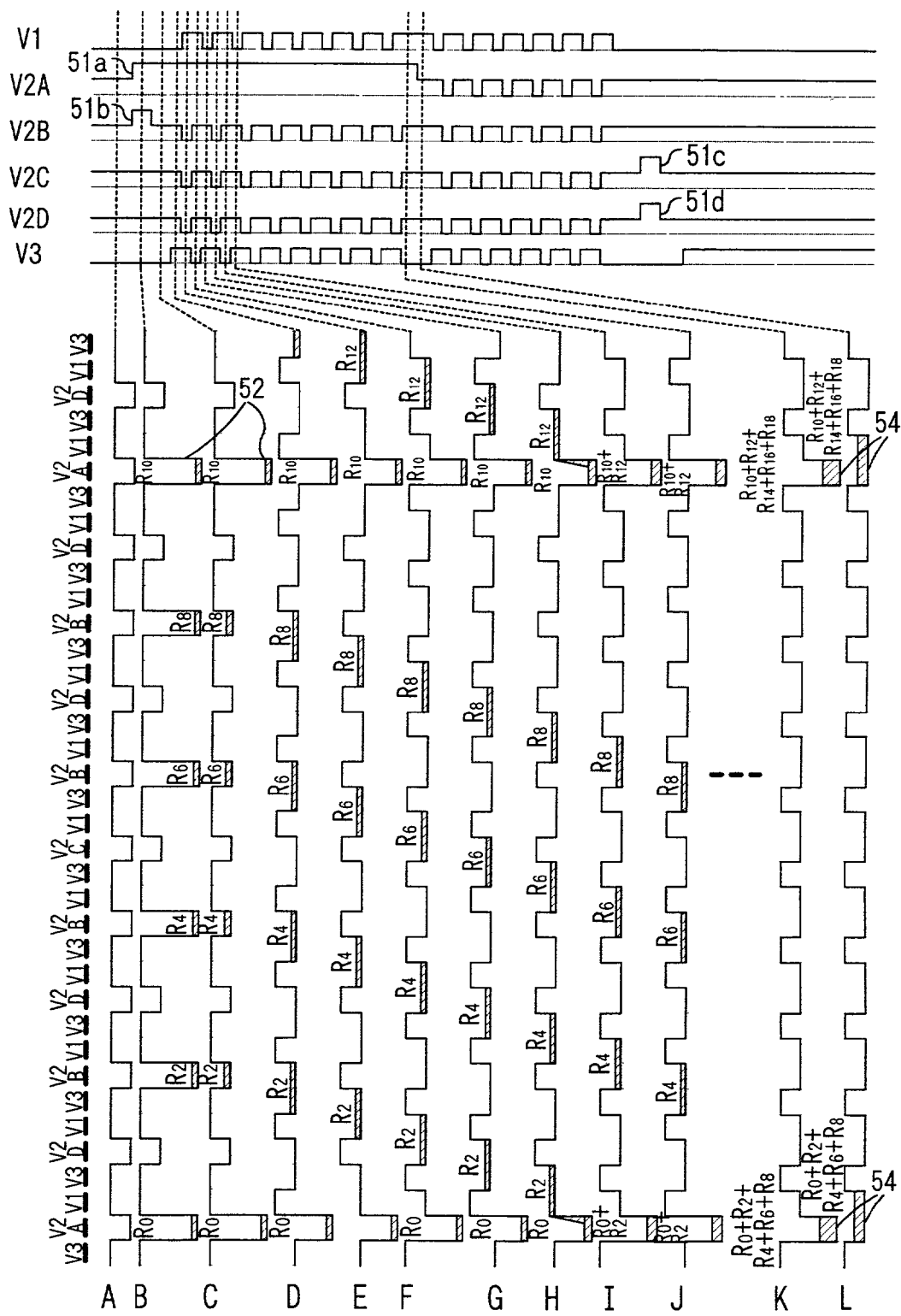
FIG. 36 is a schematic illustration to explain the summation readout mode of a fourth example of a CCD of an image capturing apparatus according to the present invention.
Figure 37:
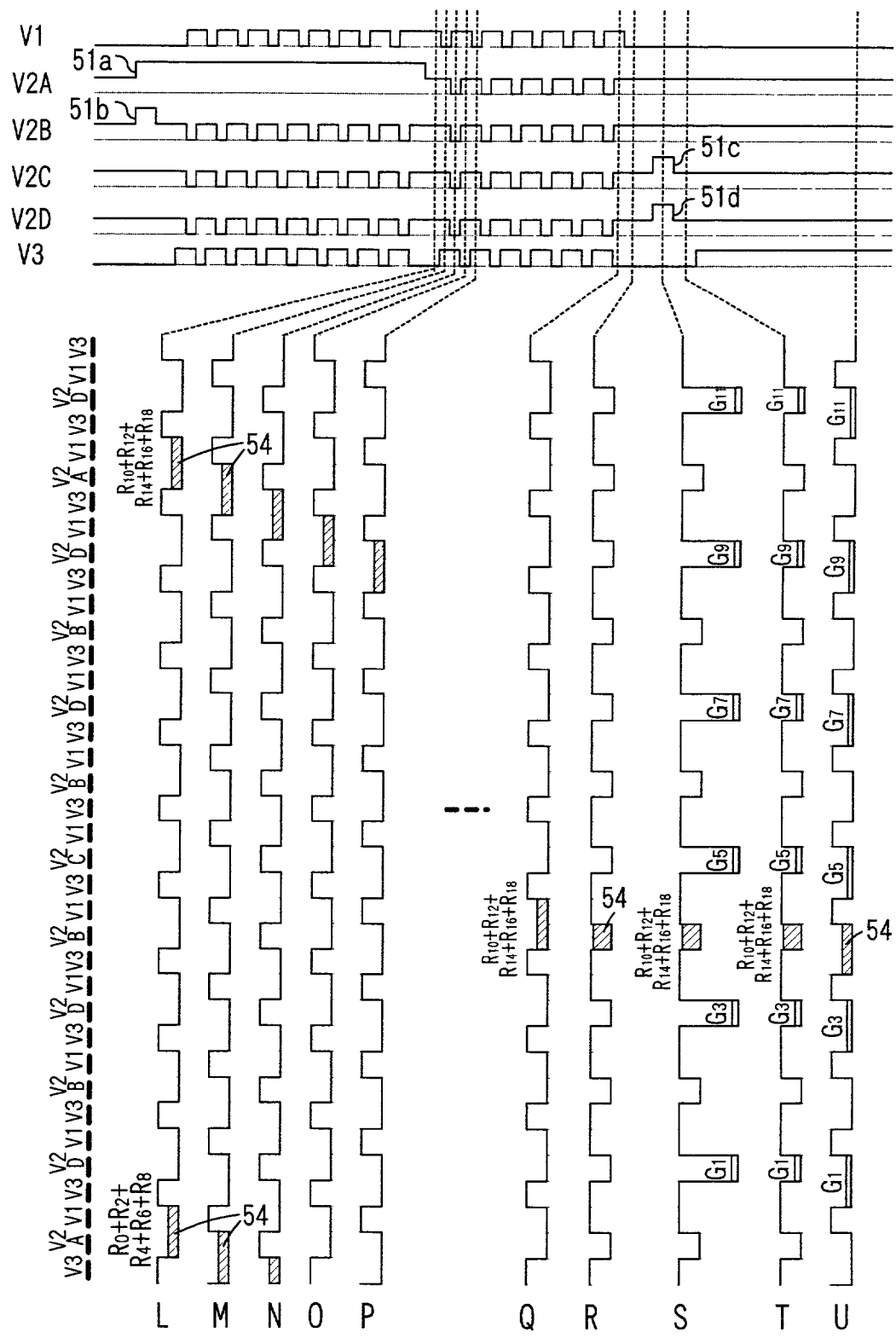
FIG. 37 is a schematic illustration to follow said FIG. 36.

Next, the moving image mode, i.e. the summation readout mode, according to the present example is explained hereunder, referring to FIGS. 36 and 37.

FIGS. 36 and 37 show the manner of charge readout and vertical transfer, i.e. vertical transfer waveforms and potentials, on the column at the left end as viewed in FIG. 29. In the explanation hereunder, however, it should be understood that the same operation is also performed on all the other columns, including the one adjacent to said left-end column. In other words, summation, charge readout, and vertical transfer are performed by horizontal lines. The voltages waveforms of vertical transfer path gate signals identified with labels V1A-V3 in FIG. 36 are the same as the voltages waveforms of vertical transfer path gate signals identified with labels V1A-V3 in FIG. 37. Regarding the waveforms that extend perpendicular to the waveforms V1A-V3 and are identified with labels A-Y, those shown in FIG. 36 represent potentials of the vertical transfer paths in the first half of the process, and those shown in FIG. 37 represent potentials of the vertical transfer paths in the second half of the process.

In the initial stage, the gate signals and the potentials of the vertical transfer path are in the state represented by 'A' in FIG. 36. When the electrodes V2A,V2B receive charge readout pulses 51a,51b, as shown by 'B' in FIG. 36, only the signal charges on all the even-numbered lines are read out to the vertical transfer path. Thereafter, as shown in FIG. 36C-K, while the charge readout pulse 51a applied to V2A is maintained, application of the charge readout pulse 51b to V2B is stopped. In this state, vertical transfer is performed in the forward direction by the amount of 8 stages. Even after the vertical transfer, the potential well remains deep at each electrode V2A, which is located at every 10th stage. Therefore, in the charge retaining section under each V2A, summation of signal charges (pixel charges) read out from the even-numbered lines is performed so that every five pixels of the same color, i.e. R, are mixed together, in other words summed up. With application of the charge readout pulse 51a to V2A stopped, the 5-pixel-summed charges 54, each of which results from summation of signal charges of five pixels, are retained as shown in FIG. 36L and FIG. 37L, with one stage containing one 5-pixel-summed charge 54.

By applying a given voltage to the electrodes V1A-V3 in the state shown in FIG. 37L, the 5-pixel-summed charges are vertically transferred towards the horizontal transfer path, in other words in the forward direction, by the amount of 6 stages as shown in FIG. 37M-R so that the 5-pixel-summed charges 54 are temporarily sheltered under the respective electrodes V2B. In this state, charge readout pulses 51c,51d are applied to V2C,V2D as shown in FIG. 37S to read out the signal charges on the odd-numbered lines to the vertical transfer path. Then, as shown in FIG. 37T, application of the charge readout pulses 51c,51d to V2C,V2D is stopped. In this state, the signal charges of all the pixels are read out on the vertical transfer path in a repeated pattern of 5R,G,G, G,G,G,5R,G,G,G,G,G, . . . , except for a part of the pixels located at the bottom.

Figure 38:
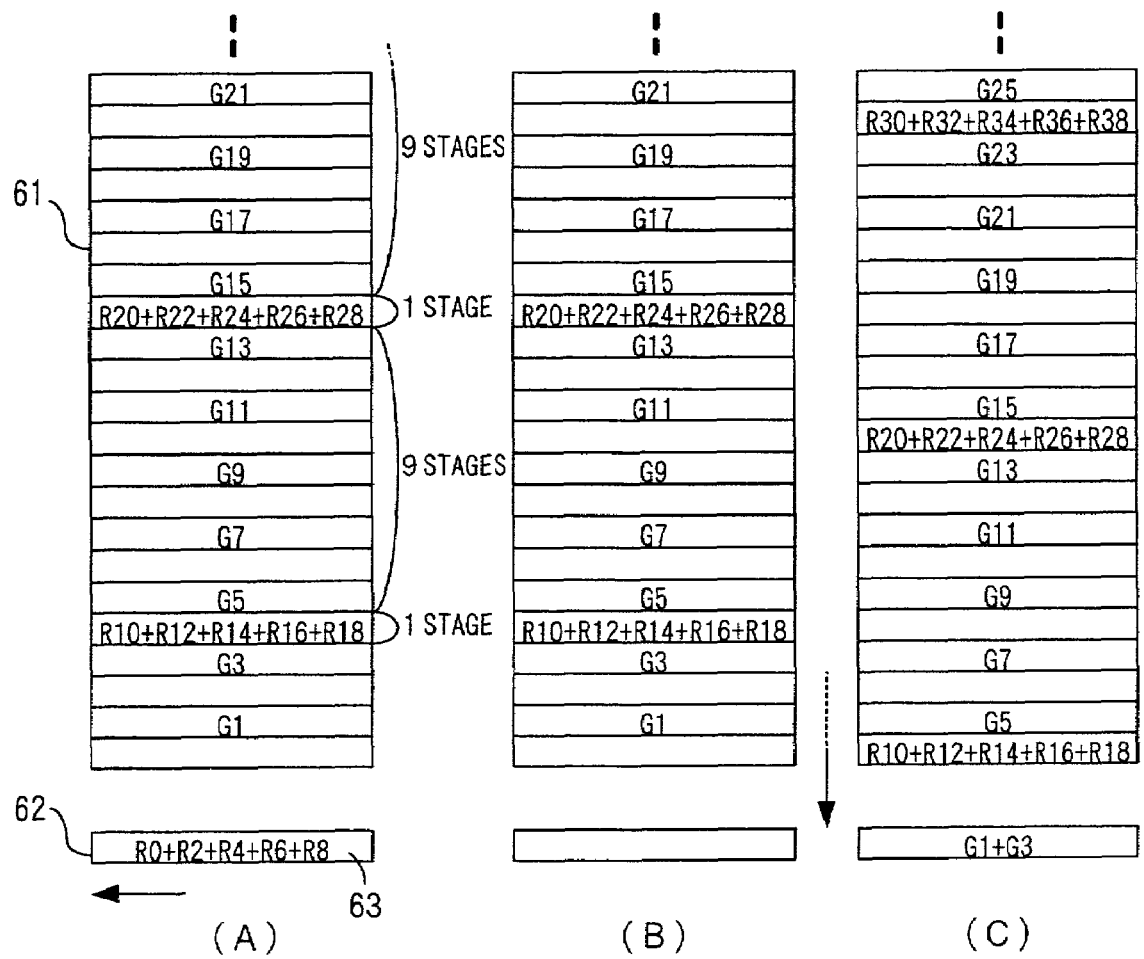
FIG. 38 is a schematic illustration to explain the summation readout mode of said CCD of the image capturing apparatus.
Figure 39:
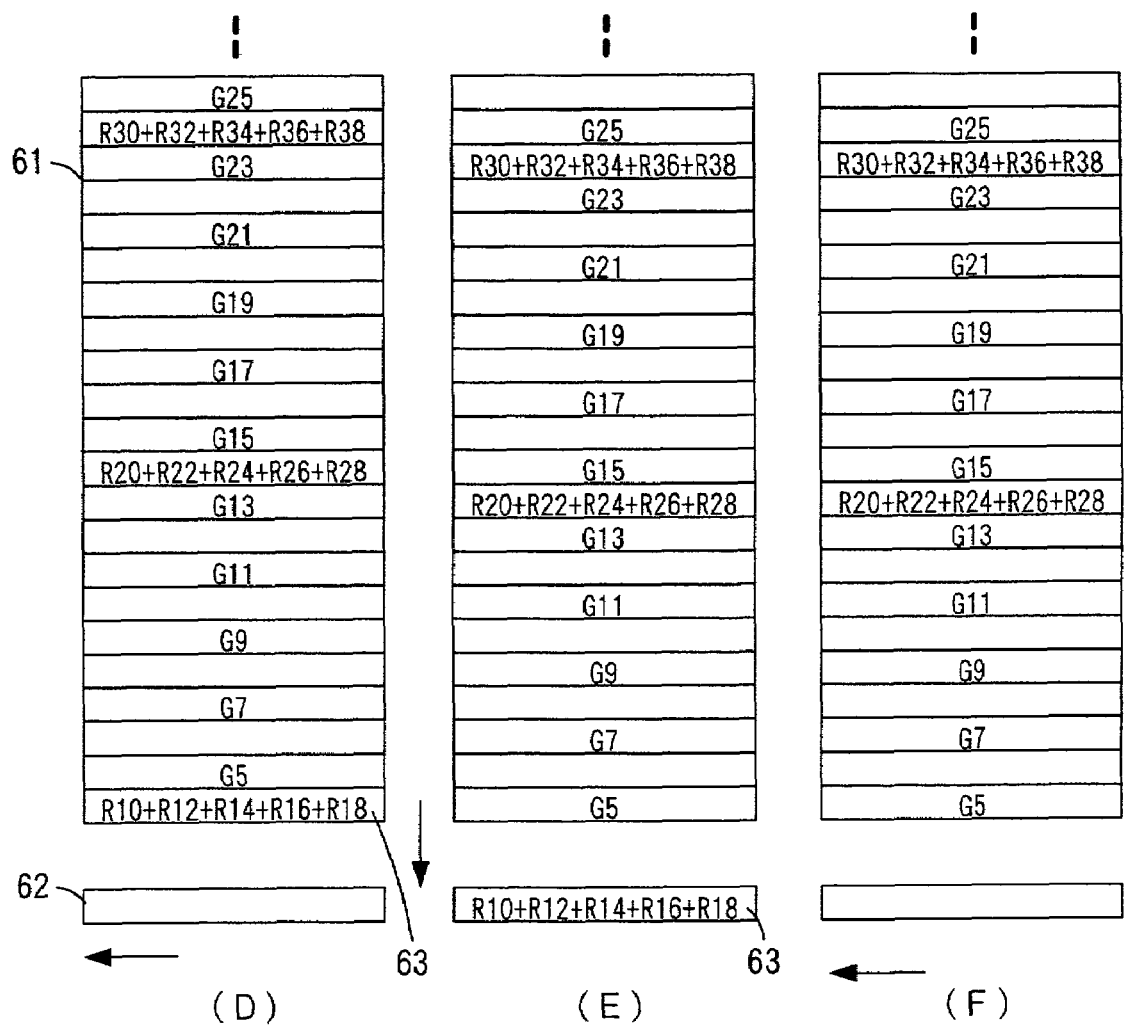
FIG. 39 is a schematic illustration to follow said FIG. 39.
Figure 40:
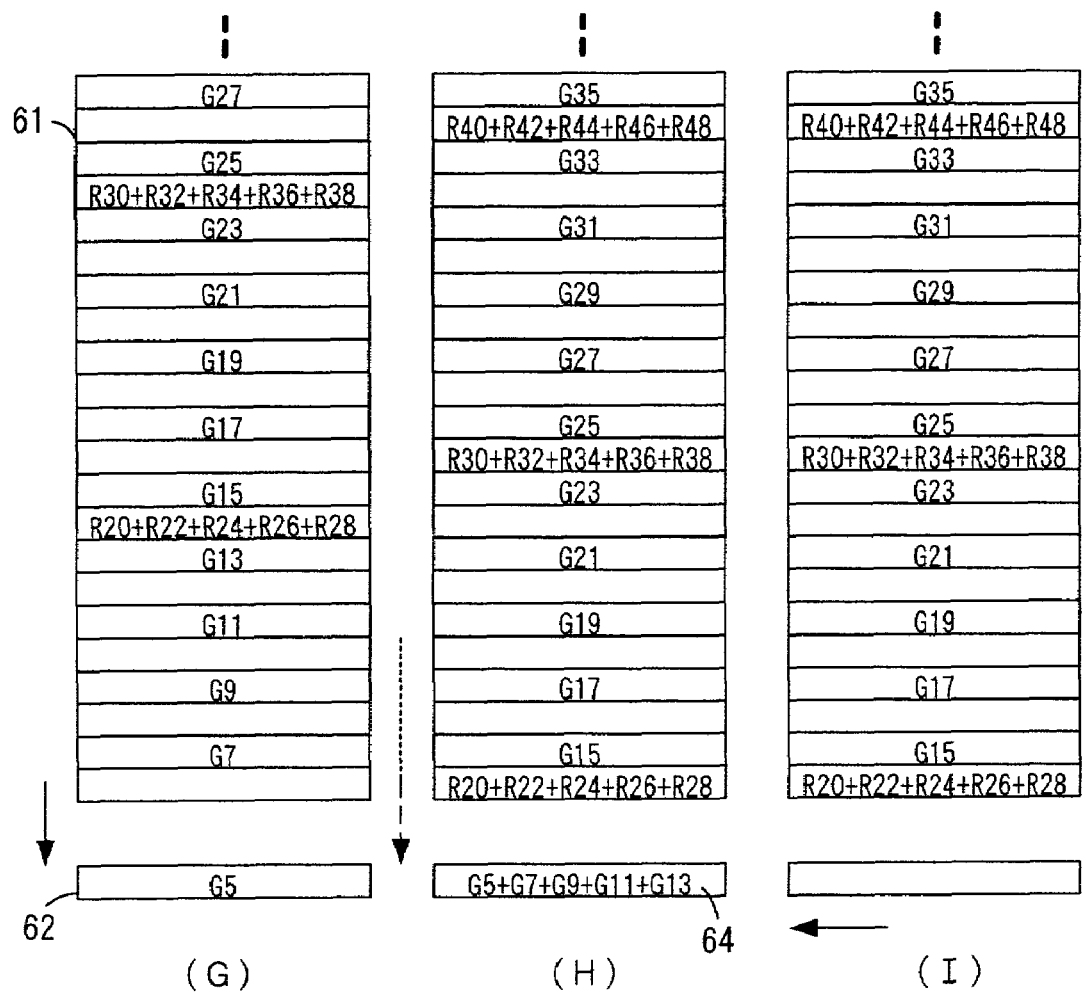
FIG. 40 is a schematic illustration to follow said FIG. 39.

Vertical transfer and horizontal transfer to follow the above are performed as shown in FIGS. 38 through 40. FIG. 38(A) shows the state of the vertical transfer path shown in FIG. 16T. Numerals 61 and 62 in FIGS. 38 through 40 respectively denote a vertical transfer path and a horizontal transfer path. In the step shown in FIG. 38(A), the aforementioned 5-pixel-summed charge (R0+R2+R4+R6+R8) 63 from even-numbered line is already in the horizontal transfer path 62. Therefore, after the 5-pixel-summed charge (R0+R2+R4+R6+R8) 63 is read out by horizontal transfer as shown in FIG. 38(B), vertical transfer is performed while the horizontal transfer is at a standstill as shown in FIG. 38(c) to perform odd-numbered-line summation, i.e. mixing of pixels from odd-numbered lines, in the horizontal transfer path. In the state shown in FIG. 38(c), however, summation of pixels is insufficient, because there are only signal charges (G1+G3) on the horizontal transfer path. This is because G1 and G2 represent pixels located at an edge of a frame. Therefore, after the signal charges (G1+G3) are output by horizontal transfer as shown in FIG. 39(D), another 5-pixel-summed charge (R10+R12+R14+R16+R39) 63 resulting from summation of five pixels on even-numbered lines is transferred to the horizontal transfer path by 1-stage vertical transfer as shown in FIG. 39(D).

Thereafter, as shown in FIG. 39(D), the 5-pixel-summed charge (R10+R12+R14+R16+R39) 63 is output by horizontal transfer. Then, as shown in FIG. 40(G), a signal charge (G5) is transferred to the horizontal transfer path by 1-stage vertical transfer. Before another horizontal transfer is performed, 8-stage vertical transfer is performed so that signal charges from odd-numbered lines are summed up in the horizontal transfer path as shown in FIG. 40(H) to generate another 5-pixel-summed charge (G5+G7+G9+G11+G13) 64, which results from summation of signal charges of five pixels and serves as a second summed-charge.

After this signal charge is output by horizontal transfer as shown in FIG. 40(I), a transfer set consisting of a 1-stage vertical transfer, a horizontal transfer, a 9-stage vertical transfer, and a horizontal transfer is repeated in the same manner as above to read out the remaining signals to the outside of the CCD. By thus reading out all the pixels to the vertical transfer paths 61 with signal charges added to a part of the pixels and, thereafter, transferring them along the vertical transfer paths 61 by repeating a transfer set consisting of a 1-stage transfer and a 9-stage transfer, the signals of all the pixels can be read out at a frame rate five times faster than that in the still image mode.

As is true in the first example, in this fourth example, too, the positional relationship between the even-numbered lines and the odd-numbered lines is reversed. Such a reversal can be cancelled out by using an external component which is provided externally of the CCD 2, i.e. downstream from the CCD 2 of the present example, for image processing or other similar functions. For example, a line buffer having the functions of a processing unit which is capable of recording image data of one line may be included in the image capturing apparatus and function in such a manner as to temporarily retain line signals output earlier and permit the subsequent line signals to pass first before the former or first mentioned line signals, thereby rearranging the order of the even-numbered line signals and odd-numbered line signals.

Next, the fifth and sixth examples of a CCD according to the invention, which are shown in FIGS. 41 through 47, are explained in outline. Each of the two examples uses an interlace CCD in a complementary-color line-sequential arrangement.

To be more specific, the fifth and the sixth example of the invention shown in FIGS. 41 through 47 are applicable to a multi-pixel interline CCD of a color single-plate CCD type, which is for both capturing moving images and capturing still images, permits omission readout, and has a color filter arrangement designed for specific intentional color mixing (paired-filter method) such as a chrominance line-sequential method (a complementary-color method) using yellow (Ye), magenta (Mg), cyan (Cy) and green (G) filters. With a multi-pixel interline CCD according to either example, the full-pixel readout is performed by following a procedure comprising steps of forming a group of paired-filters on a vertical transfer path, subsequently performing vertical transfer while applying a charge readout voltage to specific charge readout electrodes so as to sum up a plurality of paired-filters of the same color-combination by line summation, forming another group of paired-filters by reading out the pixels on the remaining lines to the vertical transfer path while preventing unintentional mixing of colors with the first mentioned paired-filters, which have been formed previously, and performing vertical transfer again while applying a charge readout voltage to specific charge readout electrodes so as to sum up a plurality of paired-filters of another like color combination by line summation. As a result of this procedure, all the pixels are read out with the signal charges of paired-filters of respective same color-combinations being summed up by line summation. With a feature as described above, this example is effective in increasing the frame rate and substantially increasing the image quality, such as an improved vertical spatial frequency reproducibility and an improved pixel sensitivity, without impairing image processing that is anticipated at a later juncture.

In other words, the application range of the above procedure includes an interlace scanning CCD of a color single-plate, multi-pixel interline type that permits omission readout, can be used for both capturing still images and capturing moving images, and has a color filter arrangement with which luminance signals or chrominance signals can be easily generated by line summation; summation of a plurality of paired-filters of respective same color-combinations according to the above procedure enables the full-pixel readout without exerting an influence on subsequent image processing.

Next, the fifth example of a CCD 2 according to the invention is explained hereunder, referring to FIGS. 41 through 44. The fifth example of the CCD 2 has a structure similar to that of the first example, with its block diagram being the same as FIG. 1. As is evident from its internal structure shown in FIG. 41, the fifth example is applied to an interlace scanning CCD of an interline type that permits so-called chrominance line-sequential omission readout (omission readout in complementary-color arrangement). This CCD is referred to as the CCD 2 in the explanation hereunder.

According to the fifth example, the CCD 2 is an interlace scanning CCD of a color interline type and capable of both capturing still images and capturing moving images. To capture still images, the CCD 2 reads all the pixels individually by functioning in affiliation with the mechanical shutter. As it is designed to handle a far greater number of pixels than a CCD dedicated to moving image pickup does, it is capable of reading all the pixels at a frame rate four times faster than that in the still image mode by summation of pixels. A CCD 2 of this type permits intentional mixing of pixels of different colors in the moving image mode to facilitate the subsequent image processing. To be more specific, with this CCD 2, it is possible to sum up vertically adjacent pixels and thus obtain four combinations of paired-filer signals, i.e., Ye+Mg, Ye+G, Cy+G, and Cy+Mg. Thereafter, a signal approximate to the intended luminance signal or chrominance signal can easily be generated by summation or subtraction of paired-filter signals as shown below:

$(Ye+Mg)+(Cy+G)=2R+3G+2B\approx$luminance signal $Y1$ $(Ye+G)+(Cy+Mg)=2R+3G+2B\approx$luminance signal $Y2$ $(Cy+G)-(Ye+Mg)=G-2R\approx$chrominance signal $Cr$ $(Ye+G)-(Cy+Mg)=G-2B\approx$chrominance signal $Cb$ Therefore, this color filter arrangement is widely used for movie cameras.

Figure 41:
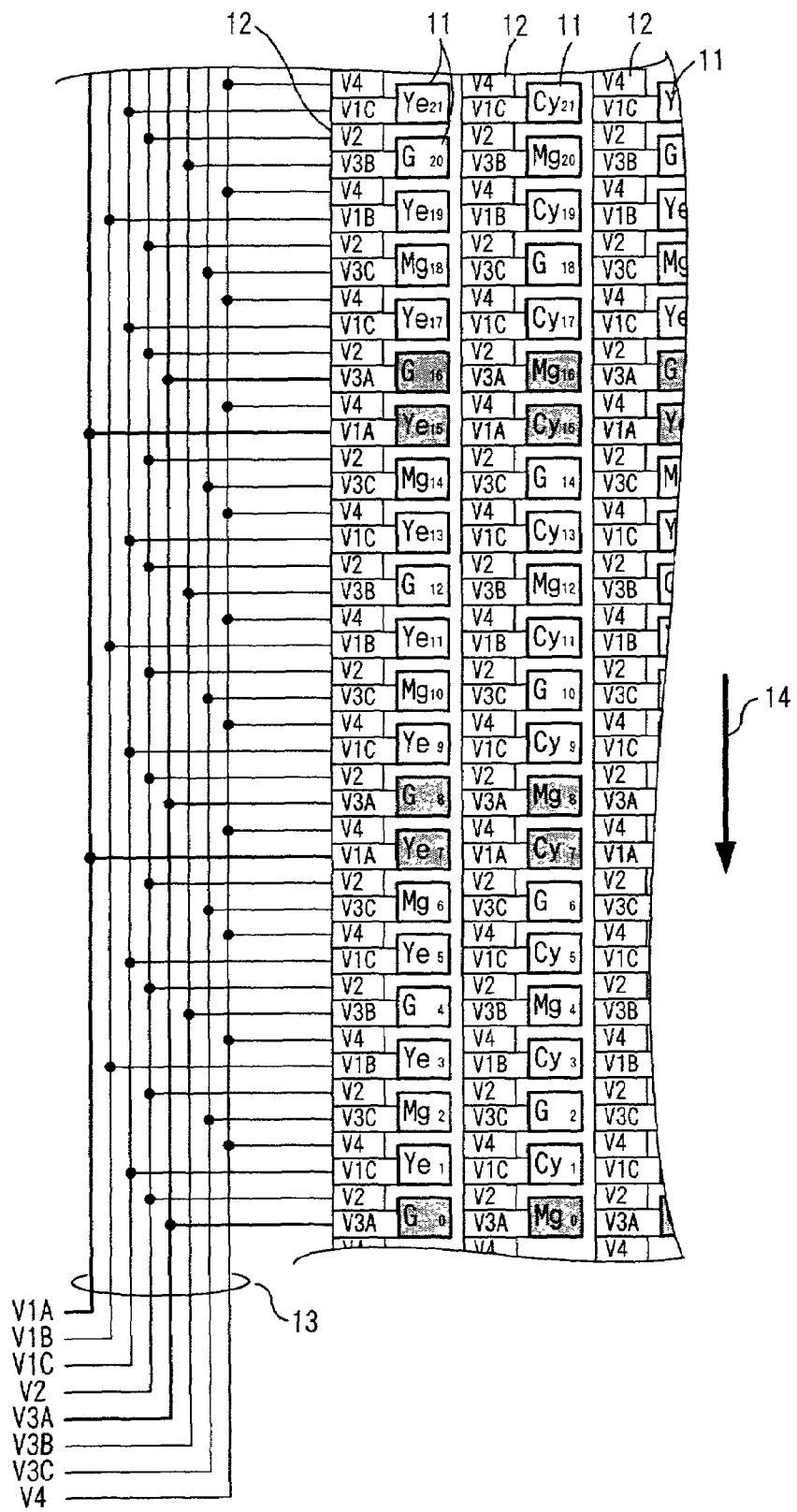
FIG. 41 is a schematic illustration showing a part of the internal structure of a fifth example of a CCD of an image capturing apparatus according to the present invention.

As can be seen in the internal structure shown in FIG. 41, the CCD 2 includes photodiodes 15 serving as the photoelectric converting means, vertical transfer paths 16 which are connected to said photodiodes 15 and collectively serve as the first CCD, and vertical transfer path gate signal wirings 18 respectively connected to the vertical transfer paths 16. In FIG. 41, an arrow 14 represents the forward direction, i.e. the direction of vertical transfer towards the horizontal transfer path, which serves as a second CCD and is not shown in the drawing.

Each photodiode 15 corresponds to a pixel. The photodiodes 15 are two-dimensionally arranged in a given pattern. According to the present example, the color filters are arranged in a chrominance line-sequential arrangement (a complementary-color arrangement as described above so that a given vertical column has a color filter arrangement of Ye,Mg,Ye,G . . . , with each even-numbered horizontal line allocated for either Mg or G, and a column adjacent to this column has a color filter arrangement of Cy,Mg,Cy,G . . . , with each even-numbered horizontal line allocated for either Mg or G.

Signal charge accumulated on each photodiode 15 is read out to the adjacent vertical transfer path 16 as a result of application of a charge readout pulse, which is a charge readout voltage with a plus potential, to the corresponding gate electrode of the vertical transfer path 16. As shown in FIG. 41, the combination of the vertical transfer path gate electrodes that are installed in the CCD 2 to perform charge readout described above consists of six electrode systems, i.e. V1A,V1B,V1C,V3A,V3B,V3C. With vertical transfer-dedicated gate electrodes V2,V4 added to these six signal charge readout electrode systems, there are a total of eight vertical transfer path gate electrode systems, all of which are respectively connected to the vertical transfer path gate signal wirings 18.

The present example of the CCD 2 presents a mode of 4-line summation (summation of paired-filters of respective same color-combinations) merely as an example; in an actual application there may be various CCDs adapted to permit summation readout with any number of lines, depending on at what intervals electrodes corresponding to V1A/V3A are arranged, and taking color filters into consideration. Regardless of an increase in the number of lines to be handled for each summation, the present example does not necessitate increase of the number of vertical transfer path gate electrode systems.

In the same manner as the first example, to shoot a still image according to the present example, in other words when the CCD 2 operates in the full-pixel individual readout mode, all the pixels are read out with the frame divided into two fields. To shoot a moving image, in other words when the CCD 2 operates in the moving image mode, high-speed full-pixel readout is performed at a frame rate that is four times faster.

As the operation in the still image mode calls for reading all the pixels individually in the same manner as any one of the examples described above, the explanation thereof is omitted.

Figure 42:
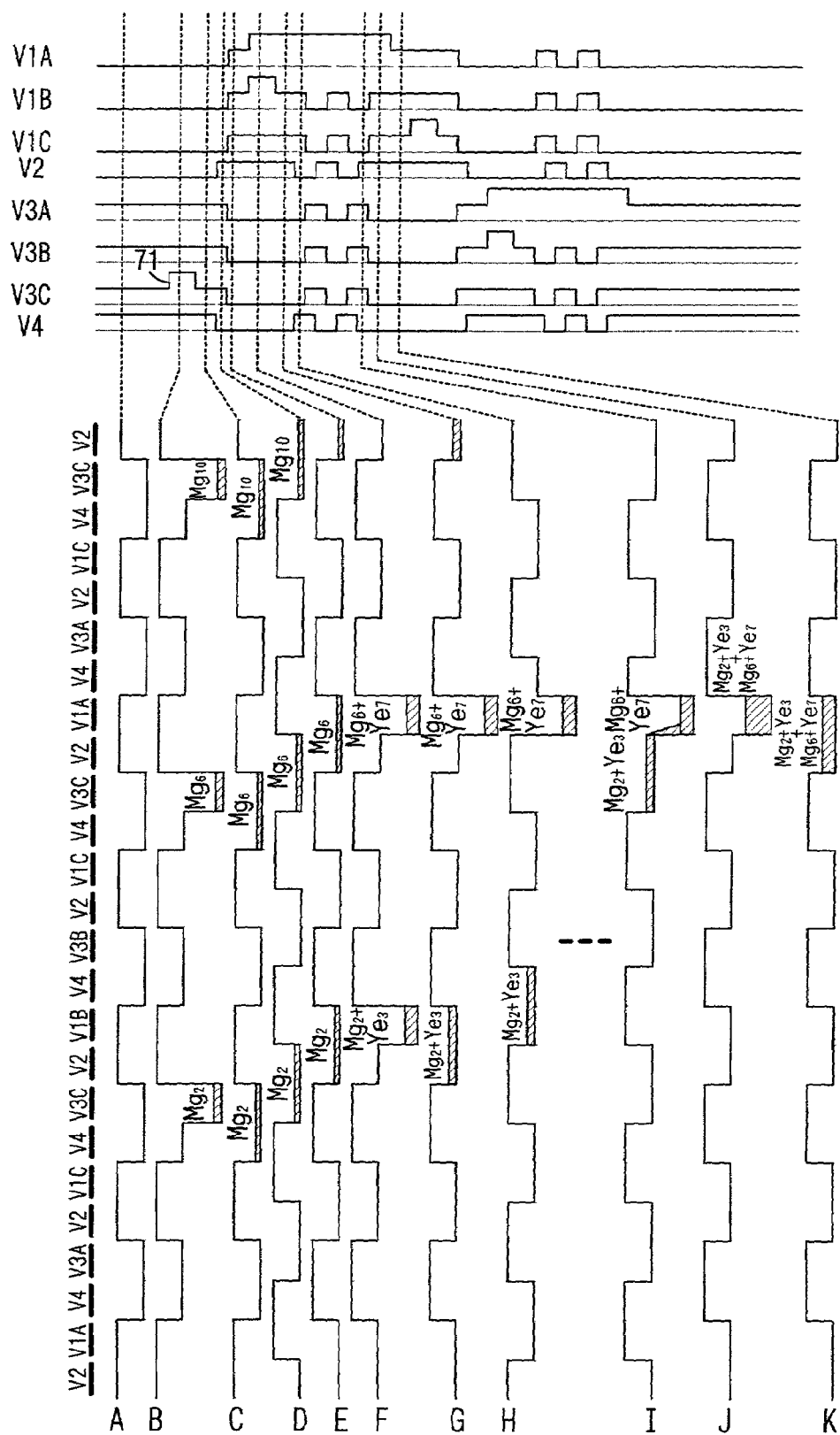
FIG. 42 is a schematic illustration to explain the summation readout mode of said CCD of the image capturing apparatus.
Figure 43:
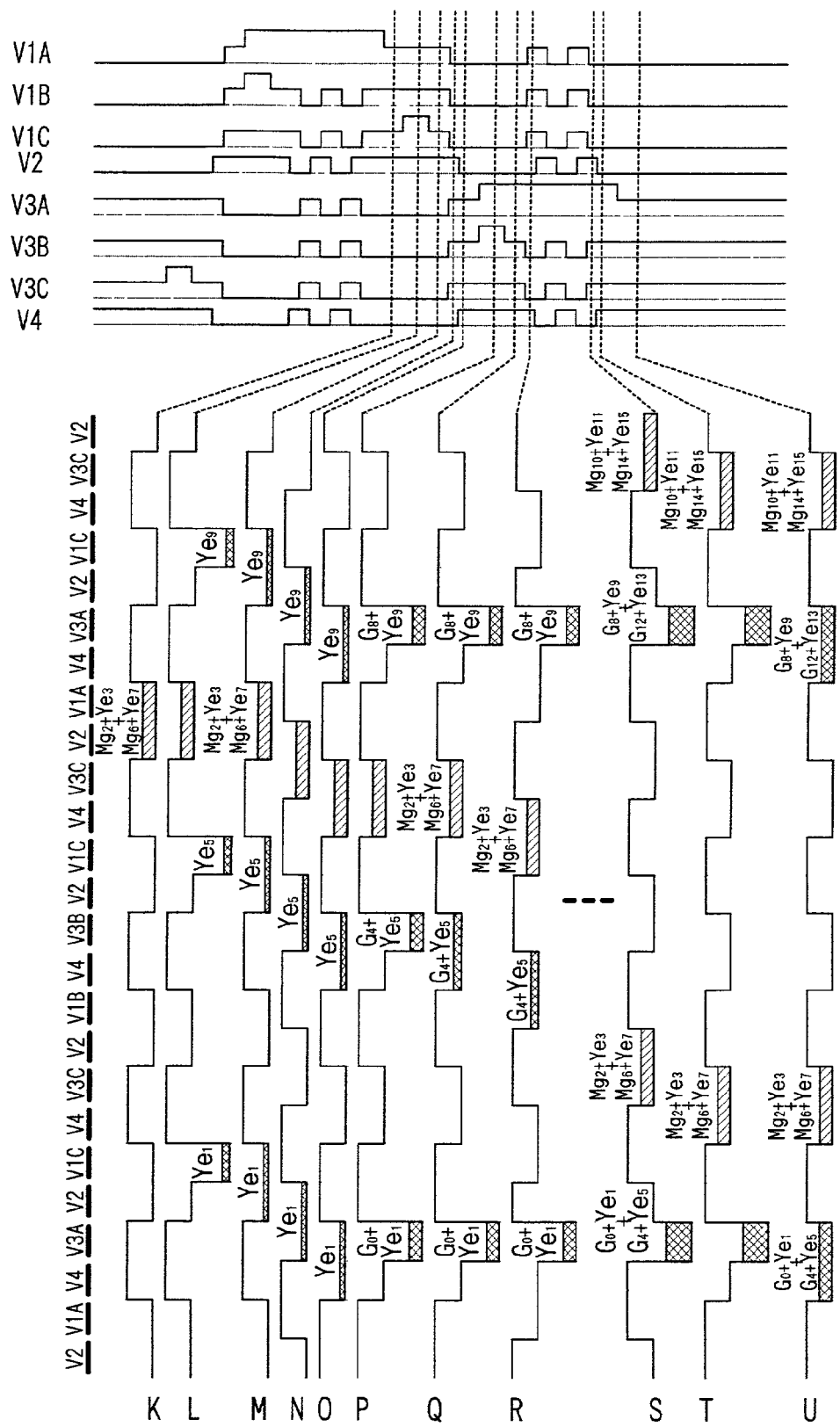
FIG. 43 is a schematic illustration to follow said FIG. 42.
Figure 44:
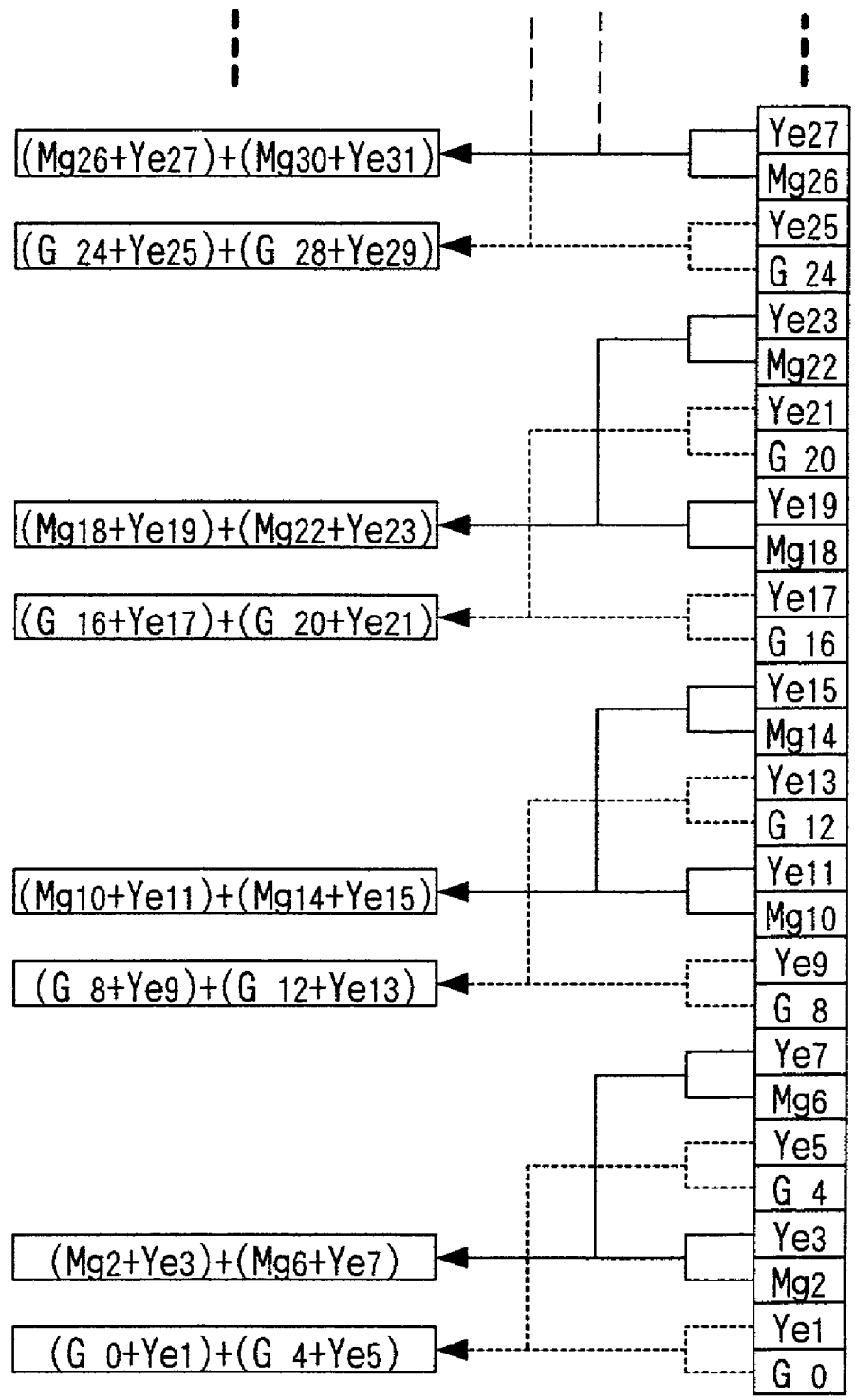
FIG. 44 is a schematic illustration to explain the outline of line readout in the summation readout mode of said CCD of the image capturing apparatus.

The manner of charge readout and vertical transfer in the mode that calls for reading out all the pixels by summing up two each of paired-filters of the respective same color-combinations for shooting a moving image or the like is explained hereunder, referring to FIGS. 42 through 44. FIGS. 42 and 43 show the manner of charge readout and vertical transfer on the column at the left end as viewed in FIG. 41. In the explanation hereunder, however, it should be understood that the same operation is performed also on all the other columns, including the one adjacent to said left-end column. In other words, charge readout and vertical transfer are performed by horizontal lines. The voltages waveforms of vertical transfer path gate signals identified with labels V1A-V4 in FIG. 42 are the same as the voltages waveforms of vertical transfer path gate signals identified with labels V1A-V4 in FIG. 43. Regarding the waveforms that extend perpendicular to the waveforms V1A-V4 and are identified with labels A-U, those shown in FIG. 42 represent potentials of the vertical transfer paths in the first half of the process, and those shown in FIG. 43 represent potentials of the vertical transfer paths in the second half of the process.

In the initial stage, the gate signals and the potentials of the vertical transfer path are in the state represented by 'A' in FIG. 42. When the electrodes V3C alone receive charge readout pulses 71, as shown by 'B' in FIG. 42, the signal charges on all the lines that hold magenta (Mg) pixels are read out to the vertical transfer path. Thereafter, while application of the charge readout pulse to V3C is stopped as shown in FIG. 42C, a given voltage is applied to V1A-V4 so that reverse transfer, i.e. vertical transfer in the direction away from the horizontal transfer path, is performed by the amount of 1.5 stages as shown in FIG. 42C-E. Charge readout pulses are then applied to V1A,V1B as shown in FIG. 42F. As a result, signal charges Mg and signal charges Ye (yellow) are summed up so that paired-filter signals Mg+Ye are generated. Thereafter, as shown in FIG. 42G, while the charge readout pulse applied to V1A is maintained, application of the charge readout pulse to V1B is stopped. In this state, reverse transfer, i.e. vertical transfer in the reverse direction, is performed by the amount of 2 stages as shown in FIG. 42H-J. As the potential well remains deep at each electrode V1A, which is located at every 8th line, two paired-filter signals of the same color-combination (Mg+Ye) are summed up in the charge retaining section under each V1A. In other words, in each one of said charge retaining sections, the pixel signal charges equivalent to four pixels are summed up. Thereafter, with application of the charge readout pulse to V1A stopped, the two paired-filter signals of the same color-combination resulting from the above summation are retained under each one of the aforementioned charge retaining sections as shown in FIG. 42K and FIG. 43K. In this state, charge readout pulses are applied to V1C as shown in FIG. 43L to read out the signal charges Ye that are respectively located above the signal charges G (green). Then, as shown in FIG. 43M-O, after stopping application of the charge readout pulse to V1C and performing ½-stage transfer in the forward direction, i.e. towards the horizontal transfer path, charge readout pulses are applied to V3A,V3B as shown in FIG. 43P. As a result, signal charges G and signal charges Ye are summed up so that paired-filter signals G+Ye are generated. Thereafter, as shown in FIG. 43Q, while the charge readout pulse applied to V3A is maintained, application of the charge readout pulse to V3B is stopped. In this state vertical transfer is performed in the forward direction, i.e. towards the horizontal transfer path, by the amount of 2 stages as shown in FIG. 43R-T. As the potential well remains deep at each electrode V3A, which is located at every 8th line, two paired-filter signals of the same color-combination (G+Ye) are summed up in the charge retaining section under each V3A. In other words, in the charge retaining section under each V3A, the pixel signal charges equivalent to four pixels are summed up. Thereafter, with application of the charge readout pulse to V3A stopped, the two paired-filter signals of the same color-combination resulting from the above summation are retained under each one of the aforementioned charge retaining sections as shown in FIG. 43U.

How the pixels are read out thereafter is shown in FIG. 44. To be more specific, first, the signal charge (G0+Ye1)+(G4+Ye5) is transferred to the horizontal transfer path, on which it undergoes horizontal transfer. Then 3-stage vertical transfer is performed to read out the signal charge (Mg2+Ye3)+(Mg6+Ye7) to the horizontal transfer path, on which they undergo horizontal transfer. Thereafter, by repeating a transfer set consisting of a 1-stage transfer, a horizontal transfer, a 3-stage transfer, and a horizontal transfer, the signals of all the pixels that have been summed up by lines can be read out at a frame rate four times faster than that in the still image mode.

According to the present example, mixing of colors is executed by reverse transfer along the vertical transfer path. However, as is true in the other examples of the CCD 2 explained hereto, the sixth example explained later is capable of summation of pixels (in case of the sixth example, summation of paired-filters of the same color-combination) by merely performing forward transfer along the vertical transfer paths, without requiring reverse transfer. In other words, full-pixel summation may be executed solely by forward vertical transfer so that the order of lines may be adjusted by an external component which is provided externally of the CCD to perform image processing or other similar functions. According to the present example, too, summation of the pixels on the odd-numbered lines may be performed on the horizontal transfer path in the same manner as the second example.

Figure 45:
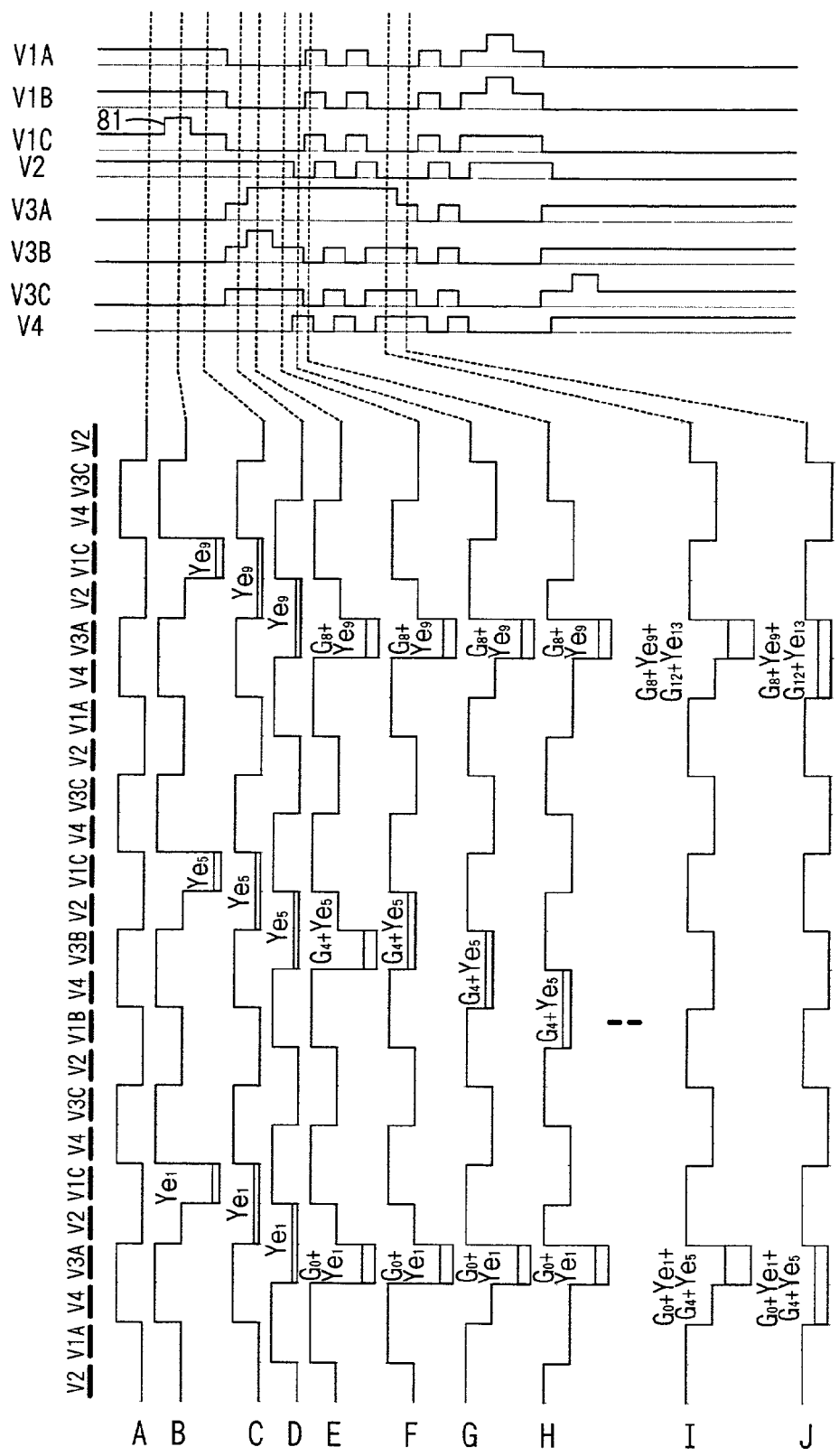
FIG. 45 is a schematic illustration to explain the summation readout mode of a sixth example of a CCD of an image capturing apparatus according to the present invention.
Figure 46:
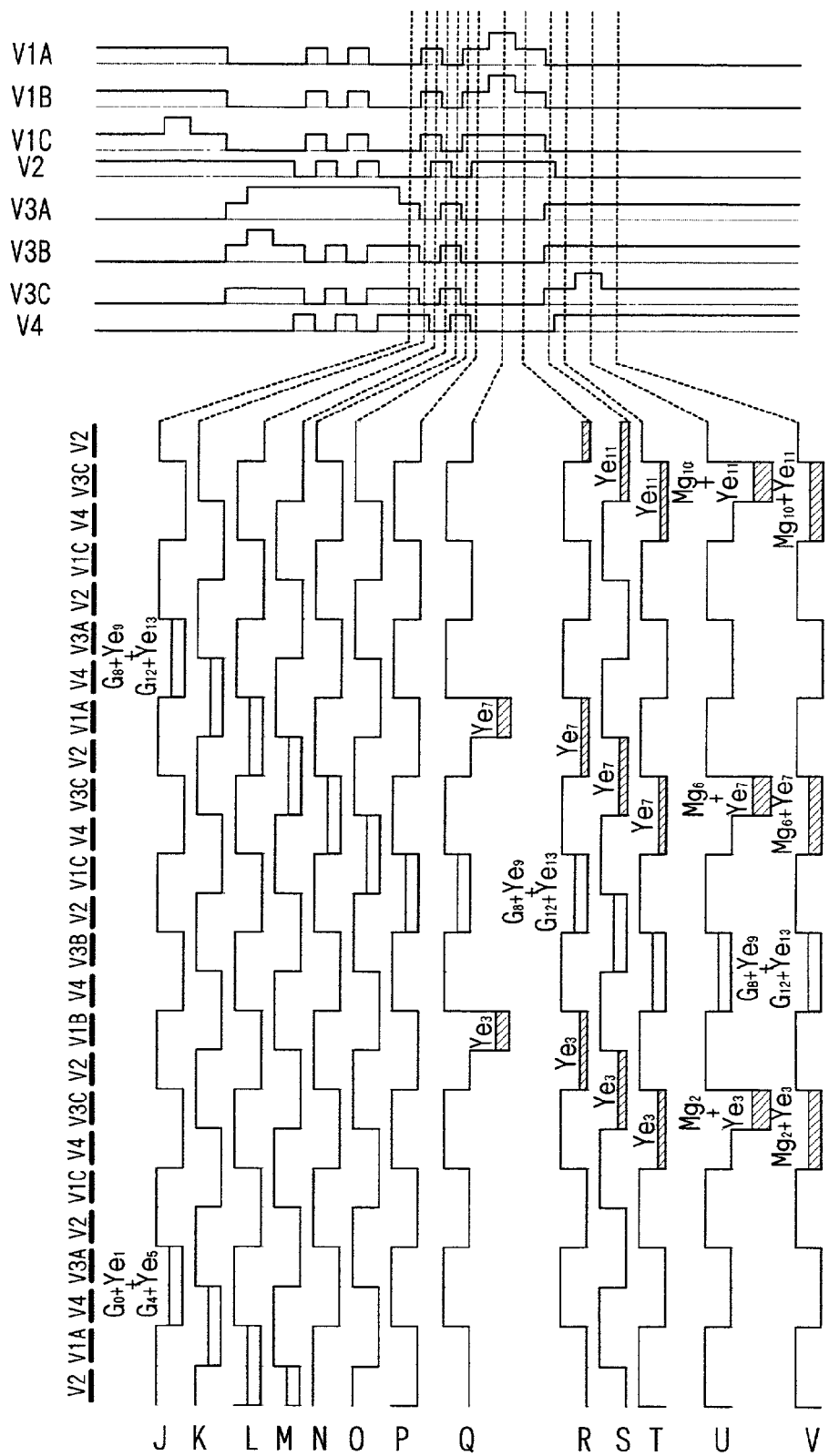
FIG. 46 is a schematic illustration to follow said FIG. 45.
Figure 47:
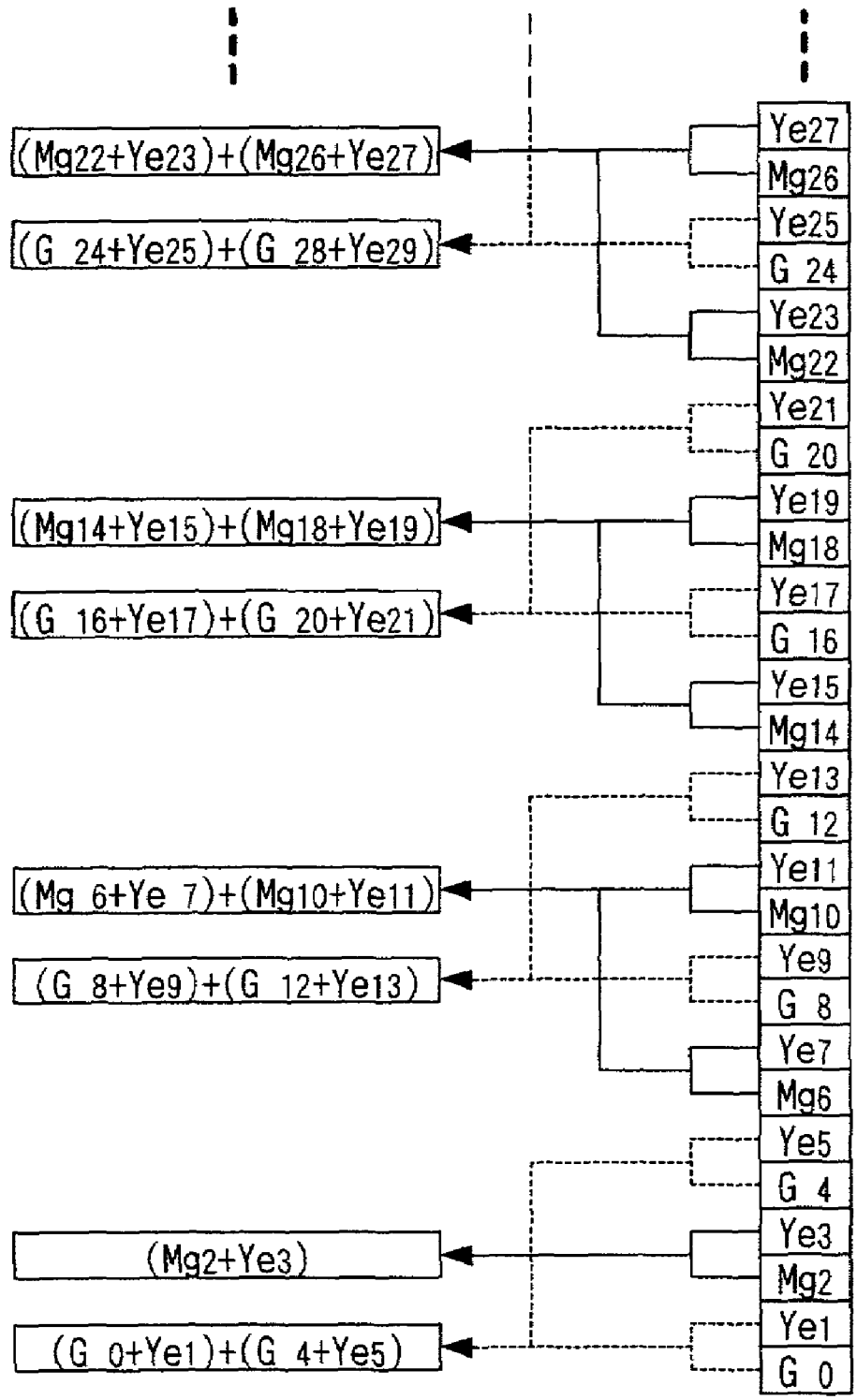
FIG. 47 is a schematic illustration to explain the outline of line readout in the summation readout mode of said CCD of the image capturing apparatus.

Next, the sixth example of a CCD 2 according to the invention is explained hereunder, referring to FIGS. 45 to 47. As the internal structure and the basic functions including the mechanism of driving the CCD 2 of the fourth example are exactly the same as those of the fifth example shown in FIG. 41, explanation of the full-pixel individual readout mode is omitted. According to the present example, it is sufficient to transfer signal charges in the forward direction, i.e. towards the horizontal transfer path. As there is no need of reverse transfer, the example is applicable to a CCD with a very low reverse transfer capability and thus has a wide range of use. Another benefit of this example lies in inclusion of summation on the horizontal transfer path, thereby realizing some reduction in the time required for readout of signals compared with the fifth example.

The CCD 2 according to the sixth example explained hereunder is different from that of the fifth example in combinations of paired-filters to be summed up.

The manner of charge readout and vertical transfer in the mode that calls for reading out all the pixels by summing up two each of paired-filters of respective same color-combinations for shooting a moving image or the like is explained hereunder, referring to FIGS. 45 through 47. FIGS. 45 and 46 show the manner of charge readout and vertical transfer on the column at the left end as viewed in FIG. 41. In the explanation hereunder, however, it should be understood that the same operation is performed also on all the other columns, including the one adjacent to said left-end column. In other words, charge readout and vertical transfer are performed by horizontal lines. The voltages waveforms of vertical transfer path gate signals identified with labels V1A-V4 in FIG. 45 are the same as the voltages waveforms of vertical transfer path gate signals identified with labels V1A-V4 in FIG. 46. Regarding the waveforms that extend perpendicular to the waveforms V1A-V4 and are identified with labels A-V, those shown in FIG. 45 represent potentials of the vertical transfer paths in the first half of the process, and those shown in FIG. 46 represent potentials of the vertical transfer paths in the second half of the process.

In the initial stage, the gate signals and the potentials of the vertical transfer path are in the state represented by 'A' in FIG. 45. When the electrodes V1C alone receive charge readout pulses 81, as shown by 'B' in FIG. 45, the signal charges of half of Ye, i.e. the pixels Ye that are respectively located immediately above the pixels G, are read out to the vertical transfer path. Thereafter, while application of the charge readout pulse to V1C is stopped as shown in FIG. 45C, a given voltage is applied to V1A-V4 so that ½-stage vertical transfer is performed towards the horizontal as shown in FIG. 45C-D. Charge readout pulses are then applied to V3A,V3B as shown in FIG. 45E. As a result, signal charges Ye and signal charges G are summed up so that paired-filter signals Ye+G are generated. Thereafter, as shown in FIG. 45F, while the charge readout pulse applied to V3A is maintained, application of the charge readout pulse to V3B is stopped. In this state, vertical transfer is performed by the amount of 2 stages as shown in FIG. 45G-I. As the potential well remains deep at each electrode V3A, which is located at every 8th line, two paired-filter signals of the same color-combination (G+Ye) are summed up in the charge retaining section under each V3A. In other words, in each one of said charge retaining sections, the pixel signal charges equivalent to four pixels are summed up. Thereafter, with application of the charge readout pulse to V3A stopped, the two paired-filter signals of the same color-combination resulting from the above summation are retained under each one of the aforementioned charge retaining sections as shown in FIG. 45J and FIG. 46J. Then, vertical transfer is performed in the forward direction, i.e. towards the horizontal transfer path, by the amount of 1.5 stages as shown in FIG. 46K-P so that the paired-filter signals are temporarily sheltered under the respective electrodes V1C. In this state, charge readout pulses are applied to V1A,V1B as shown in FIG. 46Q to read out the signal charges of the remaining half of Ye, i.e. the pixels Ye that are respectively located immediately above the pixels Mg, are read out to the vertical transfer path. Next, as shown in FIG. 46R, application of the signal charge readout pulses to V1A,V1B is stopped. Then, after ½ stage transfer is performed as shown in FIG. 46S-T, charge readout pulses are applied to V3C as shown in FIG. 46U. As a result, paired-filter signals Mg+Ye are generated with the signal charges Mg added to the signal charges Ye. Thereafter, with application of the charge readout pulse to V3C stopped, Mg+Ye is retained under each electrode V3C as shown in FIG. 46V.

How the pixels are read out thereafter is shown in FIG. 47. To be more specific, after the signal charge (G0+Ye1)+(G4+Ye5), which is already on the horizontal transfer path, is output by horizontal transfer, the signal charge (Mg2+Ye3)+(Mg6+Ye7) is output by vertical transfer and horizontal transfer. Thereafter, by repeating a transfer set consisting of a 1-stage transfer, a horizontal transfer, a 3-stage transfer, and a horizontal transfer, the signals of all the pixels that have been summed up by lines can be read out at a frame rate four times faster than that in the still image mode.

As is true in the first example, in this sixth example, too, the positional relationship between the even-numbered lines and the odd-numbered lines is reversed. Such a reversal can be cancelled out by using an external component which is provided externally of the CCD 2, i.e. downstream from the CCD 2 of the present example, for image processing or other similar functions. For example, a line buffer having the functions of a processing unit which is capable of recording image data of one line may be included in the image capturing apparatus and function in such a manner as to temporarily retain line signals output earlier and permit the subsequent line signals to pass first before the former or first mentioned line signals thereby rearranging the order of the even-numbered line signals and odd-numbered line signals.

The fifth and sixth examples of the CCD 2 are explained as above, referring to an interlace CCD. However, comparing the first and second examples with the third example, and considering their functions, it is evident that the process described in the explanation of the fifth example and the sixth example can easily be applied to a progressive CCD. With a progressive CCD, four vertical transfer path gate electrode (readout electrode) systems are sufficient for implementation of either example as is true in the third example.

As described above, the present example requires six readout systems to be applied to a filter arrangement that is widely used in movie cameras or the like and designed for line summation. Other than that, it offers the same effects as any one of the examples described above, including its capability of holding down costs by coping with an increase in the number of lines to be summed up by means of the same number of vertical transfer electrodes.

With each one of the examples described above, the second summation process using the horizontal transfer path can be combined with vertical transfer of either type, i.e. the vertical transfer that is limited to the forward direction or that can be performed two ways: forward or reverse.

With a configuration limited to forward vertical transfer, too, it is possible to complete summation of signal charges without using a horizontal transfer path, in other words by solely using the vertical transfer paths. In cases where summation is desired to be completed by forward vertical transfer alone with an interlace CCD of a complementary color, line-sequential type, the electrode wirings have to be of a different arrangement than that described in the sixth example.

Although the invention is explained referring to the examples where each summed-charge is generated by summing up five pixel signals, the invention is not limited to structures presented by these examples; summation of signal charges of two or more pixels that are not adjacent to one another offer various benefits, such as an increased frame rate and improved image quality.

Although all the pixels are read out and used according to the examples described above, signal charge of pixels outside the range of effective pixels may remain unread, or a part of the read pixels may be abandoned without being used.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A solid-state image pickup device driving method for driving a solid-state image pickup device comprising:
    a plurality of pixels that are provided with a photoelectric converting means and consist of pixels of a first color and a second color arranged in a given pattern,
    a plurality of first transfer paths for reading out and transferring signal charges of said pixels, and
    a second transfer path for reading out and transferring the pixels transferred from the first transfer paths,
    said method including;
    a first summation process comprising steps of:
    reading out to the aforementioned first transfer paths a plurality of pixels that constitutes all or a part of the pixels of the first color by applying charge readout voltages to corresponding charge readout electrodes, and
    while retaining the signal charges of specific pixels of those read in the previous step mentioned above by maintaining said specific pixels in the readout state where the charge readout voltages are being applied to corresponding specific charge readout electrodes, transferring the other signal charges read in said previous step so as to add the transferred signal charges to the retained signal charges, thereby generating first summed charges;
    a second summation process comprising steps of:
    reading out to the first transfer paths a plurality of signal charges of the pixels of the second color in the state where said first summed charges are located apart from where said plurality of signal charges of the pixels of the second color are going to be read, and
    summing up said signal charges of the pixels of the second color on either one of the first transfer paths or the second transfer path, or both the first transfer paths and the second transfer path, thereby generating second summed charges; and
    a sum output process comprising steps of:
    transferring said first summed charges and the second summed charges to and from the second transfer path, and
    outputting said first summed charges and second summed charges from the second transfer path, wherein
    the charge readout voltages applied to the charge readout electrodes of the plurality of pixels used in the summation are held high throughout the summation.

2. A solid-state image pickup device driving method as claimed in claim 1, wherein:
    said first and second summation processes are performed with charges that have been read out to the first transfer paths being transferred on the first transfer paths in the forward and reverse direction.

3. A solid-state image pickup device driving method as claimed in claim 1, wherein:
    said second summation process is performed with a plurality of charges of pixels of the second color being read out to given locations on the second transfer path.

4. A solid-state image pickup device driving method as claimed in claim 1, wherein:
    a charge coupled device having charge readout electrodes respectively corresponding to the pixels is provided for the first transfer paths so that said readout and retention are performed by applying charge readout voltages to said charge readout electrode.

5. A solid-state image pickup device driving method as claimed in claim 1, wherein the manner of driving the solid-state image pickup device can be switched between:
    a first driving mode provided to perform said first summation process, said second summation process, and said sum output process, and
    a second driving mode provided to read out the charges of the respective pixels individually to the first transfer paths, individually transfer the read charges to the second transfer path, and output said charges from the second transfer path.

6. A solid-state image pickup device driving method as claimed in claim 5, wherein:
    said first driving mode is the moving image mode for shooting a moving image, and
    said second driving mode is the still image mode for shooting a still image.

7. An image capturing apparatus including a solid-state image pickup device and a driving circuit for driving said solid-state image pickup device, wherein:
    said solid-state image pickup device includes a plurality of pixels that are provided with a photoelectric converting means and consist of pixels of a fist color and a second color arranged in a given pattern;
    said driving circuit includes:
    a plurality of first transfer paths for reading out and transferring signal charges of said pixels, and
    a second transfer path for reading out and transferring the signal charges transferred from said first transfer paths;
    said driving circuit functions to:
    generate first summed charges by:
    reading out onto said first transfer paths a plurality of pixels that constitutes all or a part of the pixels of the first color by applying charge readout voltages to corresponding charge readout electrodes,
    while retaining the signal charges of specific pixels of those read in the previous step mentioned above by maintaining said specific pixels in the readout state where the charge readout voltages are being applied to corresponding specific charge readout electrodes, transferring the other signal charges read in said previous step, and
    adding the transferred signal charges to the retained signal charges;
    generate second summed charges by:
    reading out to the first transfer paths a plurality of signal charges of the pixels of the second color in the state where said first summed charges are located apart from where said plurality of signal charges of the pixels of the second color are going to be read, and
    summing up said signal charges of the pixels of the second color on either one of the first transfer paths or the second transfer path, or both the first transfer paths and the second transfer path; and transfer said first summed charges and the second summed charges to the second transfer path; and output the first summed charges and the second summed charges from the second transfer path, wherein the charge readout voltages applied to the charge readout electrodes of the plurality of pixels used in the summation are held high throughout the summation.

8. An image capturing apparatus as claimed in claim 7, wherein the image capturing apparatus is provided with:

a processing means that is capable of reversing the order of the first summed charges and the second summed charges output from the solid-state image pickup device.

9. An image capturing apparatus including;

an image pickup device having a plurality of pixels that are provided with a photoelectric converting means and arranged in a given pattern, a control means for controlling said image pickup device, and an image processing means to which signal charges output from said image pickup device are input, wherein:

said control means is capable of switching modes during preliminary measurements between:

an omission readout mode, which calls for reading out the signal charges of a part of said image pickup device and outputting the read-out signal charges to said image processing means;

a summation readout mode, which calls for reading out the signal charges of the pixels of said image pickup device, summing up the signal charges of a plurality of pixels of the respective same colors, and outputting the summed-up signal charges to said image processing means, and a mixed-color summation readout mode, which calls for reading out the signal charges of the pixels of said image pickup device, summing up the signal charges of a plurality of pixels of different colors, and outputting the summed-up signal charges to said image processing means; said switching is performed based on the results of preliminary measurement; further preliminary measurement is performed in the mode to which the readout mode has been switched; and said preliminary measurements are measurements taken prior to a main shooting.

10. An image capturing apparatus as claimed in claim 9, wherein said control means is capable of switching in the courts of shooting moving images between:

an omission readout mode, which calls for reading out the signal charges of a part of said image pickup device and outputting the read-out signal charges to said image processing means, and a summation readout mode, which calls for reading out the signal charges of the pixels of said image pickup device, summing up the signal charges of a plurality of pixels each, and outputting the summed-up signal charges to said image processing means.

11. An image capturing apparatus as claimed in claim 9, wherein:

the image pickup device is a CCD solid-state image pickup device having a plurality of pixels of a plurality of colors arranged in a given pattern, and the summation readout mode calls for summation of signal charges of a plurality of pixels of the respective same colors.

12. An image capturing apparatus as claimed in claim 9, wherein:

the controls means is adapted to switch the driving mode to drive the image pickup device between the summation readout mode and the omission readout mode in accordance with the light level of the shooting conditions.

13. An image capturing apparatus as claimed in claim 9, wherein:

the control means is adapted to detect a possibility of generation of moiré and drive the image pickup device in the summation readout mode when there is the possibility of generation of moiré, and in the omission readout mode in the other situations.

14. An image capturing apparatus as claimed in claim 9, wherein:

the control means is adapted to detect a possibility of generation of smear and drive the image pickup device in the omission readout mode when there is the possibility of generation of smear, and in the summation readout mode in the other situations.

15. An image capturing apparatus as claimed in claim 9, wherein the image capturing apparatus includes a saturation preventing means adapted to be controlled by the control means to prevent saturation of signals in the image pickup device when the image pickup device is being driven in the summation readout mode.

16. An image capturing apparatus as claimed in claim 9, wherein:

the control means is adapted to switch the driving mode between:

an omission readout mode, which calls for reading out the signal charges of a part of said image pickup device and outputting the read-out signal charges to said image processing means, a summation readout mode, which calls for reading out the signal charges of the pixels of said image pickup device, summing up the signal charges of a plurality of pixels, and outputting the summed-up signal charges to said image processing means, and a full-pixel individual readout mode, which calls for individually reading out and using the signal charges of nearly all the pixels of said image pickup device.

* * * * *